US008218555B2

(12) United States Patent
Minami et al.

(10) Patent No.: US 8,218,555 B2
(45) Date of Patent: Jul. 10, 2012

(54) GIGABIT ETHERNET ADAPTER

(75) Inventors: John Shigeto Minami, Honolulu, HI (US); Robin Yasu Uyeshiro, St. Kailua, HI (US); Michael Ward Johnson, Livermore, CA (US); Steve Su, Honolulu, HI (US)

(73) Assignee: NVIDIA Corporation, Santa Clara, CA (US)

( * ) Notice: Subject to any disclaimer, the term of this patent is extended or adjusted under 35 U.S.C. 154(b) by 2307 days.

(21) Appl. No.: 10/131,118

(22) Filed: Apr. 23, 2002

(65) Prior Publication Data
US 2003/0165160 A1 Sep. 4, 2003

Related U.S. Application Data

(60) Provisional application No. 60/286,265, filed on Apr. 24, 2001.

(51) Int. Cl.
*H04L 12/66* (2006.01)
*G06F 13/00* (2006.01)
*G06F 15/16* (2006.01)

(52) U.S. Cl. ........ 370/401; 370/463; 370/466; 370/469; 709/230; 710/105

(58) Field of Classification Search .................. 370/401, 370/463, 466, 469; 709/230; 710/105
See application file for complete search history.

(56) References Cited

U.S. PATENT DOCUMENTS

| | | | | |
|---|---|---|---|---|
| 4,965,716 A | * | 10/1990 | Sweeney ........................ | 710/112 |
| 4,991,133 A | | 2/1991 | Davis et al. | |
| 5,012,489 A | | 4/1991 | Burton et al. ..................... | 375/8 |
| 5,058,110 A | * | 10/1991 | Beach et al. ................... | 370/464 |
| 5,161,193 A | | 11/1992 | Lampson et al. ............... | 380/49 |
| 5,163,131 A | | 11/1992 | Row et al. ...................... | 395/200 |

(Continued)

FOREIGN PATENT DOCUMENTS

EP  1 359 724  11/2003

(Continued)

OTHER PUBLICATIONS

PCT Search Report from PCT/US02/12889.

(Continued)

*Primary Examiner* — Alpus H Hsu
(74) *Attorney, Agent, or Firm* — Zilka-Kotab, PC

(57) ABSTRACT

A gigabit Ethernet adapter provides a provides a low-cost, low-power, easily manufacturable, small form-factor network access module which has a low memory demand and provides a highly efficient protocol decode. The invention comprises a hardware-integrated system that both decodes multiple network protocols in a byte-streaming manner concurrently and processes packet data in one pass, thereby reducing system memory and form factor requirements, while also eliminating software CPU overhead. A preferred embodiment of the invention comprises a plurality of protocol state machines that decode network protocols such as TCP, IP, User Datagram Protocol (UDP), PPP, Raw Socket, RARP, ICMP, IGMP, iSCSI, RDMA, and FCIP concurrently as each byte is received. Each protocol handler parses, interprets, and strips header information immediately from the packet, requiring no intermediate memory. The invention provides an Internet tuner core, peripherals, and external interfaces. A network stack processes, generates and receives network packets. An internal programmable processor controls the network stack and handles any other types of ICMP packets, IGMP packets, or packets corresponding to other protocols not supported directly by dedicated hardware. A virtual memory manager is implemented in optimized, hardwired logic. The virtual memory manager allows the use of a virtual number of network connections which is limited only by the amount of internal and external memory available.

4 Claims, 40 Drawing Sheets

U.S. PATENT DOCUMENTS

| | | | | |
|---|---|---|---|---|
| 5,303,344 | A | 4/1994 | Yokoyama et al. | 395/200 |
| 5,307,413 | A | 4/1994 | Denzer | 380/49 |
| 5,426,694 | A | 6/1995 | Hebert | 379/242 |
| 5,430,727 | A | 7/1995 | Callon | 370/85.13 |
| 5,440,551 | A | 8/1995 | Suzuki | 370/60 |
| 5,442,637 | A * | 8/1995 | Nguyen | 714/708 |
| 5,448,558 | A | 9/1995 | Gildea et al. | |
| 5,485,460 | A | 1/1996 | Schrier et al. | 370/94.1 |
| 5,495,480 | A | 2/1996 | Yoshida | 370/60 |
| 5,499,353 | A | 3/1996 | Kadlec et al. | 395/445 |
| 5,513,324 | A | 4/1996 | Dolin, Jr. et al. | 395/200.18 |
| 5,519,704 | A | 5/1996 | Farinacci et al. | 370/85.13 |
| 5,546,453 | A | 8/1996 | Hebert | 379/242 |
| 5,566,170 | A | 10/1996 | Bakke et al. | 370/60 |
| 5,577,105 | A | 11/1996 | Baum et al. | 379/93 |
| 5,577,172 | A | 11/1996 | Vatland et al. | 395/114 |
| 5,577,237 | A | 11/1996 | Lin | 395/555 |
| 5,598,410 | A | 1/1997 | Stone | 370/469 |
| 5,619,650 | A | 4/1997 | Bach et al. | 395/200.01 |
| 5,625,678 | A | 4/1997 | Blomfield-Brown | 379/93 |
| 5,625,825 | A | 4/1997 | Rostoker et al. | 395/730 |
| 5,634,015 | A | 5/1997 | Chang et al. | 395/309 |
| 5,636,371 | A | 6/1997 | Yu | 395/500 |
| 5,640,394 | A | 6/1997 | Schrier et al. | 370/389 |
| 5,663,951 | A | 9/1997 | Danneels et al. | 370/230 |
| 5,666,362 | A | 9/1997 | Chen et al. | 370/420 |
| 5,675,507 | A | 10/1997 | Bobo, II | 364/514 R |
| 5,687,314 | A | 11/1997 | Osman et al. | 395/200.01 |
| 5,696,899 | A | 12/1997 | Kalwitz | 395/200.1 |
| 5,699,350 | A * | 12/1997 | Kraslavsky | 370/254 |
| 5,701,316 | A | 12/1997 | Alferness et al. | 371/53 |
| 5,727,149 | A | 3/1998 | Hirata et al. | 395/200.8 |
| 5,734,865 | A | 3/1998 | Yu | 395/500 |
| 5,748,905 | A | 5/1998 | Hauser et al. | 395/200.79 |
| 5,754,540 | A | 5/1998 | Liu et al. | 370/315 |
| 5,758,070 | A * | 5/1998 | Lawrence | 709/220 |
| 5,761,281 | A | 6/1998 | Baum et al. | 379/93.29 |
| 5,790,546 | A | 8/1998 | Dobbins et al. | 370/400 |
| 5,790,676 | A | 8/1998 | Ganesan et al. | 380/23 |
| 5,802,278 | A | 9/1998 | Isfeld et al. | 395/200.02 |
| 5,802,306 | A | 9/1998 | Hunt | 395/200.58 |
| 5,805,816 | A | 9/1998 | Picazo, Jr. et al. | 395/200.53 |
| 5,809,235 | A | 9/1998 | Sharma et al. | 395/200.6 |
| 5,815,516 | A | 9/1998 | Aaker et al. | 371/53 |
| 5,818,935 | A | 10/1998 | Maa | 380/20 |
| 5,826,032 | A | 10/1998 | Finn et al. | 395/200.66 |
| 5,828,880 | A * | 10/1998 | Hanko | 718/106 |
| 5,872,919 | A | 2/1999 | Wakeland | 395/200.6 |
| 5,894,557 | A | 4/1999 | Bade et al. | 395/200.58 |
| 5,909,546 | A | 6/1999 | Osborne | 395/200.42 |
| 5,920,732 | A | 7/1999 | Riddle | 395/876 |
| 5,935,268 | A | 8/1999 | Weaver | 714/758 |
| 5,937,169 | A | 8/1999 | Connery et al. | 395/200.8 |
| 5,941,988 | A | 8/1999 | Bhagwat et al. | 713/201 |
| 5,943,481 | A | 8/1999 | Wakeland | 395/200.6 |
| 5,974,518 | A | 10/1999 | Nogradi | 711/173 |
| 5,999,974 | A | 12/1999 | Ratcliff et al. | 709/224 |
| 6,014,699 | A | 1/2000 | Ratcliff et al. | 709/224 |
| 6,016,511 | A * | 1/2000 | Cook | 709/236 |
| 6,034,963 | A | 3/2000 | Minami et al. | 370/401 |
| 6,046,980 | A | 4/2000 | Packer | |
| 6,061,742 | A | 5/2000 | Stewart et al. | 709/250 |
| 6,067,407 | A * | 5/2000 | Wadsworth et al. | 709/224 |
| 6,076,115 | A | 6/2000 | Sambamurthy et al. | 709/250 |
| 6,081,846 | A | 6/2000 | Hyder et al. | 709/250 |
| 6,092,110 | A | 7/2000 | Maria et al. | 709/225 |
| 6,092,229 | A | 7/2000 | Boyle et al. | 714/748 |
| 6,098,188 | A | 8/2000 | Kalmanek, Jr. et al. | 714/746 |
| 6,101,543 | A | 8/2000 | Alden et al. | 709/229 |
| 6,141,705 | A | 10/2000 | Anand et al. | |
| 6,151,625 | A | 11/2000 | Swales et al. | 709/218 |
| 6,157,955 | A | 12/2000 | Narad et al. | 709/236 |
| 6,172,980 | B1 | 1/2001 | Flanders et al. | 370/401 |
| 6,172,990 | B1 | 1/2001 | Deb et al. | 370/474 |
| 6,173,333 | B1 | 1/2001 | Jolitz et al. | 709/240 |
| 6,182,228 | B1 | 1/2001 | Boden et al. | 713/201 |
| 6,185,619 | B1 | 2/2001 | Joffe et al. | 709/229 |
| 6,212,560 | B1 * | 4/2001 | Fairchild | 709/223 |
| 6,226,680 | B1 | 5/2001 | Boucher et al. | 709/230 |
| 6,230,193 | B1 | 5/2001 | Arunkumar et al. | 709/218 |
| 6,233,626 | B1 | 5/2001 | Swales et al. | 710/11 |
| 6,247,060 | B1 | 6/2001 | Boucher et al. | 709/238 |
| 6,272,639 | B1 * | 8/2001 | Holden et al. | 726/12 |
| 6,334,153 | B2 | 12/2001 | Boucher et al. | 709/230 |
| 6,370,599 | B1 | 4/2002 | Anand et al. | |
| 6,389,479 | B1 | 5/2002 | Boucher et al. | 709/243 |
| 6,393,487 | B2 | 5/2002 | Boucher et al. | 709/238 |
| 6,427,171 | B1 | 7/2002 | Craft et al. | 709/230 |
| 6,427,173 | B1 | 7/2002 | Boucher et al. | 709/238 |
| 6,434,620 | B1 | 8/2002 | Boucher et al. | 709/230 |
| 6,470,415 | B1 | 10/2002 | Starr et al. | 711/104 |
| 6,591,302 | B2 | 7/2003 | Boucher et al. | 709/230 |
| 6,622,172 | B1 * | 9/2003 | Tam | 709/232 |
| 6,658,480 | B2 | 12/2003 | Boucher et al. | 709/239 |
| 6,665,724 | B2 * | 12/2003 | Lawrence | 709/230 |
| 6,687,758 | B2 | 2/2004 | Craft et al. | 709/250 |
| 6,697,868 | B2 | 2/2004 | Craft et al. | 709/230 |
| 6,751,665 | B2 | 6/2004 | Philbrick et al. | 709/224 |
| 6,757,746 | B2 | 6/2004 | Boucher et al. | 709/250 |
| 6,779,033 | B1 * | 8/2004 | Watson et al. | 709/227 |
| 6,807,581 | B1 | 10/2004 | Starr et al. | 709/250 |
| 6,820,117 | B1 * | 11/2004 | Johnson | 709/223 |
| 6,882,624 | B1 * | 4/2005 | Ma | 370/236.1 |
| 6,938,092 | B2 | 8/2005 | Burns | 709/230 |
| 6,941,386 | B2 | 9/2005 | Craft et al. | 709/250 |
| 6,965,941 | B2 | 11/2005 | Boucher et al. | 709/230 |
| 6,975,629 | B2 * | 12/2005 | Welin | 370/392 |
| 6,983,325 | B1 * | 1/2006 | Watson et al. | 709/228 |
| 6,985,968 | B1 * | 1/2006 | Gammenthaler, Jr. | 709/250 |
| 6,996,070 | B2 | 2/2006 | Starr | 370/252 |
| 7,013,482 | B1 * | 3/2006 | Krumel | 726/13 |
| 7,031,267 | B2 * | 4/2006 | Krumel | 370/463 |
| 7,042,898 | B2 | 5/2006 | Blightman | 370/463 |
| 7,142,539 | B2 * | 11/2006 | Grinfeld | 370/392 |
| 7,340,549 | B2 | 3/2008 | Hoese et al. | |
| 7,401,333 | B2 * | 7/2008 | Vandeweerd | 718/102 |
| 7,913,261 | B2 * | 3/2011 | Mitchell et al. | 719/310 |
| 2001/0021949 | A1 | 9/2001 | Blightman et al. | 709/219 |
| 2001/0023460 | A1 | 9/2001 | Boucher et al. | 709/250 |
| 2001/0027496 | A1 | 10/2001 | Boucher et al. | 709/250 |
| 2001/0036196 | A1 | 11/2001 | Blightman et al. | 370/465 |
| 2001/0037397 | A1 | 11/2001 | Boucher et al. | 709/230 |
| 2001/0037406 | A1 | 11/2001 | Philbrick et al. | 709/250 |
| 2001/0047433 | A1 | 11/2001 | Boucher et al. | 709/250 |
| 2002/0087732 | A1 | 7/2002 | Boucher et al. | 709/250 |
| 2002/0091844 | A1 | 7/2002 | Craft et al. | 709/230 |
| 2002/0095519 | A1 | 7/2002 | Philbrick et al. | 709/250 |
| 2002/0147839 | A1 | 10/2002 | Boucher et al. | 709/238 |
| 2002/0156927 | A1 | 10/2002 | Boucher et al. | 709/250 |
| 2002/0161919 | A1 | 10/2002 | Boucher et al. | 709/238 |
| 2003/0014624 | A1 | 1/2003 | Maturana et al. | 713/151 |
| 2003/0037237 | A1 | 2/2003 | Abgrall et al. | 713/166 |
| 2003/0079033 | A1 | 4/2003 | Craft et al. | 709/230 |
| 2003/0081600 | A1 | 5/2003 | Blaker et al. | |
| 2003/0108033 | A1 * | 6/2003 | Raisanen et al. | 370/352 |
| 2003/0140124 | A1 | 7/2003 | Burns | 709/220 |
| 2003/0161327 | A1 | 8/2003 | Vlodavsky et al. | |
| 2003/0167346 | A1 | 9/2003 | Craft et al. | 709/250 |
| 2003/0200284 | A1 | 10/2003 | Philbrick et al. | 709/219 |
| 2003/0204596 | A1 | 10/2003 | Yadav | 709/226 |
| 2003/0204631 | A1 | 10/2003 | Pinkerton et al. | 709/249 |
| 2003/0204634 | A1 | 10/2003 | Pinkerton et al. | 709/250 |
| 2004/0003126 | A1 | 1/2004 | Boucher et al. | 709/250 |
| 2004/0054813 | A1 | 3/2004 | Boucher et al. | 709/250 |
| 2004/0062245 | A1 | 4/2004 | Sharp | 370/392 |
| 2004/0062246 | A1 | 4/2004 | Boucher et al. | 370/392 |
| 2004/0064578 | A1 | 4/2004 | Boucher et al. | 709/236 |
| 2004/0064589 | A1 | 4/2004 | Boucher et al. | 709/250 |
| 2004/0064590 | A1 | 4/2004 | Starr et al. | 709/250 |
| 2004/0073703 | A1 | 4/2004 | Boucher et al. | 709/245 |
| 2004/0078462 | A1 | 4/2004 | Philbrick et al. | 709/22 |
| 2004/0088262 | A1 | 5/2004 | Boucher et al. | 705/65 |
| 2004/0100952 | A1 | 5/2004 | Boucher et al. | 370/389 |
| 2004/0111535 | A1 | 6/2004 | Boucher et al. | 709/250 |
| 2004/0117509 | A1 | 6/2004 | Craft et al. | 709/250 |
| 2004/0158640 | A1 | 8/2004 | Philbrick et al. | 709/230 |
| 2004/0158793 | A1 | 8/2004 | Blightman et al. | 714/758 |

| | | | |
|---|---|---|---|
| 2004/0240435 A1 | 12/2004 | Boucher et al. | 370/352 |
| 2005/0091412 A1 | 4/2005 | Pinkerton et al. | 709/250 |
| 2005/0122986 A1 | 6/2005 | Starr et al. | 370/412 |
| 2005/0141561 A1 | 6/2005 | Craft et al. | 370/474 |
| 2005/0160139 A1 | 7/2005 | Boucher et al. | 709/203 |
| 2005/0175003 A1 | 8/2005 | Craft et al. | 370/389 |
| 2005/0182841 A1 | 8/2005 | Sharp | 709/228 |
| 2005/0182854 A1 | 8/2005 | Pinkerton et al. | 709/238 |
| 2005/0198198 A1 | 9/2005 | Craft et al. | 709/217 |
| 2005/0204058 A1 | 9/2005 | Philbrick et al. | 709/238 |
| 2005/0278459 A1 | 12/2005 | Boucher et al. | 709/250 |
| 2006/0010238 A1 | 1/2006 | Craft et al. | 709/227 |
| 2007/0062245 A1 | 3/2007 | Fuller et al. | 72/413 |

FOREIGN PATENT DOCUMENTS

| | | |
|---|---|---|
| EP | 1 361 512 | 11/2003 |
| JP | 3273350 A | 12/1991 |
| JP | 5183603 A | 7/1993 |
| JP | 6309251 A | 11/1994 |
| JP | 2000235536 A | 8/2000 |
| WO | WO98/19412 | 5/1998 |
| WO | WO 98/19412 | 5/1998 |
| WO | WO00013091 A1 | 3/2000 |

OTHER PUBLICATIONS

PCT Written Opinion from PCT/US02/12889.

PCT International Preliminary Examination Report from PCT/US02/12889.

Chesson, Greg, "The Protocol Engine Project" Technology Focus Sep. 1987.

Chesson, Greg, "Proceedings of the Summer 1987 USENIX Conference" USENIX Association Jun. 8-12, 1987.

G. Chesson and L. Green, "XTP Protocol Engine VLSI for Real-Time LANS" EFOC/LAN Jun. 29-Jul. 1, 1968.

Stevens, Richard W., "TCP/IP Illustrated Volume" Addison-Wesley Professional Computing Series.

Abbot, Mark B., and Peterson, Larry L., "Increasing Network Throughput by Integrating Protocol Layers" IEEE 1993.

Wright, Maury, "Low-Cost Control LANs Add Automation to Homes, Autos, and Offices" EDN Jul. 20, 1992.

Preston, David J., "Internet Protocols Migrate to Silicon For Networking Devices" Electronic Design Apr. 14, 1997.

Muller, Raimund, "LON—das universelle Netzwerk" Electronik 22/1991.

Rang, Michael ad Tantawy, Ahmed, "A Design Methodology for Protocol Processors" IEEE 1995.

Banks, David and Prudence, Michael, "A High-Performance Network Architecture for a PA-RISC Workstation" IEEE Journal vol. II, No. 22 Feb. 1993.

Steenkiste, Peter, "A High-Speed Network Interface for Distributed-Memory Systems: Architecture and Applications" ACM Transactions on Computer Systems, vol. 15, No. 1 Feb. 1997.

Doumenis, Gr.A., Konstantoulakis, G.E., Reisis, D.I.and Stassinopoulos, G.I. "A Personal Computer Hosted Terminal Adapter For The Broadband Integrated Services Digital Network and Applications" National Technical University of Athens, Greece.

Womack, Lucas; Mraz, Ronald; Mendelson, Abraham, "A Study of Virtual Memory MTU Reassembly withing the PowerPC Architecture" IEEE 1997.

Steenkiste, Peter, "A Systematic Approach to Host Interface Design for High-Speed Networks" IEEE Mar. 1994.

Wittie, Larry D., Ma, Fanyuan, "A TCP/IP Communication Subsystem in Micros" IEEE 1987.

Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.

Gupta, Pankaj; McKeown, Nick, "Algorithms for Packet Classification" IEEE Network Mar./Apr. 2001.

Clark, David D.; Romkey, John; Salwen, Howard, "An Analysis of TCP Processing Overhead" IEEE 1988.

Clark, David D.; Jacobson, Van; Romkey, John; Salwen, Howard, "An Analysis of TCP Processing Overhead" IEEE Jun. 1989.

Goloi, W.K.; Behr, P. "An IPC Protocol and Its Hardware Realization For A High-Speed Distributed Multicomputer System" IEEE 1981.

Ames, Richard, "Building an Embedded Web Server from Scratch" Circuit Cellar INK Feb. 1998.

Legg, John, "Choosing and implementing an embedded TCP/IP Stack" Electronic Product Design Jan. 1999.

Orphanos, George; Birbas, Alexios; Petrellis, Nikos; Mountzouris, Ioannis; Malataras, Andreas, "Compensating for Moderate Effective Throughput at the Desktop" IEEE Communication Magazine Apr. 2000.

Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.

Varada, S.; Yang, Y.; Evans, D., "Data and Buffer Management in ATM Systems" TranSwitch Corporation.

Bonjour, Dominique; de Hauteclocque, Gaelle; le Moal, Jacques, "Design and Application of ATM LAN/WAN Adapters" IEEE 1998.

Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea.

Steenkiste, Peter, "Design, Implementation, and evaluation of a Single-copy Protocol Stack" Software—Practice and Experience, vol. 28, Jun. 1998.

Meleis, Hanafy E.; Serpanos, Dimitrios, N., "Designing Communication Subsystems for High-Speed Networks" IEEE Network Jul. 1992.

Doumenis, Gr. A.; Reisis, D.I.; Stassinopoulos, G.I., "Efficient Implementation of the SAR Sublayer and the ATM Layer in High-Speed Broadband ISDN Data Terminal Adapters" IEEE 1993.

Mora, F., Sebastia, A., "Electronic Design of a High Performance Interfacce to the SCI Network" IEEE 1998.

Eady, Fred, "Embedded Internet Part 2: TCP/IP and a 16-Bit Compiler" Embedded PC Jun. 1999.

Shivam, Piyush; Wyckoff, Pete; Panda, Dhabaleswar, "EMP: Zero-copy OS-bypass NIC-driven Gigabit Ethernet" SC2001 Nov. 2001, Denver CO, USA.

Mansour, Mohammad; Kayssi, Ayman, "FPGA-Based Internet Protocol Version 6 Router" IEEE 1998.

Smith, Jonathon M.; Traw, C. Brendan S., "Giving Applications Access to Gb/s Networking" IEEE Network Jul. 1993.

Traw, C. Brendan S.; Smith, Jonathan M., "Hardware/Software Organization of a High-Perfomance ATM Host Interface" IEEE 1993.

Nagata, Takahiko; Hosoda, Yamashita, Hiroyuki, "High-Performance TCP/IP/ATM Communication Board" NTT Information and Communication Systems Laboratories 1998.

Nagata, Takahiko; Hosoda, Yasuhiro; Yamahsita, Hiroyuki, "High-Performance TCP/IP/ATM Communication Boards:Driving Force for Various Multimedia Services" vol. 9 No. 6 Nov. 1997.

Jolitz, William Frederick, "High-Speed Networking: Header prediction and forward-error correction for very high-speed data transfer" Dr. Dobbs Journal, Aug. 1992.

Chiswell, Dave "Implementation Challenges for 155Mbit ATM Adapters" ISBN#0-7803-2636-9.

Wright, Maury "Intelligent Ethernet Boards" EDN Jun. 23, 1988.

Preston, David "Intetnet Protocols Migrate to Silicon For Networking Devices" Electronic Design Apr. 14, 1997.

Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.

Druschel, Peter; Abbot, Mark B.; Pagels, Michael A.; Peterson, Larry L., "Network Subsystem Design" IEEE Network Jul. 1993.

Huange, Jau-Hsiung; Chen, Chi-Wen, "On Performance Measurments of TCP/IP and its Device Driver" IEEE 1992.

Siegel, Martin; Williams, Mark; Robler, Georg, "Overcoming Bottlenecks in High-Speed Transport Systems" IEEE 1991.

Neufeld, Gerald W.; Ito, Mabo Robert; Goldberg, Murray; McCutcheon, Mark J.; Ritchie, Stuart, Paralleel Host Interface for an ATM Network IEEE Network Jul. 1993.

Maly, K.; Khanna, K.; Kukkamala, R.; Overstreet C.M.; Yerraballi, R.; Foundriat, E.C.; Madan, B., "Parallel TCP/IP For Multiprocessor Workstations" High Performance Netowrking, IV, 1993 IFIP.

Laskman, T.V.; Madhow, U., "Performance Analysis of Window-based Flow Control using TCP/IP:Effect of High Bandwidth Delay Products and Random Loss" High Performance Networking V. 1994 IFIP.

Ramakrishnan, K.K., "Performance Considerations in Designing Network Interfaces" IEEE Journal 1993.

Camarda, P.; Pipio, F.; Piscitelli, G.; "Performance evaluating of TCP/IP implementations in end systems" IEE Proc-Computer Digital Tech. vol. 146 No. 1 Jan. 1999.

Toyoshima, Kan; Shirakawa, Kazuhiro; Hayashi, Kazuhiro, "Programmable ATM Adapter: Rapid Prototyping of Cell Processing Equipment for ATM Network" IEEE 1997.

Blumrich, Matthias A.; Dubnicku, Cezary; Felton, Edward W.; Li, Kai, "Protected, User-level DMA for the SHRIMP Network Interface" IEEE 1996.

Feldmeier, David C.; McAuley, Anthony J.; Smith, Jonathan M.; Bakin, Deborah S.; Marcus, William S.; Raleigh, Thomas M., "Protocol Boosters" IEEE 1998.

Marcus, William S.; Hadzic, Ilija; McAuley, Anthony J.; Smith, Jonathan M., "Protocol Boosters: Applying Programmability to Network Infrastructures" IEEE Communications Magazine Oct. 1998.

Korablum, Deborah F., "Protocol Implementation and Other Performance Issues for Local and Metropolitan Area Networks" IEEE 1988.

Dittia, Zubin D.; Parulkar, Guru M.; Jr., Jerome R. Cox, "The APIC Approach to High Performance Network Interface Design: Protect4ed DMA and Other Techniques" IEEE 1997.

Rutsche, Erich, "The Architecture of a Gb/s Multimedia Protocol Adapter" ACM SIGCOMM Computer Communication Review.

Moldeklev, Kjersti; Klovning, Espen; Kure, Oivind, "The effect of end system hardware and software on TCP/IP throughput performance over a local ATM Network".

Kanakia, Hermant; Cheriton, David R., "The VMP Network Adapter Board (NAB) High Performance Network Communication for Multiprocessors" ACM 1988.

Chandrammenon, Grish P.; Varghese, George, "Trading Packet Headers for Packet Processing" IEEE 1996.

Nielson, Dr. Michael J.K., "TURBOchannel" IEEE 1991.

New Media News, www.newmedianews.com/02197/ts_inettuner.html.

Kelly, T. "Cheap Internet Hardware that Fits in Everything" ZDNet, www.zdnet.co.uk/news/1998/77/ns-5998.html.

Kitadeya et al. "Matsushita Launches WebTV Internet Connection Terminal" www.mei.co.jp/corp/news/official.data.dir/en981112-1/en981112-1html.

iReady Product Data Sheet, Internet Tuner.

Luijten, Ronald P., "An OC-12 ATM Switch Adapter Chipset" 1998 IEEE.

Case, "Implementing the Java Virtual Machine" Microdesign Resources, Mar. 25, 1996.

Storage Industry Networking Industry Association, "iSCSi Building Blocks for IP Storage Networking" SNIA IP Storage Forum.

International Committee for Information Technology Standards, "Development work conducted in T10-I/O Interface—Lower Level" ISO/IEC Sep. 12, 2002.

"Less Numerical Algorithms", Ch. 20.

Wayner, "Sun Gambles on Java Chips" Byte, Nov. 1996.

Office Action Summary from related Japanese application No. 2002/584131 which was mailed on Feb. 21, 2007.

S. Bellovin, "Defending Against Sewuence Number Attacks" Network Working Group Request for Comments: 1948 AT&T Research May 1996.

R. Braden, "Computing the Internet Checksum" Network Working Group Request for Comments: 1071 ISI Sep. 1988.

Office Action Summary from U.S. Appl. No. 10/741,972 which was mailed on May 2, 2007.

Supplementary European Search Report from European Application No. 02728953, dated Jun. 16, 2008.

Non-Final Office Action Summary from U.S. Appl. No. 11/614,046 mailed on May 25, 2010.

Final Office Action Summary from U.S. Appl. No. 11/614,046 mailed on Nov. 6, 2009.

EP Communication from Application No. 02 728 953.7-2416 dated Jan. 29, 2009.

Non-Final Office Action Summary from U.S. Appl. No. 11/614,046 mailed on Apr. 6, 2009.

EP Communication from Application No. 02 728 9853.7-2416 dated Jul. 13, 2010.

Non-Final Office Action from U.S. Appl. No. 10/741,972, dated Jan. 24, 2011.

Notice of Reasons for Rejection from Japanese Patent Application No. 2008-139758, dated Apr. 12, 2011.

Notice of Final Rejection from Japanese Patent Application No. 2008-139758, dated Oct. 25, 2011.

Decision to Grant from Japanese Patent Application No. 2008-139758, dated Jan. 10, 2012.

* cited by examiner

| | | |
|---|---|---|
| 3840 → | Block 0 | 0x0000<br>0x01FF |
| 3842 → | Block 1 | 0x0200<br>0x03FF |
| 3844 → | Block 2 | 0x0400<br>0x05FF |
| 3846 → | Block 3 | 0x0600<br>0x07FF |
| 3848 → | Block 4 | 0x0800<br>0x09FF |
| 3850 → | Block 5 | 0x0A00<br>0x0BFF |
| 3852 → | Block 6 | 0x0C00<br>0x0DFF |
| 3854 → | (not used) | 0x0E00<br>0x0FFB |

| 3856 → | | 0x0C00 | 0x0FFC |
|---|---|---|---|
| | 0x0A00 | 0x0800 | 0x0FFD |
| | 0x0600 | 0x0400 | 0x0FFE |
| | 0x0200 | 0x0000 | 0x0FFF |

*FIG. 38*

GIGABIT ETHERNET ADAPTER

CROSS REFERENCE TO RELATED APPLICATIONS

This application claims benefit of U.S. Provisional Patent Application Ser. No. 60/286,265, filed on Apr. 24, 2001.

BACKGROUND OF THE INVENTION

1. Technical Field

The invention relates to telecommunications. More particularly, the invention relates to a method and apparatus for processing data in connection with communication protocols that are used to send and receive data.

2. Description of the Prior Art

Computer networks necessitate the provision of various communication protocols to transmit and receive data. Typically, a computer network comprises a system of devices such as computers, printers and other computer peripherals, communicatively connected together. Data are transferred between each of these devices through data packets which are communicated through the network using a communication protocol standard. Many different protocol standards are in current use today. Examples of popular protocols are Internet Protocol (IP), Internetwork Packet Exchange (IPX), Sequenced Packet Exchange (SPX), Transmission Control Protocol (TCP), and Point to Point Protocol (PPP). Each network device contains a combination of hardware and software that translates protocols and process data.

An example is a computer attached to a Local Area Network (LAN) system, wherein a network device uses hardware to handle the Link Layer protocol, and software to handle the Network, Transport, and Communication Protocols and information data handling. The network device normally implements the one Link Layer protocol in hardware, limiting the attached computer to only that particular LAN protocol. The higher protocols, e.g. Network, Transport, and Communication protocols, along with the Data handlers, are implemented as software programs which process the data once they are passed through the network device hardware into system memory. The advantage to this implementation is that it allows a general purpose device such as the computer to be used in many different network setups and support any arbitrary network application that may be needed. The result of this implementation, however, is that the system requires a high processor overhead, a large amount of system memory, complicated configuration setup on the part of the computer user to coordinate the different software protocol and data handlers communicating to the computer's Operating System (O.S.) and computer and network hardware.

This high overhead required in processing time is demonstrated in U.S. Pat. No. 5,485,460 issued to Schrier et al on Jan. 16, 1996, which teaches a method of operating multiple software protocol stacks implementing the same protocol on a device. This type of implementation is used in Disk Operating System (DOS) based machines running Microsoft Windows. During normal operation, once the hardware verifies the transport or link layer protocol, the resulting data packet is sent to a software layer which determines the packets frame format and strips any specific frame headers. The packet is then sent to different protocol stacks where it is evaluated for the specific protocol. However, the packet may be sent to several protocols stacks before it is accepted or rejected. The time lag created by software protocol stacks prevent audio and video transmissions to be processed in real-time; the data must be buffered before playback. It is evident that the amount of processing overhead required to process a protocol is very high and extremely cumbersome and lends itself to applications with a powerful Central Processing Unit (CPU) and a large amount of memory.

Consumer products that do not fit in the traditional models of a network device are entering the market. A few examples of these products are pagers, cellular phones, game machines, smart telephones, and televisions. Most of these products have small footprints, eight-bit controllers, limited memory or require a very limited form factor. Consumer products such as these are simplistic and require low cost and low power consumption. The previously mentioned protocol implementations require too much hardware and processor power to meet these requirements. The complexity of such implementations are difficult to incorporate into consumer products in a cost effective way. If network access can be simplified such that it may be easily manufactured on a low-cost, low-power, and small form-factor device, these products can access network services, such as the Internet.

Communications networks use protocols to transmit and receive data. Typically, a communications network comprises a collection of network devices, also called nodes, such as computers, printers, storage devices, and other computer peripherals, communicatively connected together. Data is transferred between each of these network devices using data packets that are transmitted through the communications network using a protocol. Many different protocols are in current use today. Examples of popular protocols include the Internet Protocol (IP), Internetwork Packet Exchange (IPX) protocol, Sequenced Packet Exchange (SPX) protocol, Transmission Control Protocol (TCP), Point-to-Point Protocol (PPP) and other similar new protocols that are under development. A network device contains a combination of hardware and software that processes protocols and data packets.

In 1978, the International Standards Organization (ISO), a standards setting body, created a network reference model known as the Open System Interconnection (OSI) model. The OSI model includes seven conceptual layers: 1) The Physical (PHY) layer that defines the physical components connecting the network device to the network; 2) The Data Link layer that controls the movement of data in discrete forms known as frames that contain data packets; 3) The Network layer that builds data packets following a specific protocol; 4) The Transport layer that ensures reliable delivery of data packets; 5) The Session layer that allows for two way communications between network devices; 6) The Presentation layer that controls the manner of representing the data and ensures that the data is in correct form; and 7) The Application layer that provides file sharing, message handling, printing and so on. Sometimes the Session and Presentation layers are omitted from this model. For an explanation of how modern communications networks and the Internet relate to the ISO seven-layer model see, for example, chapter 11 of the text "Internetworking with TCP/IP" by Douglas E. Comer (volume 1, fourth edition, ISBN 0201633469) and Chapter 1 of the text "TCP/IP Illustrated" by W. Richard Stevens (volume 1, ISBN 0130183806).

An example of a network device is a computer attached to a Local Area Network (LAN), wherein the network device uses hardware in a host computer to handle the Physical and Data Link layers, and uses software running on the host computer to handle the Network, Transport, Session, Presentation and Application layers. The Network, Transport, Session, and Presentation layers, are implemented using protocol-processing software, also called protocol stacks. The Application layer is implemented using application software that process the data once the data is passed through the network-device hardware and protocol-processing software. The advantage to this software-based protocol processing implementation is that it allows a general-purpose computer to be used in many different types of communications networks and supports any applications that may be needed. The result of this software-based protocol processing implementation, however, is that the overhead of the protocol-processing software, running on the Central Processing Unit (CPU) of the host computer, to process the Network, Transport, Session and Presentation layers is very high. A software-based protocol processing implementation also requires a large amount of memory on the host computer, because data must be copied and moved as the software processes it. The high overhead required by protocol-processing software is demonstrated in U.S. Pat. No. 5,485,460 issued to Schrier et al. on Jan. 16, 1996, which teaches a method of operating multiple software protocol stacks. This type of software-based protocol processing implementation is used, for example, in computers running Microsoft Windows.

During normal operation of a network device, the network-device hardware extracts the data packets that are then sent to the protocol-processing software in the host computer. The protocol-processing software runs on the host computer, and this host computer is not optimized for the tasks to be performed by the protocol-processing software. The combination of protocol-processing software and a general-purpose host computer is not optimized for protocol processing and this leads to performance limitations. Performance limitations in protocol processing, such as the time lag created by the execution of protocol-processing software, is deleterious and may prevent, for example, audio and video transmissions from being processed in real-time or prevent the full speed and capacity of the communications network from being used. It is evident that the amount of host-computer CPU overhead required to process a protocol is very high and extremely cumbersome and requires the use of the CPU and a large amount of memory in the host computer.

New consumer and industrial products that do not fit in the traditional models of a network device are entering the market and, at the same time, network speed continues to increase. Examples of these consumer products include Internet-enabled cell phones, Internet-enabled TVs, and Internet appliances. Examples of industrial products include network interface cards (NICs), Internet routers, Internet switches, and Internet storage servers. Software-based protocol processing implementations are too inefficient to meet the requirements of these new consumer and industrial products. Software-based protocol processing implementations are difficult to incorporate into consumer products in a cost effective way because of their complexity. Software-based protocol processing implementations are difficult to implement in high-speed industrial products because of the processing power required. If protocol processing can be simplified and optimized such that it may be easily manufactured on a low-cost, low-power, high-performance, integrated, and small form-factor device, these consumer and industrial products can read and write data on any communications network, such as the Internet.

A hardware-based, as opposed to software-based, protocol processing implementation, an Internet tuner, is described in J. Minami; R. Koyama; M. Johnson; M. Shinohara; T. Poff; D. Burkes; *Multiple network protocol encoder/decoder and data processor*, U.S. Pat. No. 6,034,963 (Mar. 7, 2000) (the '963 patent). This Internet tuner provides a core technology for processing protocols.

It would be advantageous to provide a gigabit Ethernet adapter that provides a hardware solution to high network communication speeds. It would further be advantageous to provide a gigabit Ethernet adapter that adapts to multiple communication protocols.

SUMMARY OF THE INVENTION

The invention provides a gigabit Ethernet adapter. The system provides a compact hardware solution to handling high network communication speeds. In addition, the invention adapts to multiple communication protocols via a modular construction and design.

A preferred embodiment of the invention provides a provides a low-cost, low-power, easily manufacturable, small form-factor network access module which has a low memory demand and provides a highly efficient protocol decode. The invention comprises a hardware-integrated system that both decodes multiple network protocols in a byte-streaming manner concurrently and processes packet data in one pass, thereby reducing system memory and form factor requirements, while also eliminating software CPU overhead.

A preferred embodiment of the invention comprises a plurality of protocol state machines that decode network protocols such as TCP, IP, User Datagram Protocol (UDP), PPP, Raw Socket, RARP, ICMP, IGMP, iSCSI, RDMA, and FCIP concurrently as each byte is received. Each protocol handler parses, interprets, and strips header information immediately from the packet, requiring no intermediate memory.

The invention provides an Internet tuner core, peripherals, and external interfaces. A network stack processes, generates and receives network packets. An internal programmable processor controls the network stack and handles any other types of ICMP packets, IGMP packets, or packets corresponding to other protocols not supported directly by dedicated hardware.

A virtual memory manager is implemented in optimized, hardwired logic. The virtual memory manager allows the use of a virtual number of network connections. The virtual number of network connections is limited only by the amount of internal and external memory available.

Any outgoing network packets are created by data state machines and passed through the network protocol state machine which adds formats to the packet, and checksums the information header information, and forwards the resulting network packet via a physical transport level mechanism.

The hardware gate level implementation provides a modular, embeddable design whereupon the designer may pick and choose the functionality that the particular application requires and still retain a low cost, low power, small form factor.

Other aspects and advantages of the invention will become apparent from the following detailed description in combination with the accompanying drawings, illustrating, by way of example, the principles of the invention.

BRIEF DESCRIPTION OF THE DRAWINGS

FIG. 38 is a block schematic diagram of an exemplary m1 memory map according to the invention.

DETAILED DESCRIPTION OF THE INVENTION

The invention is embodied in a gigabit Ethernet adapter. A system according to the invention provides a compact hardware solution to handling high network communication speeds. In addition, the invention adapts to multiple communication protocols via a modular construction and design.

Figure 1:
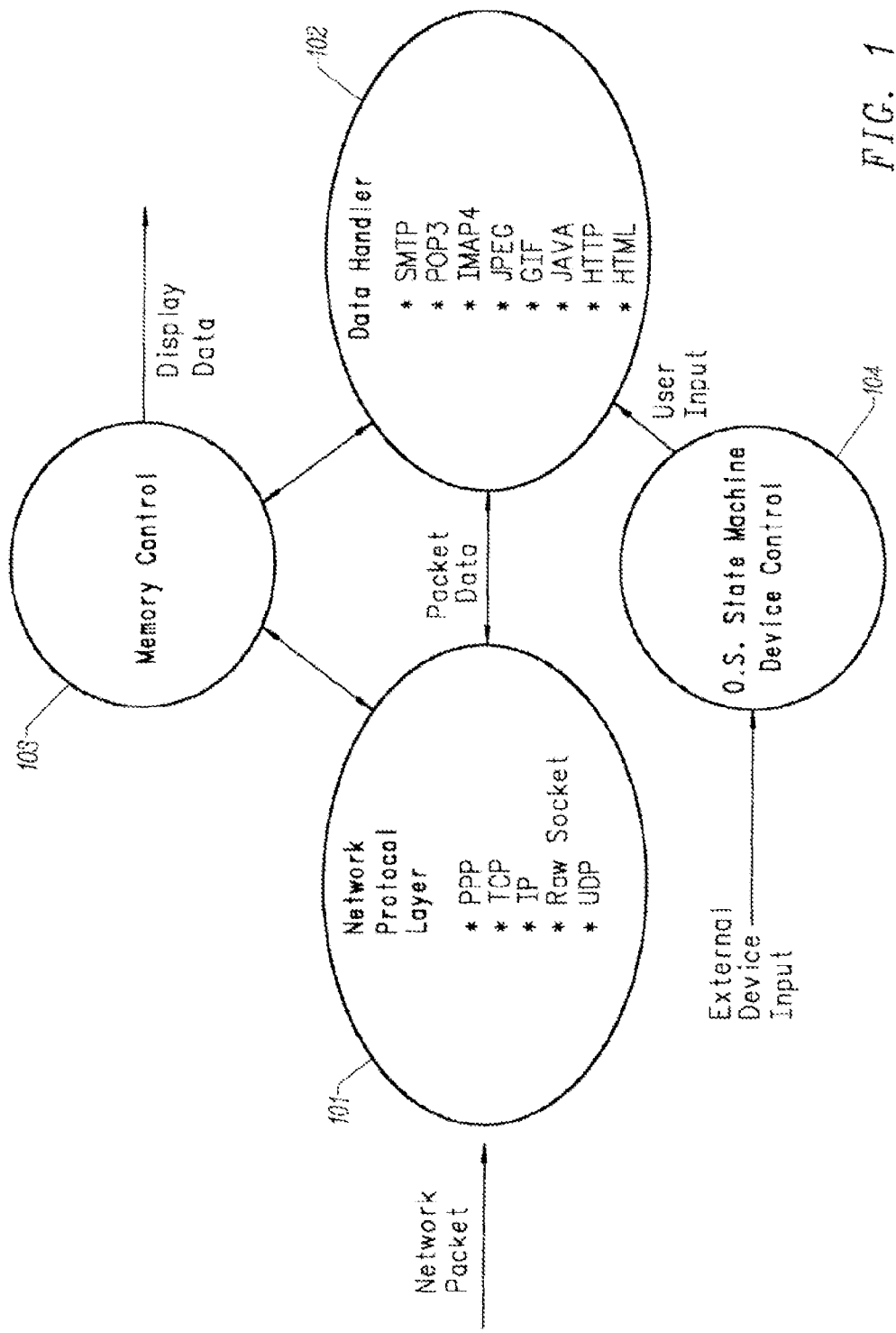
FIG. 1 is a high-level data flow diagram of the core system according to the invention.

Referring to FIG. 1, the invention comprises a Network Protocol Layer 101, a Data Handler 102, a Memory Control module 103, and an Operating System (O.S.) State Machine module 104, each implemented at the hardware gate level. The Network Protocol Layer 101 decodes incoming and encodes outgoing network packets. The Network Protocol Layer 101 comprises a plurality of state machines representing different network protocol stacks (i.e. PPP, TCP, IP, UDP, and Raw Socket) which simultaneously decode incoming network packets. The implementation of the protocol stacks in gate level logic allows the real time decoding of the network packet as the packet is received, thereby requiring no temporary memory storage. After all of the packet header information is stripped out and verified by the state machines, the resulting data is passed to the Data Handler 102. The Data Handler 102 comprises a plurality of state machines, each of which process a specific data type (i.e. HTTP, email formats (Post Office Protocol (POP3), Internet Message Access Protocol (IMAP4), Simple Mail Transfer Protocol (SMTP)), graphics standards (Joint Photographic Experts Group (JPEG), Graphics Interchange Format (GIF)), Java, and HTML). The gate level implementation of the data handlers enable the invention to concurrently process received data in real time and is especially suitable for applications which handle streams of data as they are received, i.e. Java, HTML, POP3 email, and audio and video applications. Any data that are required by more than one data state machine are provided in a concurrent manner. Any data required more than once by a specific data state machine are placed in a specific memory location with a pointer designating them. All memory accesses are arbitrated through the Memory Control module 103. Any resulting display data are also routed through the Memory Control module 103. The O.S. State Machine 104, acts as an arbitrator between all of the state machines for resource control, system, and user interface. Any user input is interpreted by the O.S. State Machine and routed to the Data Handler 102.

As an example, a data handler that interprets HTML format could decode the HTML tags using a Cyclic Redundancy Check (CRC) calculation. HTML format contains character strings known as tags, which control the formatting of a subsequent block of text when displayed on a video output device. These tags may be efficiently decoded by generating a CRC number for a given tag and using said number to enable a formatting instruction. Such a decoding algorithm is suited for gate level implementation and provides for an HTML encoded document to be displayed on a video output device much more quickly than is currently possible.

Although the invention is described as being at the hardware gate level, one skilled in the art can readily appreciate that these functions may be implemented in many other ways such as Programmable Array Logic (PALs), General Array Logic (GALs), Read Only Memory (ROMs), and software.

Additionally, specific protocols and data types have been indicated and one skilled in the art can readily appreciate that the modularity of the invention does not limit it to those specific protocols or data types.

Figure 2:
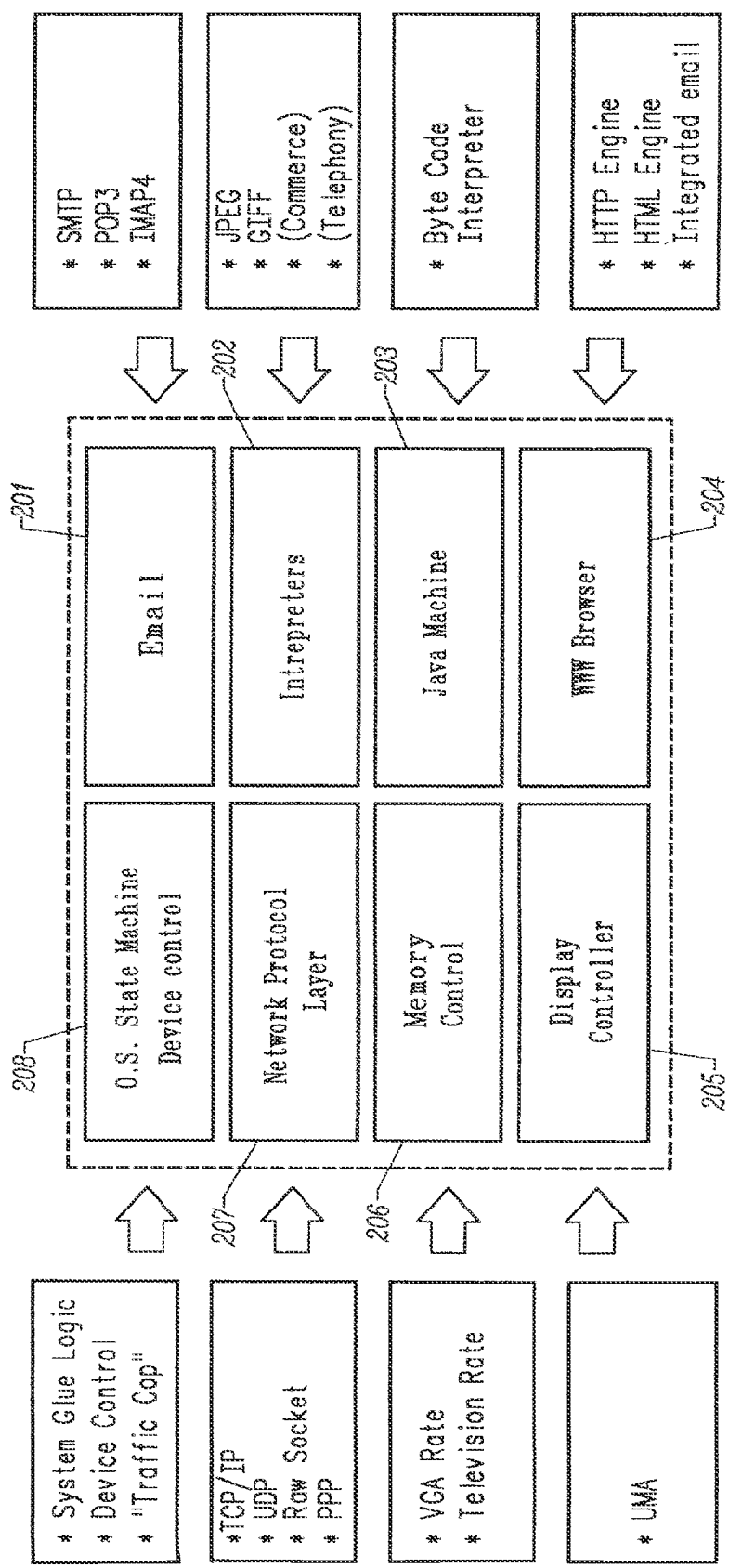
FIG. 2 is a high-level block diagram of a system according to the invention.

Turning to FIG. 2, the invention is represented in a high-level block diagram. This diagram describes the operational task of each module in a full implementation of the invention. The O.S. State Machine 208, contains the system "glue" logic, and the device control interface, and acts as a "traffic cop" between the state machines of the other modules. The Network Protocol Layer 207, contains state machines for TCP/IP, UDP, Raw Socket, and PPP protocols. The Memory Control module 206 contains the logic for the Unified Memory Architecture (UMA) which allows the system and video display memory to reside in the same memory area. A Display Controller 205 provides control of a VGA, television standard, or other type of display. Four data handlers are used in this implementation. An Email data handler 201 interprets both POP3 and IMAP4 formats. Interpreters 202 are implemented which decode JPEG and GIF formats (commerce and telephony standards may also be decoded). A Java Machine 203 is also included which interprets the Java language byte codes. The World-Wide Web (WWW) Browser 204, contains an HTML decoder/accelerator, HTTP Data handler and an integrated email state machine.

As an example, an incoming JPEG image packet is traced through the system, assuming a MODEM physical transport. The request starts with the user indicating a desire to download a given JPEG image by typing on keyboard 321. This input is interpreted by the keyboard interface 316 and passed to the O.S. State machine 315. O.S. State machine 315 processes the input and passes it as a command to the HTTP client 311. The HTTP client creates a request packet and passes it via the Port Decoder 309 to the TCP Layer 308. The TCP Layer prepends the appropriate TCP header and passes it to the IP Layer 307. The IP layer then prepends the appropriate IP header and passes the packet to the PPP Layer 306. The PPP Layer prepends the appropriate header, appends an FCS, and passes the data to the Physical Transport Interface 305. The Physical Transport Interface serializes the data into a bit stream and sends the packet to the MODEM unit 304. When the request is accepted by the host server, it sends the requested JPEG image back to the client system. The data are first received by the MODEM 304 which indicates to the Physical Transport Interface 305 that data are present. The Physical Transport interface then reads the bit serial data from the MODEM, converts it to a parallel byte data, and indicates to the PPP Layer 306 that data are present. The PPP Layer reads in the received bytes. When it detects a valid start byte, it begins to parse the incoming bytes. When the byte stream reaches the PPP protocol field, the PPP Layer decodes it, and in this example decodes the embedded packet as being of type IP. In response to this protocol byte, the PPP Layer enables the IP Layer 307 and indicates to it that IP data are being received. All further data bytes received are now passed directly to the IP Layer. The IP Layer then begins to parse the incoming data bytes. When it comes to the IP header protocol field, it determines which higher protocol to enable. In this example, the IP Layer decodes the protocol field as being of type TCP. At this point, the IP Layer enables the TCP Layer 308 and indicates to it when TCP data are being received. When this indicator goes active, all further data bytes in the received packets are sent to both the IP and TCP Layers (IP Layer needs the data bytes to complete checksum calculations). The TCP Layer then begins to parse the incoming data bytes. When it comes to the TCP header destination port field, it determines which data handler to enable. In this example, the PORT field decodes to the HTTP client 311. At this point, the PORT decoder enables the HTTP client and indicate to it that HTTP requested data are being received. The HTTP client then begins to parse received data bytes. When the HTTP client determines that the packet is of type JPEG image, the HTTP client enables the JPEG decoder 313. At this point, all data bytes are now routed to the JPEG decoder. The JPEG decoder then receives all further incoming data bytes and processes them accordingly. The resulting decoded image is sent to the display memory via the Memory Controller 312 to be processed by the Display Controller 324 for output to display device 326.

Figure 3:
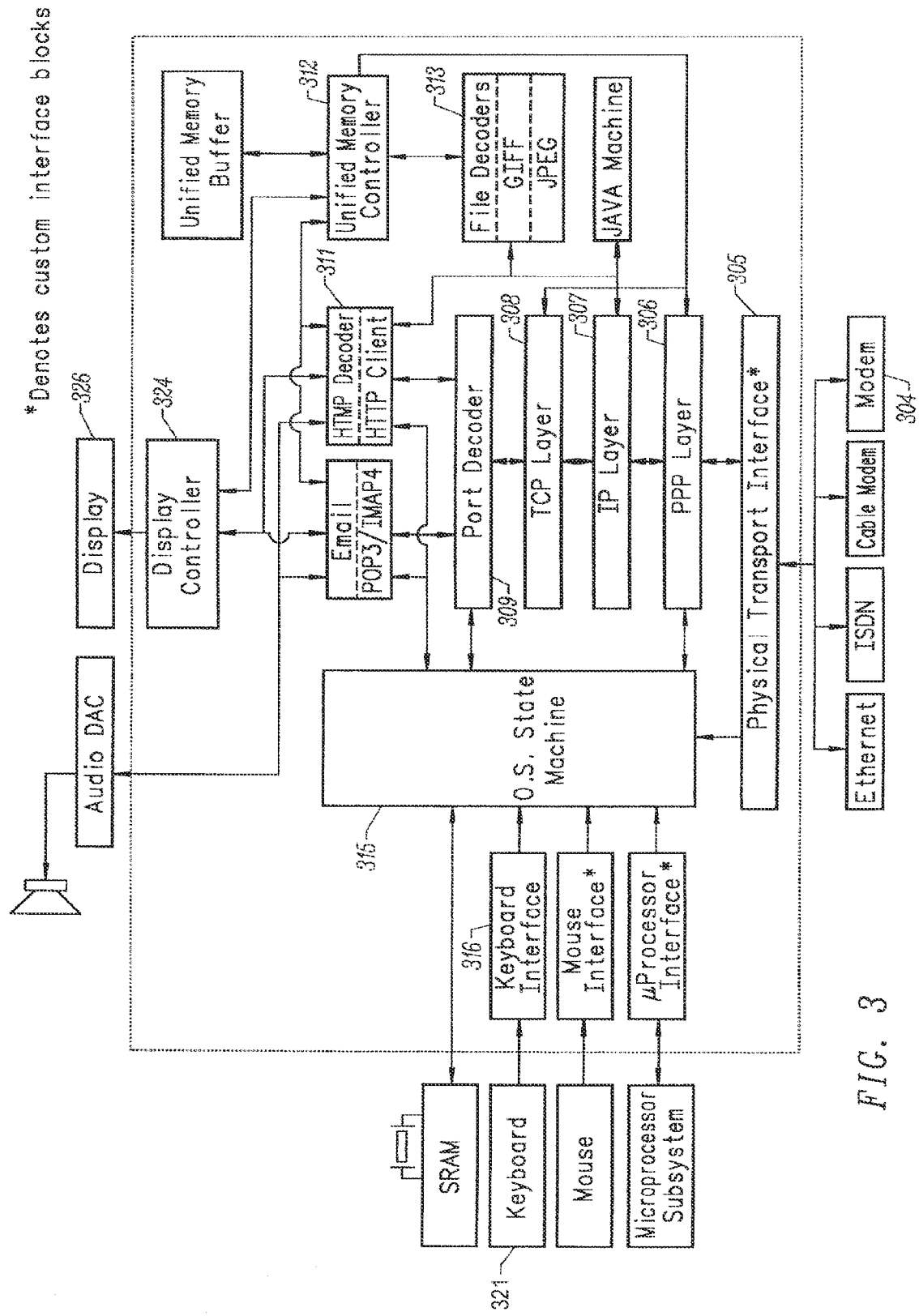
FIG. 3 is a functional block diagram of a complete system implementation according to the invention.
Figure 3A:
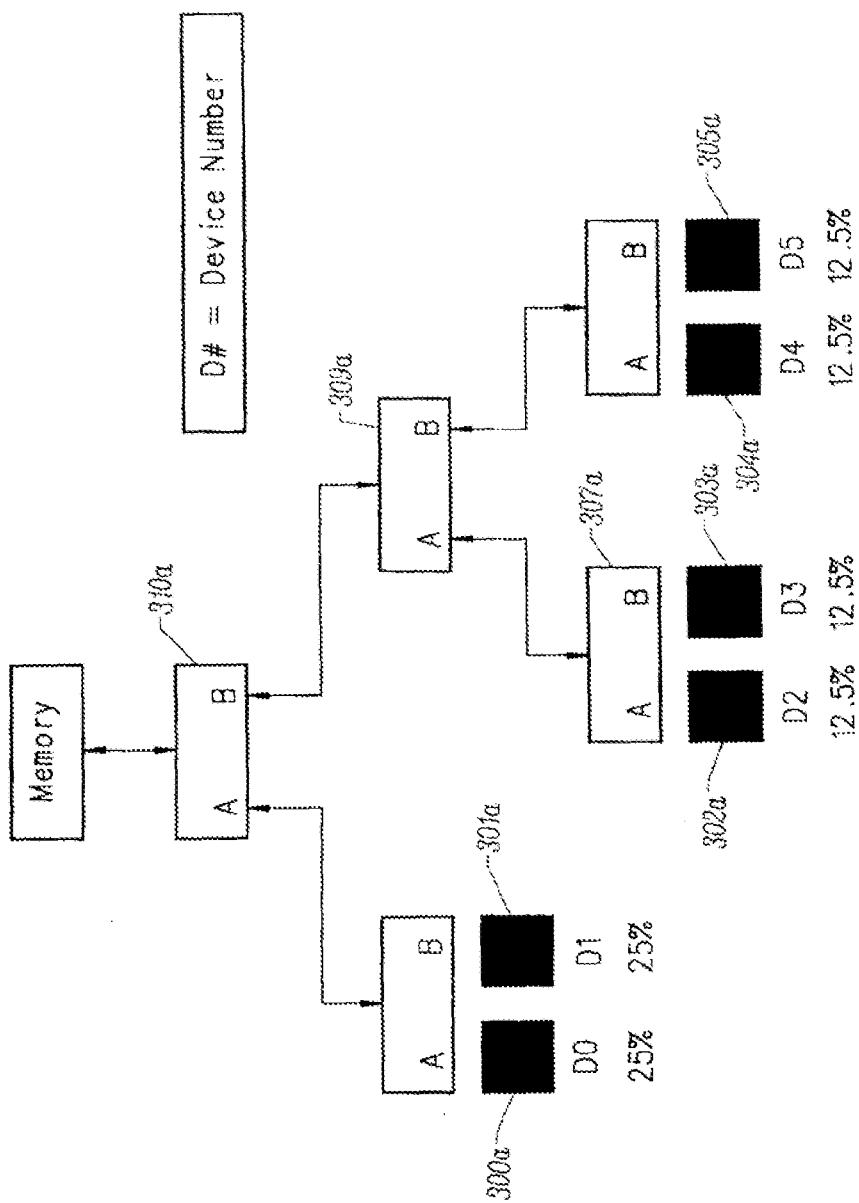
FIG. 3A is a functional block diagram of the UMA memory controller according to the invention.

As also noted in FIG. 3, various layers need access to a shared memory resource. All memory accesses are arbitrated by a single memory controller. This memory controller determines which layer or handler has access at any given cycle to the unified memory buffer. This memory controller is needed due to the fact that all system and display memory buffers are shared within a single memory buffer unit. The unified memory controller 312 takes read and write requests from the various layers, arbitrates the requests based on a dynamic rotating arbitration scheme with fixed priority weighting. This algorithm is depicted in FIG. 3A. If, in the pictured configuration, device D2 302A and device D3 303A both request memory access at the same time, then the arbitor 307A awards the cycle to the device that has not had the most recent memory access. The arbiter 307A then passes its memory request to the A input arbitor 309A. If the B input on arbitor 309A is idle, then the request is passed up to the B input of arbitor 310A. If the A input to the arbitor 310A is idle, then the request is made to the memory unit. All arbitration determinations are performed using combinatorial logic, thereby eliminating any wait states to any device if no other memory requests are being made. Priority weighting is assigned by configuring the arbitration tree structure. In FIG. 3A, Device DO 300A and Device DI 301A each have 25% priority weighting meaning that if all devices requested constant memory usage, they would each win the arbitration 25% of the time. Devices D2 302A, D3 303A, D4 304A, and D5 305A each have 12.5% priority weighting. The memory controller design is simplified by having each of the individual arbitration units having the same logic structure. In this scheme, the number of requesting devices, and their priority weighting can easily be configured by adding and arranging arbitor units.

Figure 4:
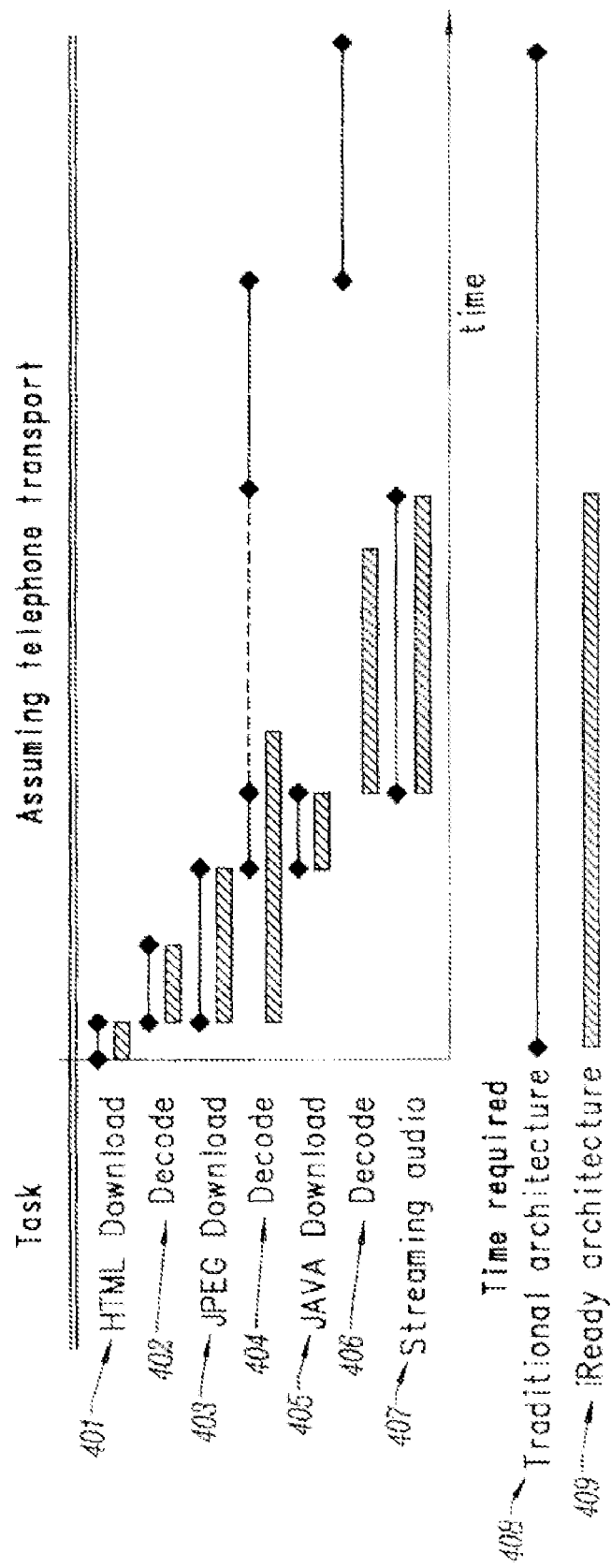
FIG. 4 is a time comparison chart illustrating data task time requirements for a traditional architecture and the invention.

Turning to FIG. 4, the speed advantages that the invention offers are much higher than the traditional architecture currently in use. The figure represents the time needed to complete each task. For a series of packets that require an HTML download 401, decode of the HTML 402, JPEG download 403, decode of the JPEG 404, JAVA download 405, decode of the JAVA bytes 406, and streaming audio 407, the total time required for these tasks is shown for the traditional architecture 408 and the invention (iReady architecture) 409. The invention 409 is significantly faster for these tasks than the traditional architecture 408.

Figure 5:
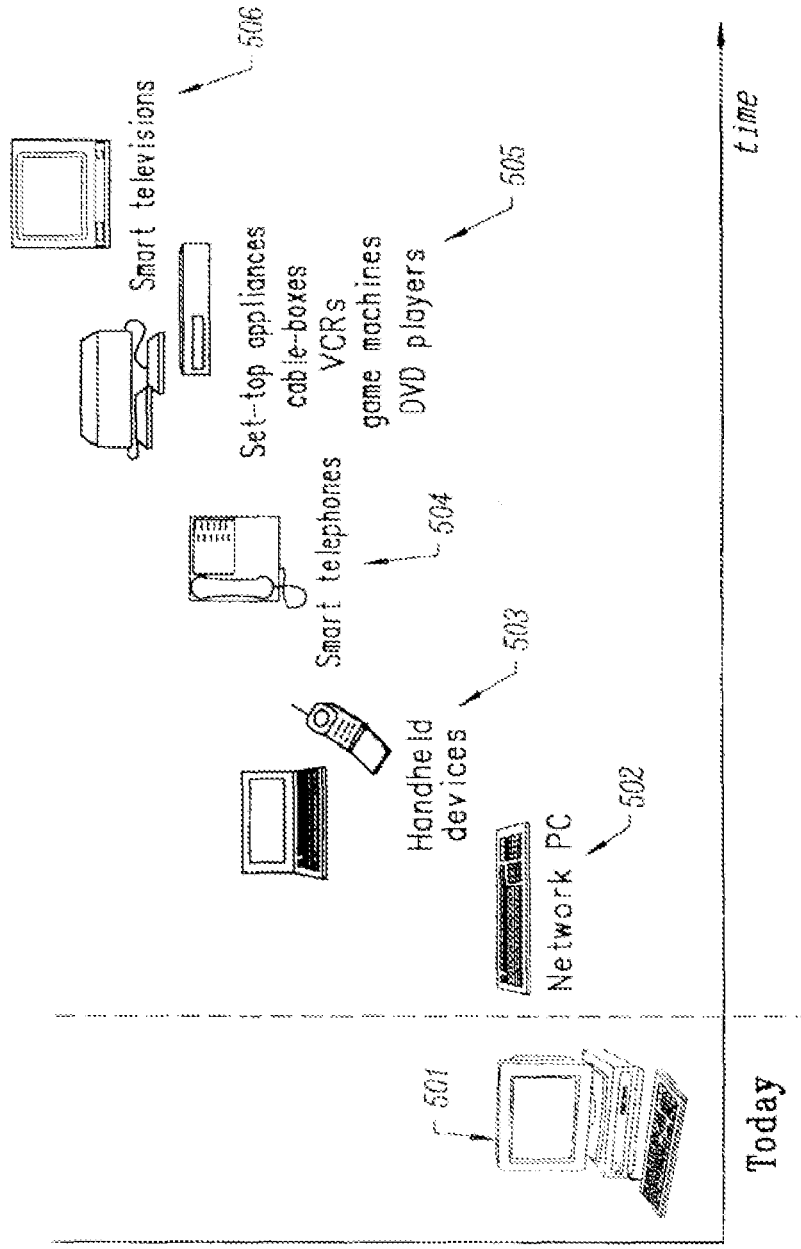
FIG. 5 illustrates the possible progression of applications according to the invention.

Turning to FIG. 5, the progression of applications for this type of network access is shown. Presently, the traditional model of the network client is being used, namely the computer 501. The consumer appliance concepts of the Network PC 502, handheld devices 503, smart telephones 504, set-top appliances 505, and smart televisions 506 are now becoming a reality. The invention provides these products with a cost-effective, space, speed, and power conscious network access.

Figure 6:
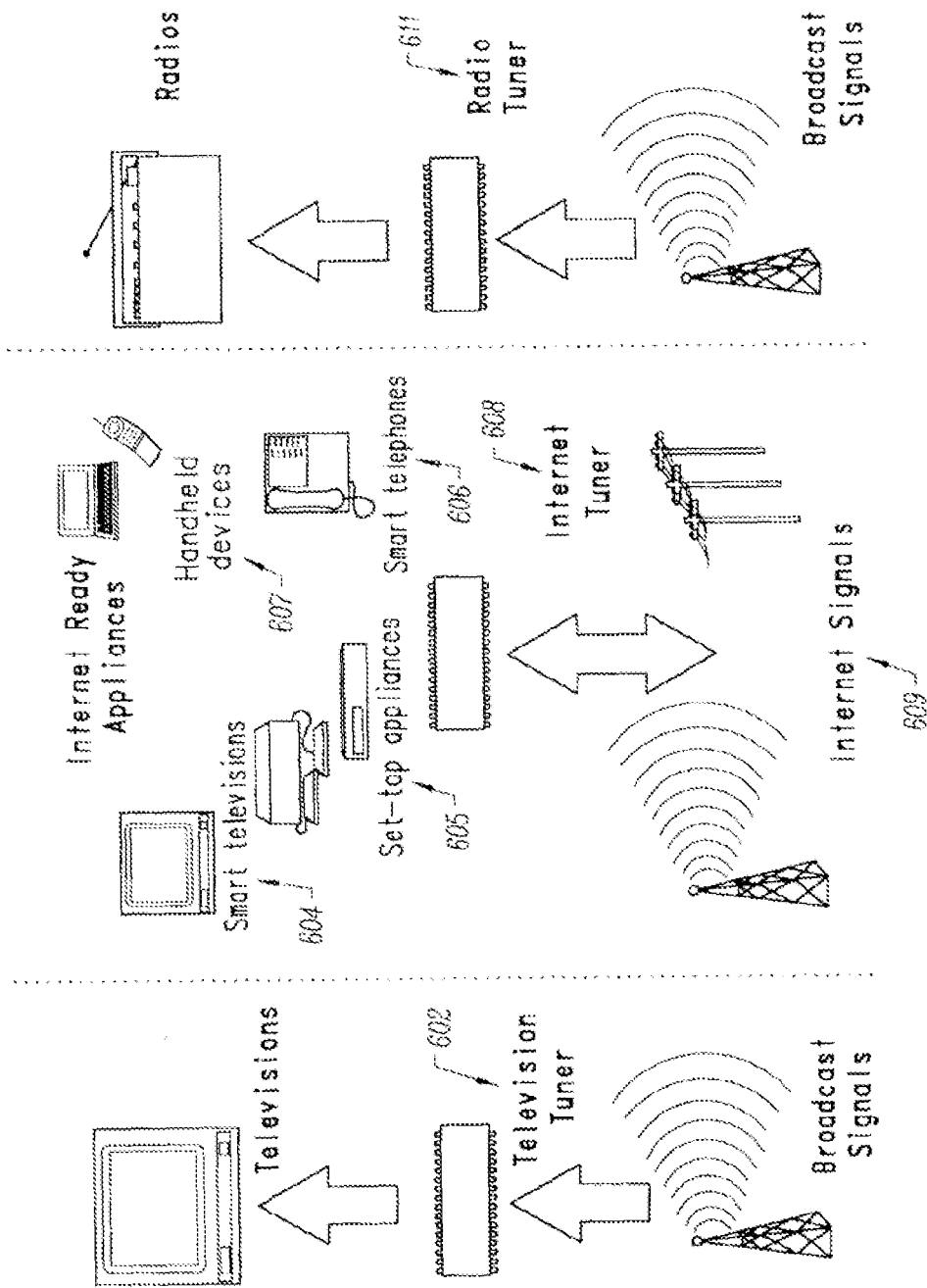
FIG. 6 illustrates the concept of an Internet Tuner according to the invention.

Referring to FIG. 6, the invention operates much like a television 602 or radio tuner 611—the signals (packets) are processed immediately without delay and sent to a display or audio output. The term Internet Tuner 608 is used to describe the invention as an analogy to such signal processing devices. The Internet Tuner 608 acts as the interface between the Internet signals 609 and application products such as smart televisions 604, set-top appliances 605, smart telephones 606, and handheld devices 607. It processes Internet signals 609 in real-time as do television 602 and radio tuners 611.

Figure 7:
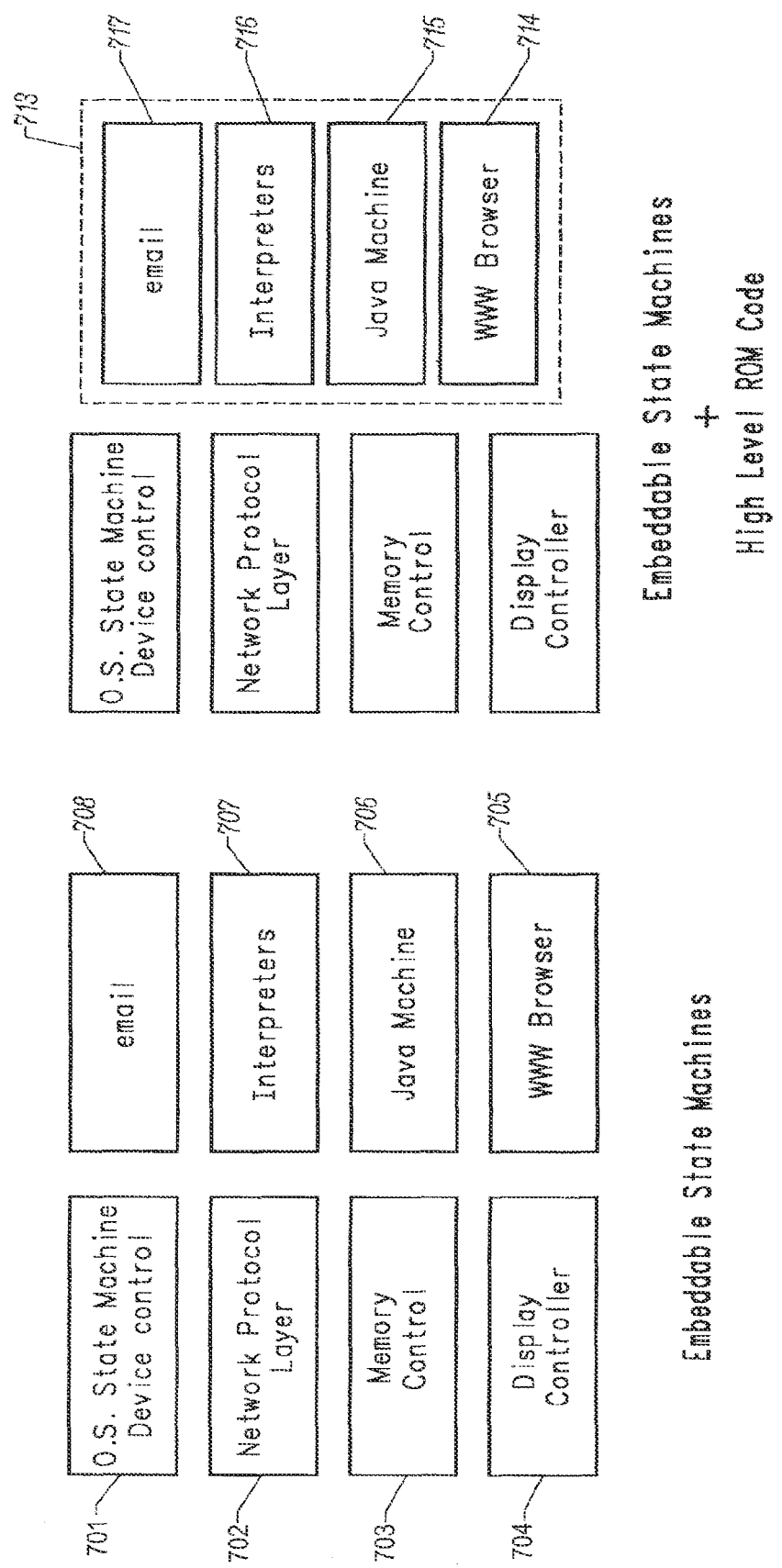
FIG. 7 illustrates two implementations according to the invention.

FIG. 7 illustrates that a full implementation of the invention using the O.S. State Machine 701, Network Protocol Layer 702, Memory Control 703, Display Controller 704, email data handler 708, Interpreters 707, Java Machine 706, and WWW Browser 705 may be separated into two separate modules. The modularity of the invention allows functions such as the data handlers 713 (email data handler 717, Interpreters 716, Java Machine 715, and WWW Browser 714) to be separated and placed into a high-level ROM code for certain applications.

The following application examples further illustrate the versatility of the modular design of the invention.

Figure 8:
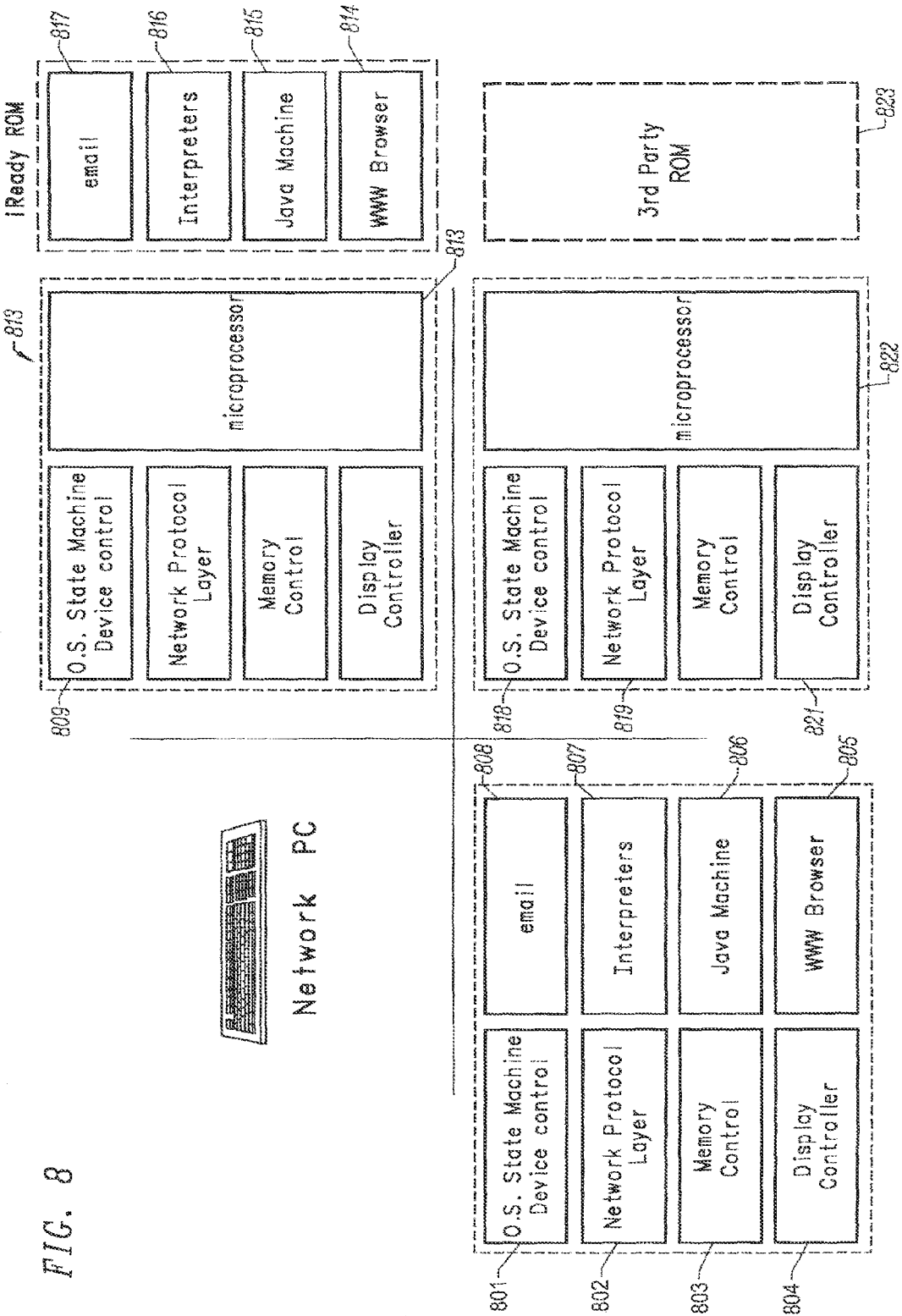
FIG. 8 illustrates Network PC implementations according to the invention.

FIG. 8 demonstrates the possible configurations of the invention for a Network PC. One variation includes the O.S. State Machine 801, Network Protocol Layer 802, Memory Control 803, Display Controller 804, email data handler 808, Interpreters 807, Java Machine 806, and the WWW Browser 805. This can be varied by placing the data handlers for email 817, Interpreters 816, Java Machine 815, and WWW Browser 814 code into high-level ROM running on a microprocessor 813. The microprocessor 813 communicates through the O.S. State Machine 809 for network and display functions. A third variation allows a microprocessor 822 running off of a 3rd Party ROM 823 to interpret the data coming from the Network Protocol Layer 819 and O.S. State Machine 818. The microprocessor 822 displays data through the Display Controller 821.

Figure 9:
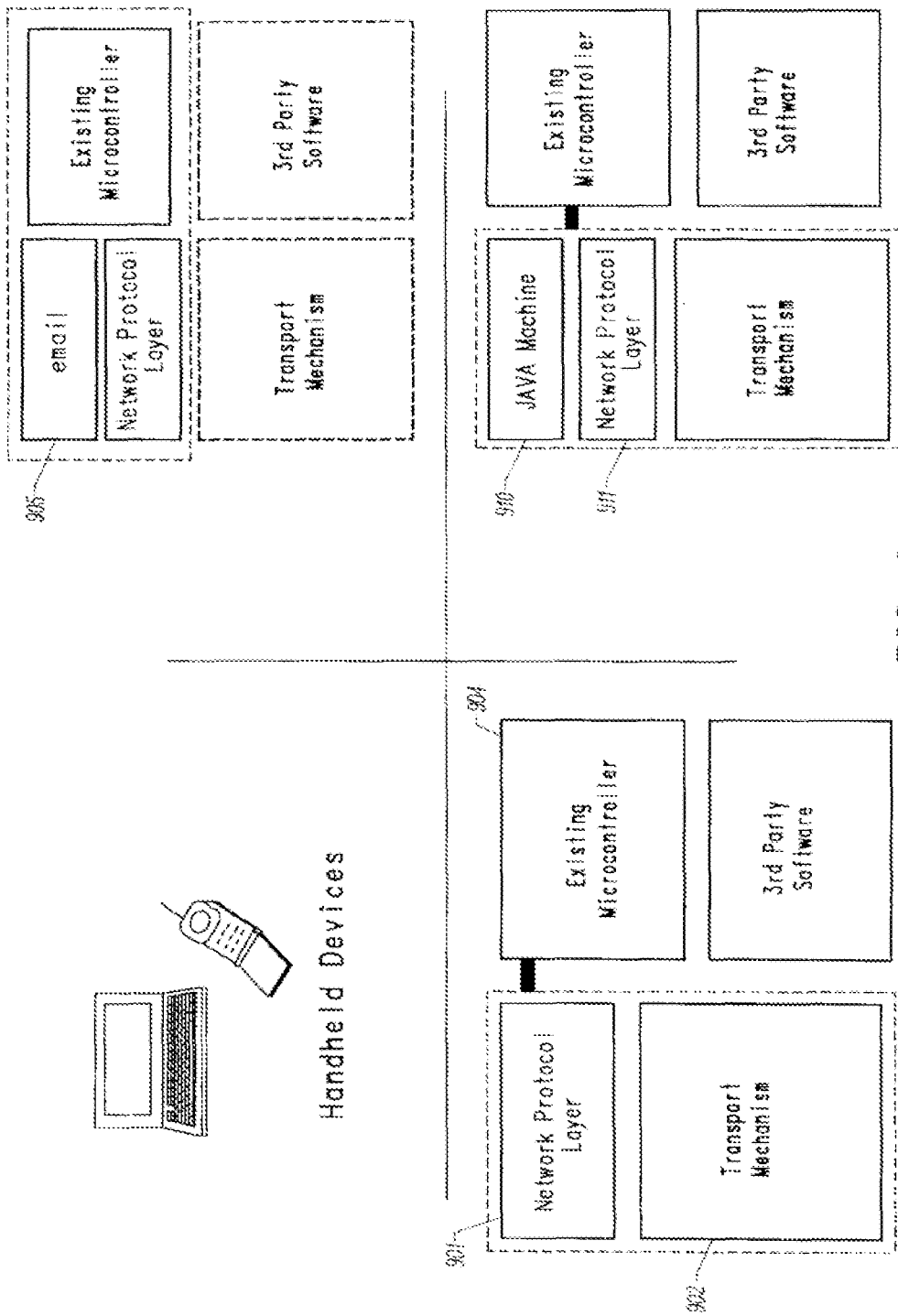
FIG. 9 illustrates Handheld Devices implementations according to the invention.

Turning to FIG. 9, a handheld device may use only the Network Protocol Layer 901 and interface it to a custom Transport Mechanism 902 and Existing Microcontroller 904. Email functions may be added by including the email data handler 905 in the configuration. Further demonstrating the modularity of the invention, the Network Protocol Layer 911 and Java Machine 910 may be added to a handheld device, thereby allowing it to process Java applets.

Figure 10:
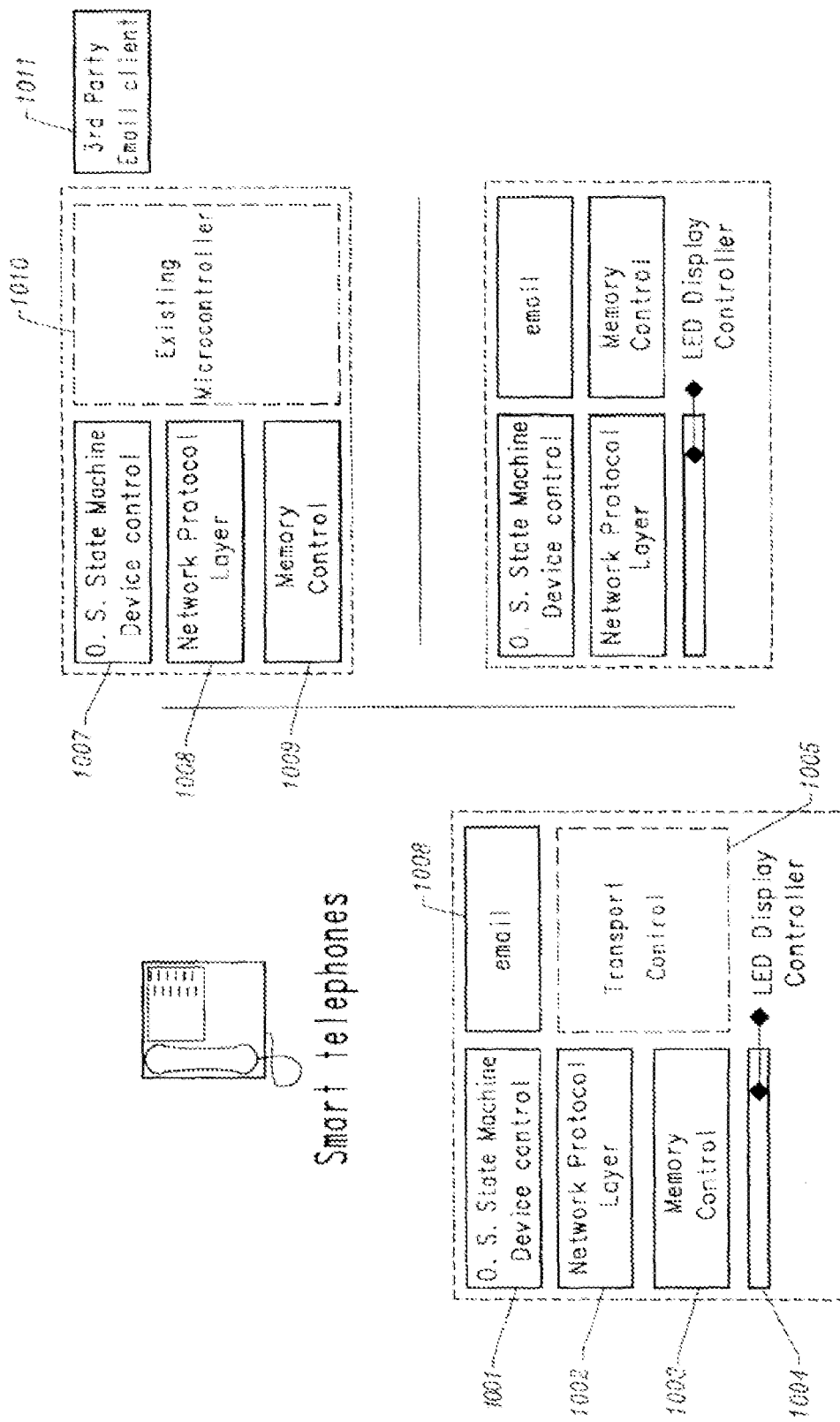
FIG. 10 illustrates Smart Telephone implementations according to the invention.

Referring to FIG. 10, smart telephones may add email capabilities by implementing the O.S. State Machine 1001, Network Protocol Layer 1002, Memory Control 1003, email data handler 1006, and Display Controller 1004. The Display Controller 1004 is capable of controlling Light Emitting Diode (LED), Liquid Crystal Display (LCD) displays, or big-mapped displays. A Physical Transport Control 1005 may optionally be added, depending on the connectivity requirements of the smart telephone. The O.S. State Machine 1007, Network Protocol Layer 1008, and Memory Controller 1009 may be added to smart telephones with an existing microcontroller 1010. The microcontroller 1010 performs email functions using a 3rd Party email client code 1011.

Figure 11:
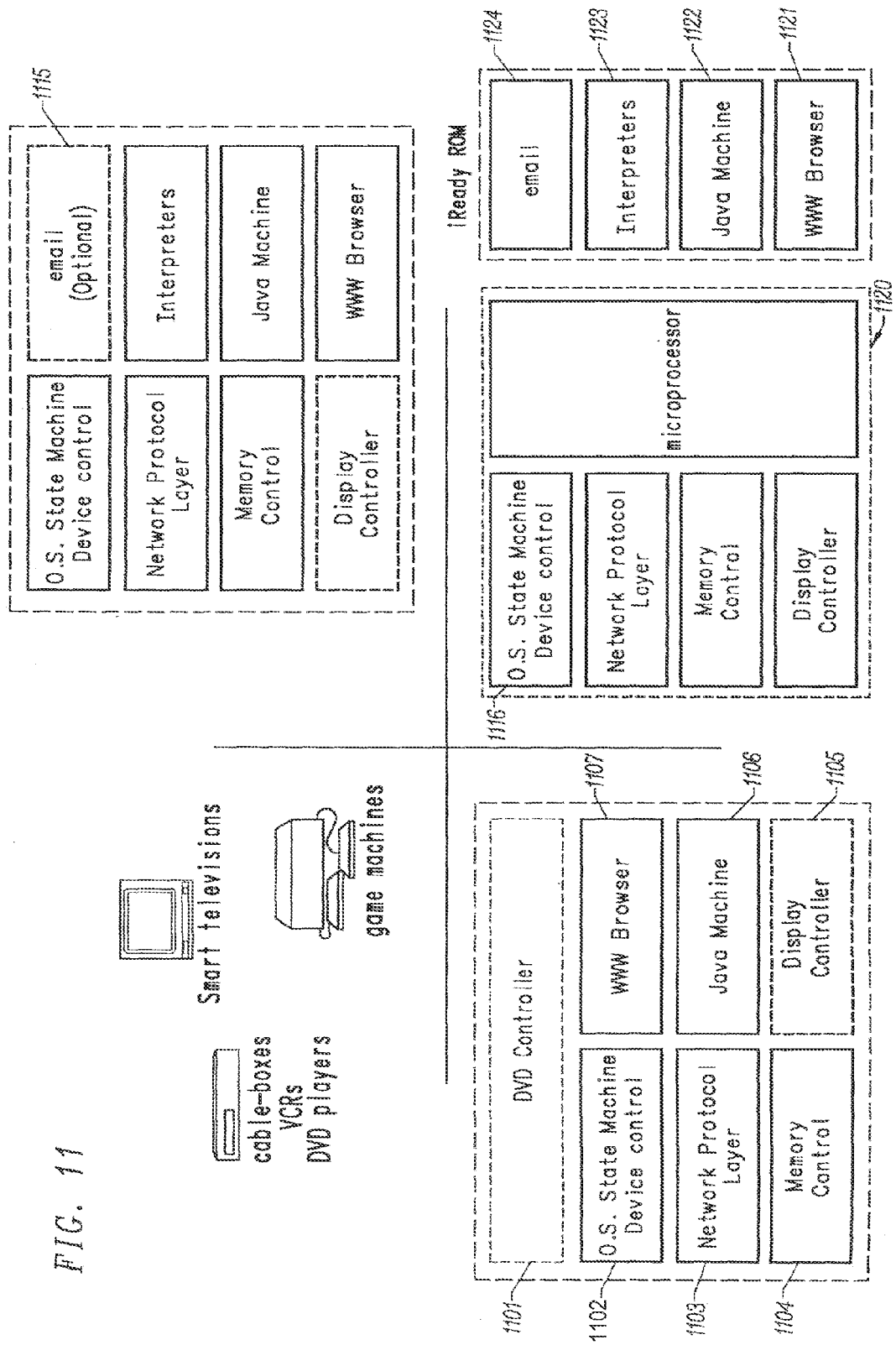
FIG. 11 illustrates Smart Television, cable-box, Video Cassette Recorder (VCR), Digital Video Disc (DVD) and game machine implementations according to the invention.

Turning finally to FIG. 11, smart televisions, cable-boxes, Video Cassette Recorders (VCRs), Digital Video Disc (DVD) players, and game machines can take advantage of the network accessibility offereNety the invention. The O.S. State Machine 1102, Network Protocol Layer 1103, Memory Controller 1104, WWW Browser 1107, Java Machine 1106, and (optionally) the Display Controller 1105 are interfaced to an existing controller 1101. If a controller 1101 is not present, the Display Controller 1105 is used. Email 1115 functions are easily added due to the modularity of the invention. As noted previously, the data handlers for email 1124, Interpreters 1123, Java Machine 1122, and WWW Browser 1121 code are optionally placed into high level ROM running on a microprocessor 1120. The microprocessor 1120 communicates through the O.S. State Machine 1116 for network and display functions.

Example of Packet Reception

Figure 12:
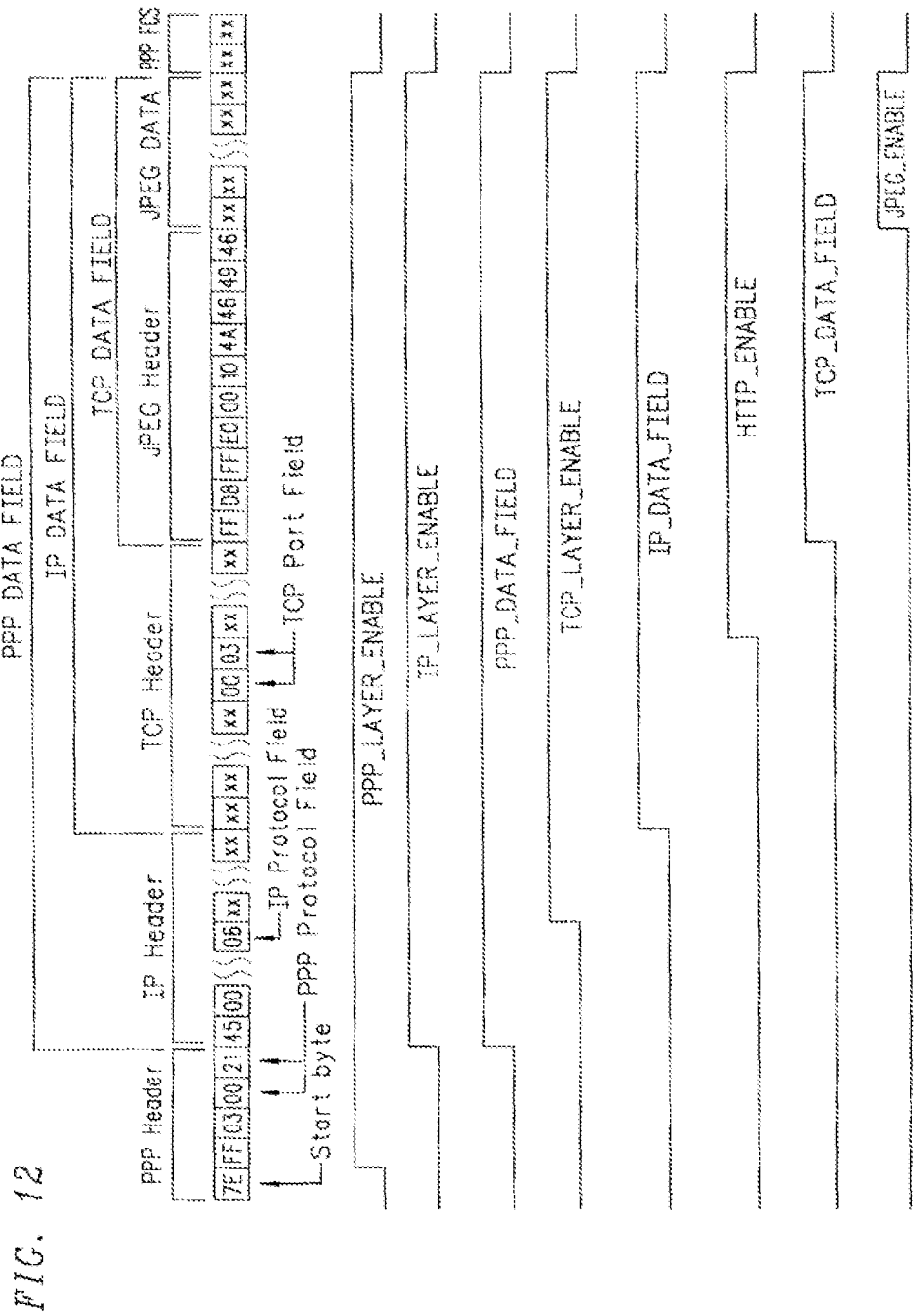
FIG. 12 is a timing diagram sharing a received packet according to the invention.

FIG. 12 depicts a received network packet. The packet contains the following items as shown from left to right:
PPP header
IP header
TCP header
JPEG Data
PPP FCS (Field Checksum)

Figure 13:
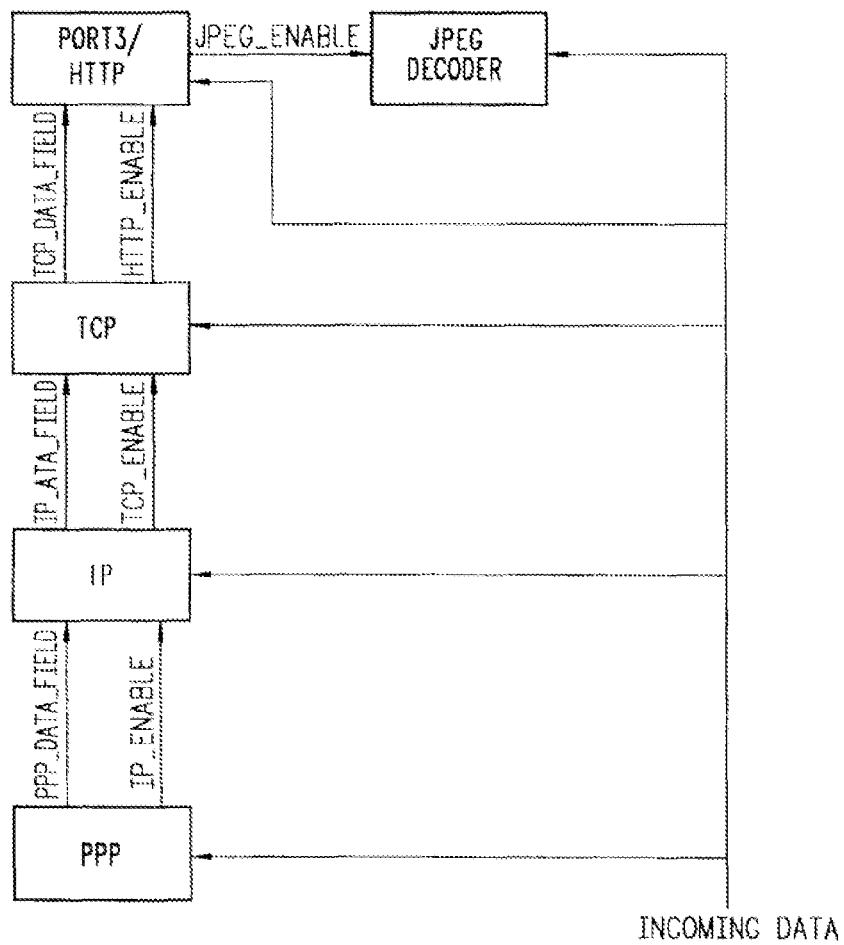
FIG. 13 is a block schematic diagram showing signal flow for the packet of FIG. 12 according to the invention.

The line labeled PPP LAYER ENABLE is activated when a valid start byte is detected, and is generated within the PPP block in FIG. 13. Once this line goes high, the rest of the PPP block is activated. Within the PPP header is a field indicating the type of protocol that the PPP packet is encapsulating. In an uncompressed PPP header, these are bytes 4 and 5 (counting the start byte 0.times.7e). In FIG. 12, these bytes are 0.times.00 and 0.times.21 indicating that the encapsulated data is an IP packet. After decoding this field, the PPP block activates the IP LAYER ENABLE and PPP DATA FIELD signals, which together enable the IP block in FIG. 13. The IP LAYER ENABLE line is decoded from the PPP protocol field, and the PPP DATA FIELD line indicates that the incoming data byte stream is in the data field portion of the network packet. These two lines must be active for the IP block to be enabled. Once the IP block is enabled, it starts to parse the incoming data bytes. Referring back to FIG. 12, the data immediately following the PPP header is the IP header. Within the IP header is a field indicating the type of data that is encapsulated within the IP packet. In FIG. 12, this field is shown to be 0×06 indicating that the encapsulated data is a TCP packet. The TCP LAYER ENABLE line is activated in response to the IP block decoding this field. The IP DATA FIELD line goes active a couple of bytes later, because there are some bytes that come between the IP header protocol field and the start of the IP data field. The IP DATA FIELD signal indicates that the incoming data byte stream is in the data field portion of the network packet. Both the TCP LAYER ENABLE and IP DATA FIELD lines must be active in order for the TCP block in FIG. 13 to be enabled. Once the TCP block is enabled, it starts to parse incoming data bytes. Referring back to FIG. 12, the data immediately following the IP header is the TCP header. Within the TCP header is a 2 byte field for the destination port. This field indicates which application or data handler the encapsulated data is meant for. In FIG. 12, this field decodes to port 0.times.0003. In FIG. 13, port 3 is designated as the HTTP port. After decoding the destination port field within the TCP header, the HTTP ENABLE line is activated, The TCP DATA FIELD line is activated a couple of bytes later because there are some intermediate bytes between the destination port field and the start of the TCP data field. Both the HTTP ENABLE and TCP DATA FIELD lines must be active for the HTTP/PORT3 block in FIG. 13 to be enabled. Once the HTTP block is enabled, it starts to parse incoming data bytes. When it decodes the JPEG header, it enables the JPEG decoder block in FIG. 13. Once the JPEG decoder is enabled, it starts to process incoming bytes. The JPEG enable line is the only line needed to enable the JPEG block.

This detailed description uses terms that are well understood in the area of TCP/IP processing. A reference that includes detailed descriptions of these terms is a textbook, "TCP/IP Illustrated", volume 1, by W. Richard Stevens (ISBN 0201633469), 20th printing, which is incorporated herein by reference. Where appropriate, explanations of terms or concepts used in this description that are explained in this textbook are denoted by the appropriate section number or figure number. Thus a reference such as Stevens 2.2 refers to Section 2.1 in the textbook.

Acronyms

The following definitions are used for the following acronyms herein:

| | |
|---|---|
| ADPCM | Adaptive Differential Pulse Code Modulation |
| ARP | Address Resolution Protocol |
| CPU | Central Processing Unit |
| DHCP | Dynamic Host Configuration Protocol |
| HATR | Hardware Assisted Text Rasterization |
| ICMP | Internet Control Message Protocol |
| IP | Internet Protocol |
| IPV4 | Internet Protocol, Version 4 |
| MAC | Media Access Controller |
| MDIO | Management Data Input/Output |
| MII | Media Independent Interface |
| MIME | Multipurpose Internet Mail Extension |
| PPP | Point-to-Point Protocol |
| QoS | Quality of Service |
| RARP | Reverse Address Resolution Protocol |
| SPI | Serial Peripheral Interface |
| TCP | Transport Control Protocol |
| TTL | Time to Live |
| ToS | Type of Service |
| UDP | User Datagram Protocol |
| UI | User Interface |

List of Modules

The following names are used for the modules described herein and grouped here for reference:
address filter module
ARP cache module
ARP module
data aligner module
DMA engine module
Ethernet frame type parser module
Ethernet interface module
Ethernet MAC interface module
exception handler module
ICMP echo reply module
ICMP echo reply processor module
ICMP echo reply receive module
internal processor
IP fragmentation controller module
IP fragmentation module
IP header parser module
IP ID generator module
IP module
IP parser module
IP router module
malloc1 module
memory allocator module
NAT and IP masquerading module
packet scheduler module
packet type parser module
receive data memory controller module
receive DMA engine module
receive TCP parser module
receiver interface module
receive-state handler module
RST generator module
socket receive interface module
socket receive module
socket transmit interface module
socket transmit module
TCP module
TCP parser module
TCP receive interface module
TCP state module
TCP transmit interface module
TCP transmit module
transmission scheduler module
transmit DMA engine module
transmitter interface module
VSOCK memory allocater module
VSOCK module As bandwidth continues to increase, the ability to process TCP/IP communications becomes more of an overhead for system processors. As Ethernet data rates reach the 10 gigabit per second rate, TCP/IP protocol processing will consume close to one hundred percent of the host CPU processing power. When Ethernet data rates increase to 10 gigabit per second the entire TCP/IP protocol processing must be offloaded to dedicated hardware. The Internet Tuner 10G implements TCP/IP, along with related protocols such as ARP, RARP, and IP host routing, as a series of state machines. The Internet Tuner 10G core uses no processor or software, although connections are provided so that a processor can be used to extend the features of the Internet Tuner 10G network stack.

Figure 14:
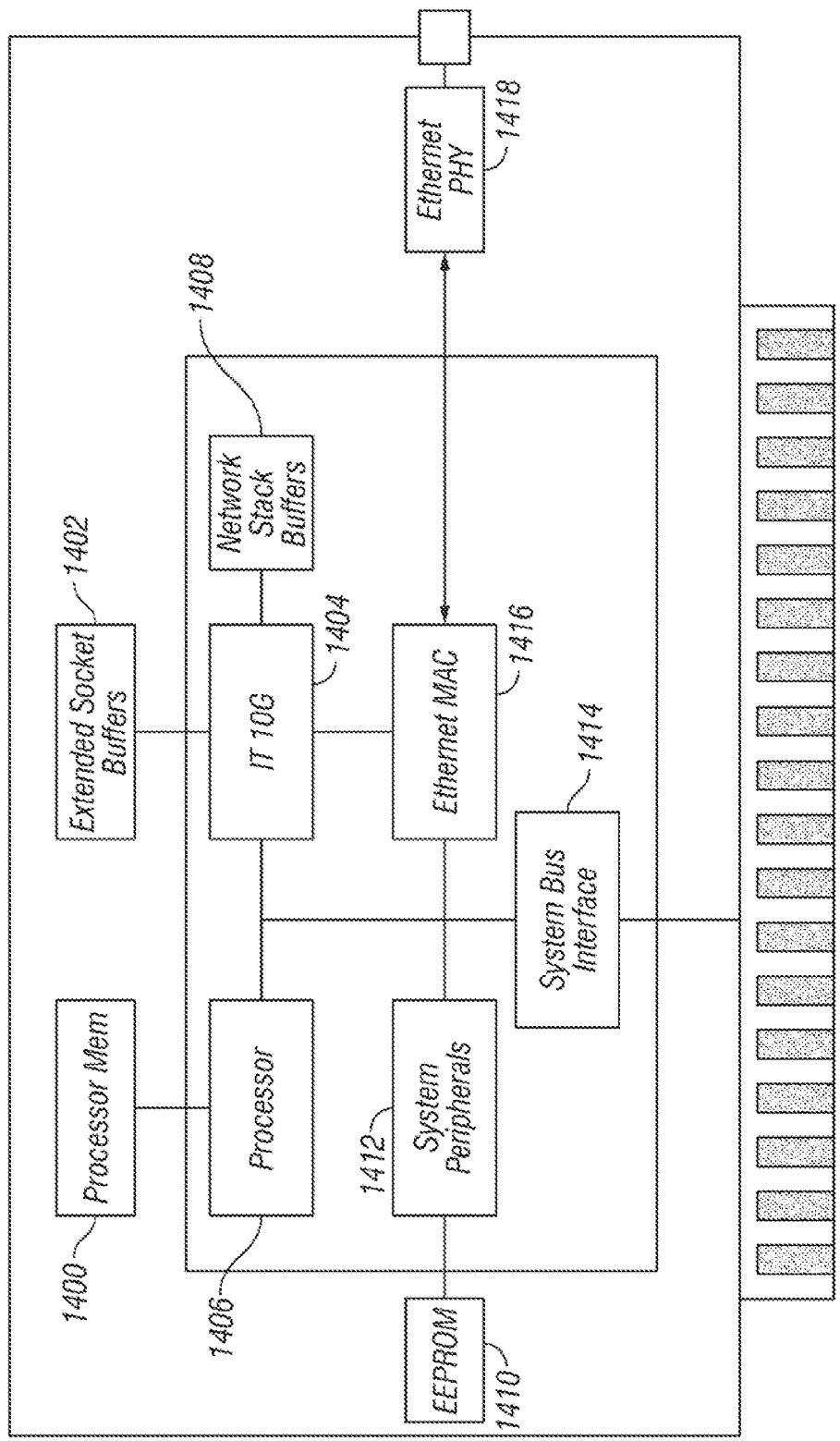
FIG. 14 is a block schematic diagram of an adapter implementation using the invention's Internet Tuner 10G combined with an internal processor according to the invention.

Referring to FIG. 14, an example use of the Internet Tuner 10G 1404 core is in a Gigabit Ethernet Adapter chip intended for a Gigabit Ethernet Adapter card. As an example application, the Gigabit Ethernet Adapter is plugged into a server and will natively process TCP/UDP/IP packets or other packets using similar protocols.

The Internet Tuner 10G core 1404 is combined with an internal processor 1406, system peripherals 1412, and a system bus interface 1414 into a single Gigabit Ethernet Adapter chip. This Gigabit Ethernet Adapter chip is combined with an Ethernet physical (PHY) device 1418, a configuration EEPROM 1410, and optional external memory 1400 for the Internet Tuner 10G core 1404 to form a Gigabit Ethernet Adapter. The memory for the internal processor (both ROM and RAM) may be on the Gigabit Ethernet Adapter chip (internal) or outside the Gigabit Ethernet Adapter chip (external).

Figure 15:
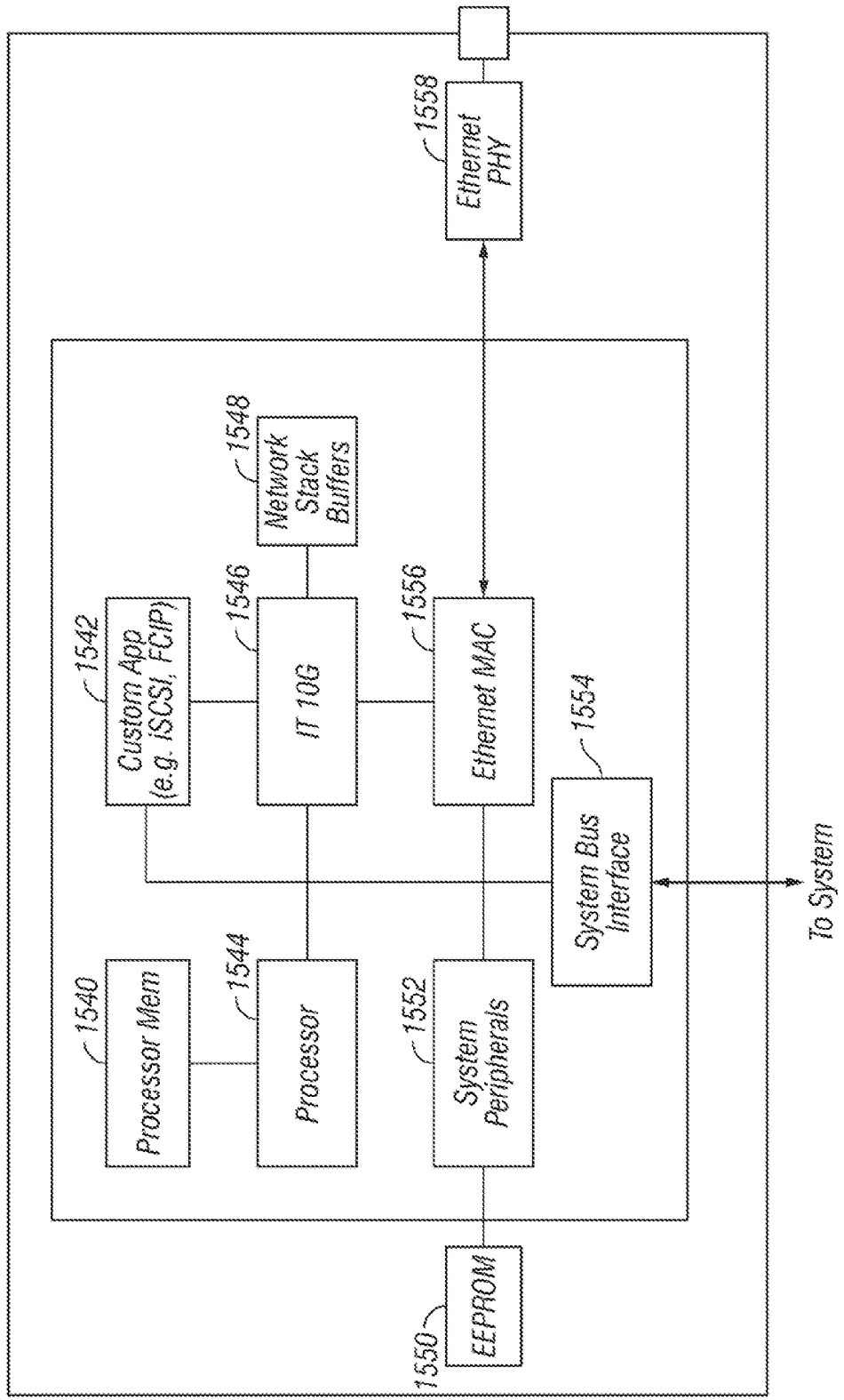
FIG. 15 is a block schematic diagram of network attached devices using the Internet tuner 10G according to the invention.

With respect to FIG. 15, the Internet Tuner 10G 1546 may be used, for example, as the interface for network-attached devices (such as storage units, printers, cameras, and so on). For these applications, a custom application socket 1542 may be added to the Internet Tuner 10G 1546 to process layer six and seven protocols and to facilitate data movement that is specific for an application. Examples of this type of use include custom data paths for streaming media, bulk data movements, and support for protocols such as iSCSI, RDMA, and FCIP.

Although the Internet Tuner 10G is designed to support line-speed processing at 10 gigabit per second rates, the same architecture and logic can be used at lower speeds as well. In these cases, only the Ethernet media-access controller (MAC) and PHY would be different. Advantages of using the Internet Tuner 10G architecture at slower line speeds include lower power consumption.

The challenge for high-speed bandwidths is in processing TCP/IP packets at wire line speeds. It is apparent that starting at the one gigabit per second level, the processing overhead of TCP/IP becomes a major drain on a system and that another solution is needed. The Internet Tuner 10G addresses this by various architecture implementations. These include the following features:

Stream processing of incoming data
Wide data paths
Parallel execution of protocol state machines
Intelligent scheduling of shared resources
Minimal memory copying The Internet Tuner 10G takes the architectural concepts implemented in the Internet Tuner, and adds the above enhancements.

The following sections provide a block-level description of the system as well as explaining the theory of operations for the different data paths and transfer types.

The Gigabit Ethernet Adapter chip consists of the Internet Tuner 10G, an internal processor, and other components. The network stack performs the majority of the protocol processing.

Figure 16:
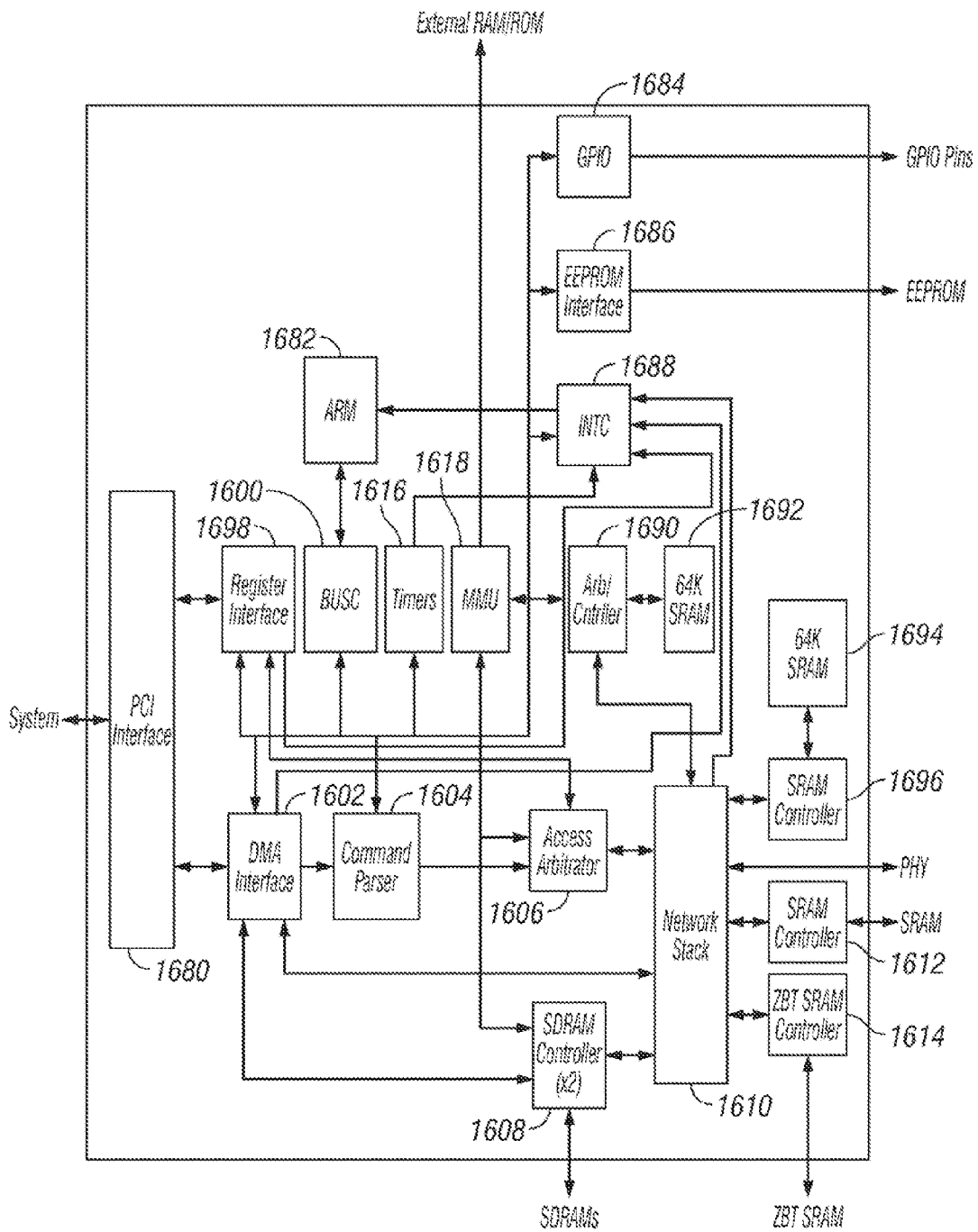
FIG. 16 is a block schematic diagram of the Gigabit Ethernet Adapter chip according to the invention.

Referring to FIG. 16, a block level diagram of the Gigabit Ethernet Adapter chip is shown.

This section provides an overview of the use of the internal processor. The Gigabit Ethernet adapter chip utilizes an internal processor 1688 for programmability where programmability is required. This internal processor 1688 is also attached to peripherals. Under normal operating conditions, the internal processor 1688 will control the network stack 1610.

The internal processor 1688 has the capability to address a variable amount of memory, either RAM or ROM or both. The memory may be on the same chip as the Internet Tuner 10G chip or external memory. All of the internal processor peripherals, the RAM, the ROM, and the Internet Tuner 10G network stack 1610 are located within the address space of the internal processor memory. 64 kilobytes of the internal processor RAM space is configured as unified memory with the Internet Tuner 10G network stack 1610. This unified memory is used for exception handling, and for the internal processor to build raw Ethernet packets that may be transmitted or received by the Internet Tuner 10G network stack 1610. This section provides an overview of the Internet Tuner 10G architecture and subsequent sections then describe the individual Internet Tuner 10G modules. The Internet Tuner 10G takes the original hardware protocol processing ideas of the Internet Tuner described above, and adds enhancements that enable the Internet Tuner 10G to handle data rates of ten gigabits per second and higher.

The most important additions to the original Internet Tuner are the increased width of the data paths, the parallel execution of state machines, and the intelligent scheduling of shared hardware resources. In addition, the Internet Tuner 10G provides additional support for protocols over and above original Internet Tuner, including direct support for RARP, ICMP, IGMP, and new upper-level protocols, such as iSCSI or RDMA.

The following sections provide an overview of the basic elements of the Internet Tuner 10G. Subsequent sections provide a detailed description of all of the elements of the Internet Tuner 10G.

This section describes socket initialization. Prior to the transfer of any data to or from the Internet Tuner 10G, a socket must be initialized. Socket initialization may be performed either by using command blocks or by programming the socket registers directly. The parameters that must be programmed for every socket include the destination IP address, the destination port number, and the connection type (TCP or UDP and server or client). Optional parameters include a quality of service (QoS) level, source port, time to live (TTL), and type of service (ToS) setting. Once the appropriate parameters have been programmed, the socket may be activated and, if necessary, a connection established in order to transmit and receive packets. In the case of UDP sockets, packets may be transmitted or received immediately. For TCP clients, a connection must first be established. For TCP servers a SYN packet must be received from a client, and then a connection must be established.

This section provides an overview of the transmission of packets by the Internet Tuner 10G connected to a host computer.

Figure 17:
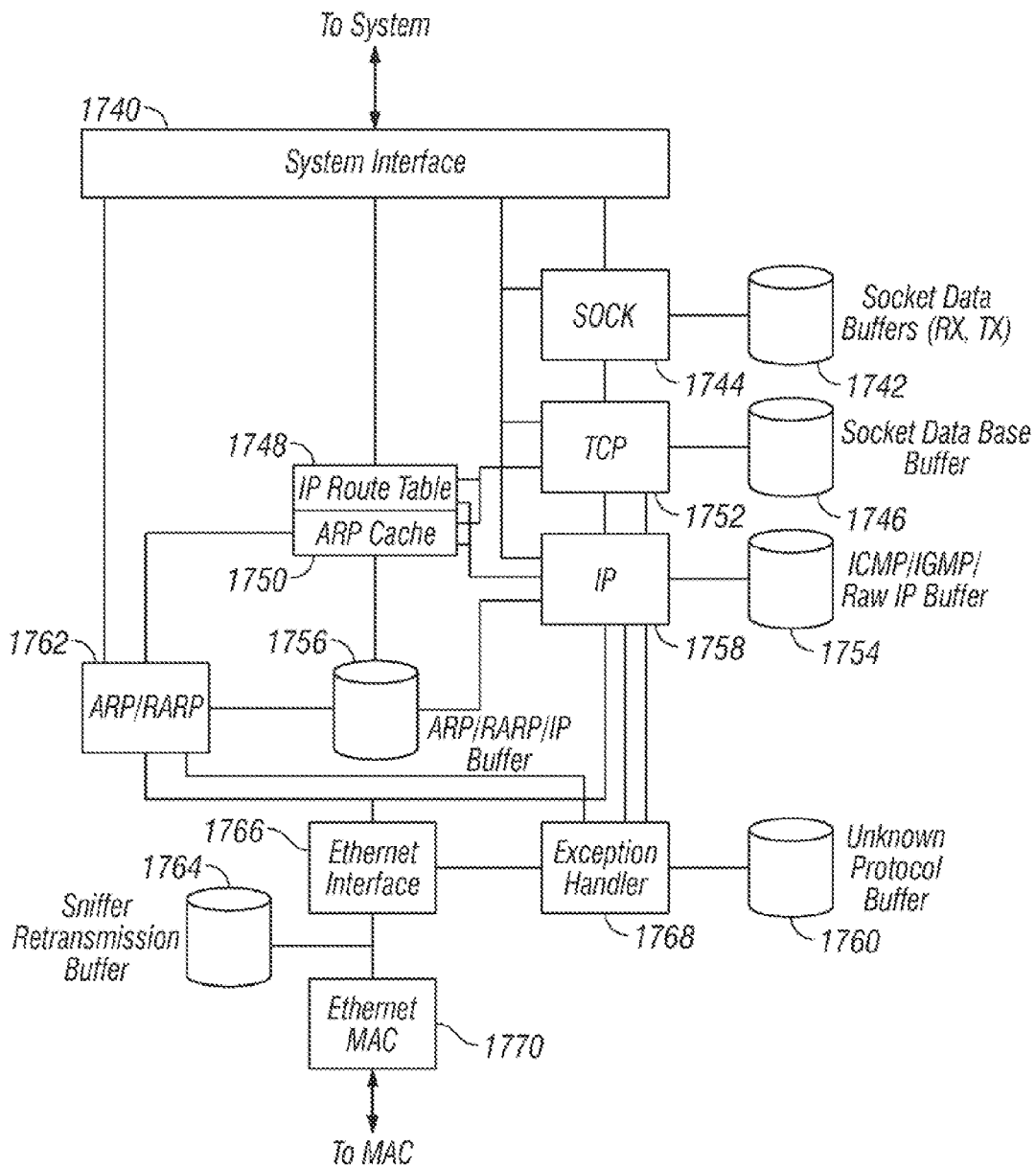
FIG. 17 is a block schematic diagram of the Internet Tuner 10G according to the invention.

With respect to FIG. 17, in order for the Internet Tuner 10G to transmit a packet, a software application running on the host computer first writes the packet data to a socket buffer in the socket buffer memory 1742, which is connected to the Internet Tuner 10G. The packet data is sniffed (or monitored) as the packet data is being written to the socket buffer in socket buffer memory 1742, and a partial checksum of the packet data is kept. This partial checksum calculation is used as the starting seed for further checksum calculations. This partial checksum calculation removes the need to read the packet data again prior to the transmission of the packet. A software application may write packet data to a socket buffer in socket buffer memory in units of either 32 or 64 bits. Signals are used to indicate which bits in a 32-bit or 64-bit unit of packet data are valid.

When a software application has written a packet to the socket buffer in socket buffer memory 1742, the software application may issue a send command to the Internet Tuner 10G. When the software application issues the send command the TCP module 1752 calculates the length of the packet, calculates the TCP and IP checksums, and builds the TCP and IP headers. The TCP/UDP module then inserts these headers in front of the data section of a packet in the socket buffer 1746 to form a complete packet that is ready for transmission. The TCP module 1752 then puts a pointer to the complete packet in socket buffer memory, along with a socket QoS level, on the transmission priority queue.

The transmission scheduler module monitors the transmission priority queue. The transmission scheduler module examines all sockets that have packets waiting for transmission and selects the packet with the highest socket QoS level. The transmission scheduler module examines all packets waiting for transmission including TCP, UDP, ICMP, ARP, RARP, and raw Ethernet packets. The transmission scheduler module uses a minimum-bandwidth algorithm to make sure that no socket is completely starved (a later section describes the minimum-bandwidth algorithm). The transmission scheduler module selects a packet for transmission and passes the socket buffer memory pointer for the packet to the MAC TX interface module. The MAC TX interface module uses the socket buffer memory pointer to read the packet from the socket buffer memory and passes the packet to the MAC module 1770. The packet is also stored in a MAC TX interface module sniffer buffer 1764 in case the packet needs to be retransmitted (due to Ethernet collisions or for other reasons). Once the packet is transmitted from the socket buffer memory, then that socket buffer memory is freed. When a valid transmission status signal is received from the MAC module, the MAC TX interface module sniffer buffer is cleared, and the MAC module may then transmit the next packet. If an invalid transmission status is received from the MAC module, then the last packet stored in the MAC TX interface module sniffer buffer is retransmitted.

The following sections provide an overview of the reception of packets by the Internet Tuner 10G.

When a packet is received from the MAC module, the MAC address filter module examines the Ethernet header to determine if the packet is destined for the hardware interface. The MAC address filter module can be programmed to accept unicast addresses, unicast addresses that fall within a programmed mask, broadcast addresses, or multicast addresses.

If the received packet is an ARP or RARP packet, then the received packet is passed to the ARP module 1762. The ARP module examines the OP field in the received packet and determines if the received packet is an ARP reply (the OP field is 1), an ARP request (the OP field is 2), a RARP request (the OP field is 3), or a RARP reply (the OP field is 4). If the received packet is an ARP request packet or a RARP request packet, then a device on the network is requesting information from a network device that has a target IP address specified in the ARP request packet or RARP request packet. If the target IP address in the ARP request packet or RARP request packet belongs to the Internet Tuner 10G, then the ARP module passes a reply request to the ARP/RARP reply module. If the received packet is an ARP reply packet or a RARP reply packet, then the sender Ethernet address from the received packet and the sender IP address from the received packet are passed to the ARP/RARP request module.

If the received packet is an IP packet, then the packet is passed to the IP module. The IP module examines the 4-bit IP version field in the first four bits of the IP header of the received IP packet to determine how the packet should be handled. Since packets are processed 64 bits at a time, for the first 64 bits received, the IP module can make no assumption about the IP version (IPv4 or IPv6). When the first 64 bits of the received IP packet have been received and processed, the IP version is now known. At this point the IP module aborts the unwanted IP version decode and resets the IP version decoder to its default state.

Once the IP version is known, the IP module decodes the 8-bit protocol field in the IP header. Depending on the decoded protocol, the received IP packet is then sent to the appropriate module for further processing. The protocols presently supported directly by dedicated hardware circuitry include TCP, UDP, and ICMP.

In the present version of the Internet Tuner 10G, each ICMP echo request packet is handled directly by dedicated hardware. If the packet received is an ICMP echo request packet, then the ICMP echo request packet is stored and a notice passed to the ICMP reply module. The ICMP reply module changes the ICMP code field in the ICMP echo request packet to a value that corresponds to an ICMP echo reply packet, adjusts the ICMP echo reply packet checksum, and schedules the ICMP echo reply packet for transmission.

In the present version of the Internet Tuner 10G, each ICMP redirect packet is handled directly by dedicated hardware. If the packet received is an ICMP redirect packet, the ICMP redirect packet is parsed and information sent to the IP router module so that the appropriate entry in the IP route table can be updated.

Other types of ICMP packets, IGMP packets, or packets corresponding to other protocols not supported directly by dedicated hardware are copied to an IP buffer where they may be handled by the internal processor. Protocols that are not carrying time-critical data are often referred to as housekeeping protocols. Deciding which of the housekeeping protocols are processed by dedicated hardware circuitry depends on the implementation of the Internet Tuner 10G. The Internet Tuner 10G architecture is flexible enough that different implementations may use either dedicated hardware circuitry or the internal processor to process housekeeping protocols.

If the packet received is a TCP packet is received that corresponds to an open socket, the socket information is parsed, the state information for the socket is retrieved and then, based on the type of the received TCP packet, the socket state information is updated. The data section of the received TCP packet (if applicable) is stored in the receive data buffer for the socket. If an ACK packet needs to be generated as a result of receiving the TCP packet, the TCP state module generates the ACK packet and schedules the ACK packet for transmission. If a TCP packet is received that does not correspond to an open socket, then the TCP state module generates a RST packet and the RST packet will be scheduled for transmission.

If the packet received is a UDP packet, then the socket information is parsed, and the UDP packet data stored in the receive data buffer for that socket. If no open socket exists for the UDP packet, then the UDP packet is silently discarded and an ICMP destination unreachable or other message is generated.

The Internet Tuner 10G network stack appears as a peripheral to the internal processor. The base address for the Internet Tuner 10G network stack is programmed via a register. All register addresses are offsets relative to this base address register. This architecture allows the internal processor to place the Internet Tuner 10G network stack at any location in the internal processor memory or I/O space.

The following sections provide a detailed description of the elements of the Internet Tuner 10G.

This section details the Ethernet interface module 1766. The Ethernet interface module communicates with the Ethernet MAC interface module 1770, the ARP module 1762, and the IP module 1758. The Ethernet interface module handles data for both the receive path and the transmit path.

On the transmit path, the Ethernet interface module is responsible for:
scheduling packets for transmission
setting up DMA channels for transmission
and handling the Ethernet MAC interface transmit signals
On the receive path, the Ethernet interface module is responsible for:
parsing the Ethernet header
determining if the received packet should be accepted or rejected based upon the address filter settings
enabling the appropriate protocol module based upon the Ethernet frame type field in the frame header of the received packet
and aligning the received packet data so that the data section of the received packet starts on a 64-bit boundary This section covers the transmission scheduler module. The transmission scheduler module is responsible for taking packet transmission requests from the ARP, IP, TCP, and raw transmission modules, and determining which packet should be transmitted next. The transmission scheduler module determines the packet that should be transmitted next by comparing QoS levels for each packet transmission request. Along with the QoS level, each packet transmission request contains a pointer to the starting memory block for that packet, along with a packet length. The transmission scheduler module has the capability to be programmed to prioritize the transmission of packets that belong to connection types. For example, a packet transmission request with a QoS level of five from the TCP module can be made to have higher priority than a packet transmission request with a QoS level of five from the IP module. The following is the algorithm used by the transmission scheduler module to determine packet transmission priority.

Check to see that no packet channel has reached the starved state. This is a programmable level (per packet type or per connection type) that corresponds to the number of times a packet is passed over before the transmission scheduler module overrides the QoS level and the packet is transmitted. If two or more packets have reached the starved state at the same time, then the packet that belongs to the channel with the higher QoS level is given priority. The packet that belongs to the channel with the lower QoS level is scheduled for transmission next. If two or more packets have the same QoS level they are sent out one after the other according to the following order; TCP or UDP packets, then ARP packets, then IP packets, then raw Ethernet packets.

If there is no channel that has a packet in the starved state, then the channel with the highest combined QoS level and channel weighting is transmitted.

If only one channel has a packet to be transmitted, the packet is transmitted immediately.

Once a packet that belongs to a channel has been selected for transmission, the channel's memory pointer, packet length, and packet type are transferred to the DMA engine module. The DMA engine module signals the transmission scheduler module when the transfer has been completed. At this point the transmission scheduler module will transfer the parameters of the next packet to the DMA engine module.

This section describes the DMA engine module. The transmission scheduler module passes packet parameter information to the DMA engine module. The packet parameter information includes the packet type, the packet length, and the memory pointer to the start of the packet data. The DMA engine module uses the packet length to determine how much data to transfer from the memory buffer. The packet type indicates to the DMA engine module which memory buffer to retrieve the packet data from, and the memory pointer indicates where to start reading packet data from. The DMA engine module needs to understand how big each of the memory blocks used in the channel's packet is since as a packet may span multiple memory blocks. The DMA engine module receives data 64 bits at a time from the memory controllers and passes data 64 bits at a time to the transmitter interface module.

This section covers the transmitter interface module. The transmitter interface module takes the output from the DMA engine module and generates signals for the Ethernet MAC interface module. A 64-bit data bus connects the DMA engine module to the Ethernet MAC interface module.

This section covers the receiver interface module. The receiver interface module interfaces with the Ethernet MAC interface module. The receiver interface module receives Ethernet frames and presents them along with state count information to the address filter module and Ethernet frame type parser module.

This section covers the address filter module and Ethernet frame type parser module. The address filter module and Ethernet type parser module parse the Ethernet header and perform two functions:
  Determine if the Ethernet frame is for the hardware interface that belongs to the Internet Tuner 10G.
  Parse the Ethernet frame type to determine where to pass the rest of the Ethernet frame.

The address filter module and Ethernet frame type parser module can be programmed with the following filter options:
  Accept a programmed unicast address
  Accept broadcast addresses
  Accept multicast addresses
  Accept addresses within a range specified by a netmask
  Promiscuous mode (accepts all Ethernet frames)

The parameters that control these filter options are set by software in the host system.

The following Ethernet frame types are supported by the Ethernet frame type parser module:
  IPv4 packets with Ethernet frame type=0×8000
  IPv6 packets with Ethernet frame type=0×86DD
  ARP packets with Ethernet frame type=0×0806
  RARP packets with Ethernet frame type 0×8035

The Ethernet frame type parser passes other Ethernet frame types to the exception handler module.

The Ethernet frame type parser also handles both 802.2/802.3 and DIX format Ethernet frames. In the 802.2/802.3 format Ethernet frame a length parameter is present instead of the Ethernet frame type field that is present in the DIX format Ethernet frame. An 802.2/802.3 Ethernet frame is detected when the value of the Ethernet frame type field is equal to or less than 1500 (decimal). When this case is detected, the Ethernet frame type parser sends the packet contained in the Ethernet frame to both the ARP module and IP receive module, along with asserting a signal so that each following module knows that it must decode the packet with the knowledge that the packet may not be intended for that module. If an Ethernet frame type of either 0×8000 or 0×86DD is received, the IP packet signal is asserted. The IP header parser module will then determine if the packet is an IPv4 or IPv6 packet. The protocol version field in the IP header overrides the Ethernet packet type field when the Internet Tuner 10G determines the protocol of the packet.

This section covers the data aligner module. The data aligner module aligns data bytes for the protocol processing modules that follow the data aligner module. The data aligner module is required because the Ethernet header is not an even multiple of 64 bits. Depending on whether VLAN tags are present in the Ethernet header or not, the data aligner will re-align the 64-bit data in the Ethernet header so that it appears MSB justified to the protocol processing modules that follow the data aligner module. The data section of an Ethernet frame is then always aligned on an even 64-bit boundary. The data aligner module also generates a ready signal to the protocol processing modules that follow the data aligner module.

This section describes the ARP module 1762 and ARP cache module 1750. The ARP module also supports the RARP protocol, but does not include the ARP cache. Since each module that is capable of transmitting a packet queries the ARP cache ahead of time, the ARP cache is kept separate from the ARP module. The ARP module may send updates to the ARP cache based upon the Ethernet frame types that are received.

The ARP module capabilities are as follows:
  Able to respond to ARP requests by generating ARP replies
  Able to generate ARP requests in response to the ARP cache
  Able to provide ARP replies for multiple IP addresses (used in the case of a multi-homed host or to perform the functions of ARP proxy)
  Able to generate targeted (unicast) ARP requests
  Filters out illegal Ethernet addresses and illegal IP addresses
  Passes aligned ARP data to the internal processor
  Capable of performing a gratuitous ARP
  The internal processor may bypass automatic ARP reply generation, copying ARP data to the exception handler
  The internal processor may generate custom ARP replies (when in bypass mode)
  Variable priority of ARP packets, depending on network conditions The RARP module capabilities are as follows:
Request an IP address
Request a specific IP address
Incoming RARP requests are handed off to the exception handler
Handles irregular RARP replies (RARP Ethernet frame type with ARP OP field or vice versa)
Passes aligned RARP data to the internal processor
Internal processor may generate custom RARP requests and replies
The ARP cache module capabilities are as follows:
Dynamic ARP table size
Automatically updated ARP entry information
Generates a status message when sender's hardware address changes
Capable of promiscuous collection of ARP data
ARP request capability via the ARP module
Support for static ARP entries
Option for enabling static ARP entries to be replaced by dynamic ARP data
Support for ARP proxy
Configurable expiration time for ARP cache entries The following sections explain the theory of operation of the ARP module.

Figure 18:
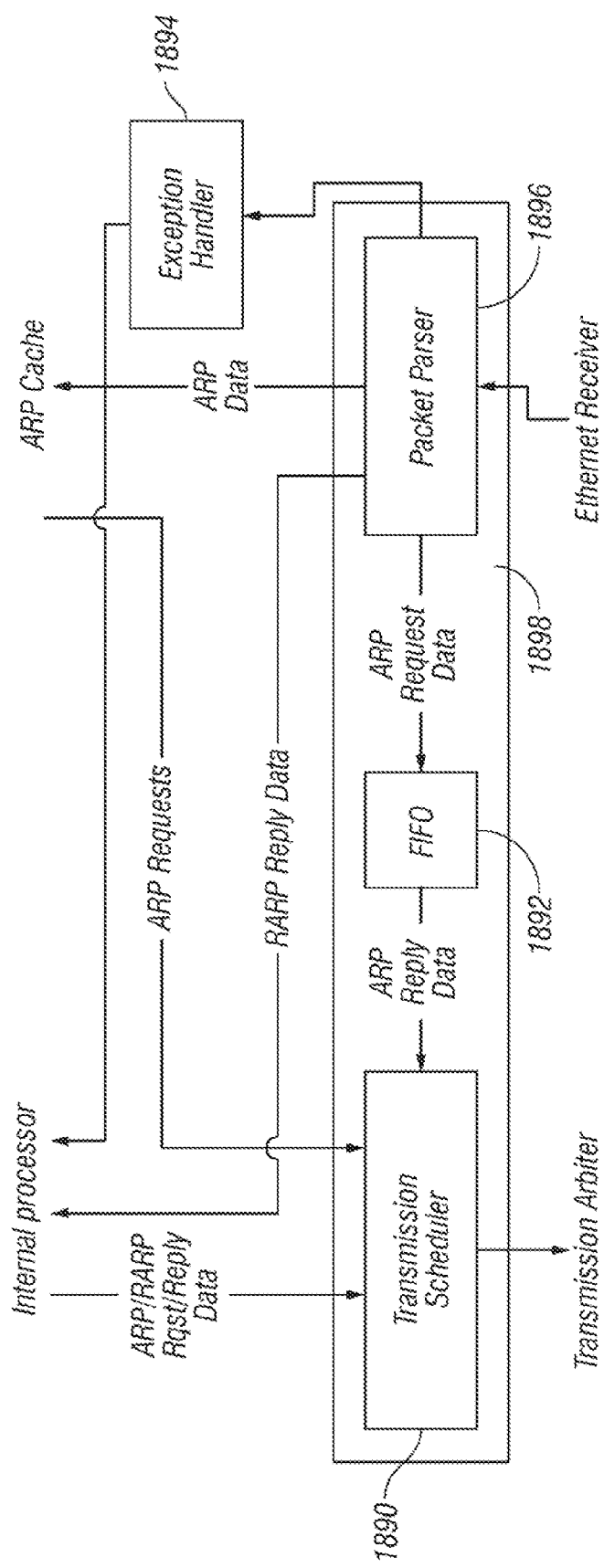
FIG. 18 is a block schematic diagram of an ARP module of the invention according to the invention.

This section covers the receiving and parsing of packets by the ARP module. Referring to FIG. 18, the ARP module processes both ARP packets and RARP packets. The ARP module waits for a data available signal received from Ethernet receive module 1896. When the data available signal is received, the Ethernet frame type of the incoming Ethernet frame is checked. If the Ethernet frame type does not correspond to ARP or RARP, the ARP module ignores the packet contained in the Ethernet frame. Otherwise, the ARP module begins parsing the packet 1898 contained in the Ethernet frame.

Packets are read from the Ethernet interface module in 64-bit words. A 28-byte ARP packet (excluding Ethernet header) takes up 3.5 64-bit words.

The first 48 bits of the first 64-bit word of an ARP packet contain the type of hardware address, type of protocol address, hardware address length in bytes, and protocol address length in bytes. The values in the address type and length fields of the ARP packet are compared with the values expected for ARP requests for IPv4 over Ethernet. If the values do not match, the ARP packet is passed to the exception handler 1894. Otherwise, the ARP module continues parsing the ARP packet. The last 16 bits of the first 64-bit word of the ARP packet contain the ARP OP field. The ARP module stores the ARP OP field and checks to see if the ARP OP field is valid. Valid ARP packets have an ARP OP field that is equal to one, two, three, or four. If the ARP OP field is invalid, the ARP packet is passed to the exception handler. Otherwise, the ARP module continues with parsing the ARP packet.

The second 64-bit word of the ARP packet should contain the sender hardware address and half of the sender protocol address. The ARP module stores the first 48 bits of the second 64-bit word of the ARP packet into the sender hardware address register. Then the ARP module checks if the sender hardware address is valid. The sender hardware address is invalid if it is the same as the Ethernet address of the interface or if it is a broadcast address. If the sender hardware address is invalid, the packet is discarded. The last 16 bits of the second 64-bit word of the ARP packet are stored in the upper half of the sender protocol address register.

The third 64-bit word of the ARP packet contains the second half of the sender protocol address and also contains the target hardware address. The ARP module stores the first 16 bits of the third 64-bit word of the ARP packet in the lower 16 bits of the sender protocol address register, and checks that the sender protocol address is valid. The sender protocol address is invalid if it is the same as the IP address of the hardware interface or if the sender protocol address is a broadcast address. The ARP module discards the ARP packet if the sender protocol address is invalid.

The ARP module compares the target hardware address with the Ethernet addresses of the interface. If the target hardware address does not match an Ethernet address belonging to the interface, the ARP module discards the ARP packet. If the target hardware address is the same as the Ethernet address of the interface of the Internet Tuner 10G then the ARP module continues processing the ARP packet.

The first 32 bits of the fourth and last 64-bit word of the ARP packet contain the target protocol address. Only the first 32 bits of this fourth 64-bit word are valid, because the ARP packet should be 3.5 words or 28 bytes (224 bits) long. The ARP module stores the target protocol address in the target protocol address register. The ARP module compares the target protocol address with the IP address of the interface. If the target protocol address does not match an IP address of the interface, the ARP module discards the ARP packet. If the target protocol address does match an IP address of the interface and the ARP packet is an ARP request, the ARP module generates an ARP reply. If the target protocol address does match the IP address of the interface and the ARP packet is a RARP reply, the ARP module passes the assigned IP address to the RARP handler module.

If the target protocol address does match the IP address of the interface of the Internet Tuner 10G, the ARP module passes the sender Ethernet address and the sender IP address, both taken from the ARP packet, to the ARP cache module.

This section covers the transmission of ARP packets by the ARP module. The ARP module may receive requests to transmit ARP packets from three sources: the ARP cache module (for ARP request packets and ARP proxy replies), internally from the ARP parser via the ARP reply FIFO (for ARP reply packets), and from the internal processor (for custom ARP packets and all RARP packets). To handle the multiple sources of ARP packets and RARP packets, the ARP transmission scheduler 1890 uses a transmission priority queue to schedule the transmission of ARP packets and RARP packets.

Transmission requests are placed in the ARP transmission priority queue in a first-come first-served order, except when two or more sources wish to transmit. In that case, the next transmission request that is placed in the ARP transmission priority queue depends on the priority of the transmission request. RARP request transmission requests normally have the highest priority, followed by ARP request transmission requests. ARP reply transmission requests have the lowest transmission priority.

There is one situation in which an ARP reply transmission request has the highest transmission priority. This occurs when ARP reply FIFO 1892 is full. When the ARP reply FIFO is full, incoming ARP request transmission requests are ignored. When this occurs the ARP reply transmission request is given the highest transmission priority in order to avoid forcing retransmissions of ARP requests.

When the ARP transmission priority queue is full the ARP transmission scheduler 1890 does not accept further transmission requests until one or more transmission requests have been completed (and the transmission request has been removed from the ARP transmission queue). When the ARP module detects a full ARP transmission queue, the ARP module requests an increase in transmission priority from the Ethernet transmission scheduler.

When the Ethernet transmission scheduler allows the ARP module to transmit, ARP packets or RARP packets are generated depending on the type of ARP packet to be transmitted. The ARP OP field determines the ARP packet type. The ARP OP field is stored with each transmission request in the ARP transmission priority queue.

This section covers the operation of the ARP bypass mode of the ARP module, which bypasses the automatic processing of incoming ARP packets. When the ARP bypass flag is set and exceptions are enabled incoming ARP and RARP, packets are copied to the exception handler buffer. The internal processor then accesses the exception handler buffer, and processes the ARP and RARP packets. When in ARP bypass mode, the internal processor may request an ARP reply packet from the ARP transmission scheduler. The fields that can be customized in outgoing ARP packets and RARP packets are: the sender protocol address, the source hardware address, the target protocol address, and the ARP OP field. All other fields in ARP packets or RARP packets are set to the standard values used in ARP packets and RARP packets for IPv4 over Ethernet. The source hardware address is set to the Ethernet address of the interface of the Internet Tuner 10G. If it is necessary to modify other fields in the ARP packet or ARP packet, the internal processor must generate a raw Ethernet frame.

The following sections explain the operation of the ARP cache module.

This section covers the addition of ARP cache entries to the ARP cache by the ARP cache module 1750. The ARP cache module creates a dynamic ARP cache entry in the ARP cache when the ARP module 1762 receives an ARP request or an ARP reply for one of the IP addresses that belong to the Ethernet interface of the Internet Tuner 10G. A static ARP cache entry is created in the ARP cache when the internal processor requests the ARP cache module create an ARP cache entry. The internal processor may also create dynamic ARP cache entries. A dynamic ARP cache entry exists for time specified by the user before the ARP cache entry expires, and the ARP cache module removes the cache entry. Expiration time for a dynamic ARP cache entry is typically five to 15 minutes. A static ARP cache entry does not normally expire.

New ARP data that is to be entered into the ARP cache is passed to the ARP cache module from two potential sources: the internal processor via the ARP registers or the ARP packet parser. Dynamic ARP cache entry requests from the ARP packet parser have priority when both potential sources make a request to the ARP cache module to add an ARP cache entry at the same time. Dynamic ARP cache entry requests from the ARP packet parser are given priority in order to be able to process incoming ARP packets as quickly as possible and prevent stalling the Ethernet interface.

Once the ARP cache module selects the source of a new ARP cache entry, the ARP cache module determines where in the ARP module memory to store the ARP cache entry. The ARP cache module uses the ARP lookup table (LUT) to map an IP address to a location in ARP module memory. The ARP LUT contains 256 ARP LUT entries. Each ARP LUT entry is 16 bits wide and contains a pointer to a location in m1 memory, allocated by the ARP code, and an ARP pointer valid (PV) bit. The ARP cache module uses the ARP PV bit to determine if the m1 memory pointer points to a valid address in the m1 memory allocated by the ARP cache. The m1 address is valid if it is equal to the starting address of a block of m1 memory that has been allocated by the ARP cache module.

The ARP cache module uses an 8-bit index into the ARP LUT to retrieve the m1 memory pointer from the ARP LUT. The ARP cache module uses the last octet of a 32-bit IP address as the 8-bit ARP LUT index. The reason for using the last octet of a 32-bit IP address is that in a local area network, the last octet is the portion of the IP address that varies the most between hosts.

Once the ARP cache module determines which ARP LUT entry in the ARP LUT to use, the ARP cache module checks to see if the ARP LUT entry contains a valid m1 memory pointer. If the m1 memory pointer is valid, the ARP cache module uses the m1 memory pointer to address the m1 memory to retrieve ARP information for the target IP address. If the ARP LUT entry does not contain a valid m1 memory pointer, then the ARP cache module allocates an m1 memory block using the memory allocator module. Once the ARP cache module allocates the m1 memory block the ARP cache module stores the address of the first 128-bit word of the allocated m1 memory block in the m1 memory pointer field of the ARP LUT entry.

After allocating m1 memory using the memory allocator module and storing the m1 memory pointer in the ARP LUT, the ARP cache module stores the ARP data in the ARP cache in the m1 memory. The ARP data stored in the m1 memory includes the sender IP address, which is necessary for the ARP module to use during ARP cache lookups. The ARP cache module uses a set of ARP control fields in the ARP cache entries. The ARP module uses a retry counter ARP control field to keep track of the number of ARP request attempts performed for a given IP address. The ARP module uses an entry type control field to indicate the type of ARP cache entry (000=dynamic entry; 001=static entry; 010=proxy entry; 011=ARP check entry). The ARP module uses a resolved flag control field to indicate that the IP address in the current ARP cache entry has been successfully resolved to an Ethernet address. The ARP module uses a valid flag control field to indicate that this ARP cache entry contains valid data. Note that an ARP cache entry may be valid and unresolved while the initial ARP request is being performed. The ARP module uses a source control field to indicate the source of the ARP cache entry (00=dynamically added, 01=system interface module, 10=IP router module, and 11=both system interface module and IP router module). The ARP cache module uses an interface control field to allow the use of multiple Ethernet interfaces connected to the Internet Tuner 10G. Following the set of ARP controls fields is the ARP cache link address that may point to the m1 memory location of a following ARP cache entry. The most significant bit of the ARP cache link address is the link valid flag. The link valid flag indicates that there is another ARP cache entry following the current ARP cache entry. The last two fields in the ARP cache entry are the Ethernet address to which the IP address has been resolved, and a timestamp. The timestamp indicates when the ARP cache entry was created, and is used to determine if the ARP cache entry has expired.

In networks with more than 256 hosts or with multiple subnets, collisions between different IP addresses may occur in the ARP LUT. A collision in the ARP LUT occurs when more than one IP address maps to the same ARP LUT index. This collision is due to more than one host having the same value in the last octet of the IP address. To deal with collisions, the ARP cache module chains entries in the ARP LUT.

When the ARP cache module performs a lookup in the ARP LUT and a valid ARP LUT entry is found to already exist in that slot, the ARP cache module retrieves the ARP entry that is being pointed to from m1 memory. The ARP cache module examines the IP address stored in the ARP cache entry and compares it to the target IP address. If the IP addresses match then the ARP cache module can simply update the ARP cache entry. However, if the addresses do not match, then the ARP cache module examines the link valid flag and the link address of the ARP cache entry. The last 16 bits of the ARP cache entry contain an ARP cache link address pointing to another ARP entry that maps to the same LUT entry. If the link valid flag is set, then the ARP cache module retrieves the ARP cache entry pointed to by the ARP cache link address. The IP address in this second ARP cache entry is compared with the target IP address. If there is a match, the ARP cache module updates the ARP cache entry. Otherwise the ARP cache lookup process continues (following the links in the chain of ARP cache entries) until a match is found or the ARP cache module reaches an ARP cache entry whose link valid flag that is not set.

When the ARP cache module reaches the end of a chain of ARP cache entries and a match has not been found, the ARP cache module creates a new ARP cache entry. Creating a new ARP cache entry may require the allocation of m1 memory from the memory controller module. Each block of m1 memory is 128 bytes in size. Each block of m1 memory can accommodate eight ARP cache entries. If ARP cache module fills up an m1 memory block with ARP cache entries, the ARP cache module requests a new memory block from the memory controller module.

The user may create a static ARP cache entry. A static ARP cache entry is normally permanent and does not expire. The user has the option of allowing dynamic ARP data to replace a static ARP cache entry. In other words, when ARP data is received for an IP address that already has a static ARP cache entry, the static ARP cache entry may be replaced with the received dynamic ARP cache data. The benefit of this static ARP cache entry replacement is that this may prevent static ARP cache entries from becoming outdated. ARP cache entry replacement allows dynamic ARP cache data to overwrite static ARP cache data and results in a more up to date ARP cache. This ARP cache entry replacement capability may be disabled, if the user is confident that the IP address to Ethernet address mapping remains constant (for example, when storing the IP address and Ethernet address of a router interface). The user may choose to preserve static ARP cache entries to minimize the number of ARP broadcasts on a network. Note: an ARP cache proxy entry can never be overwritten by a dynamic ARP cache entry.

Figure 19:
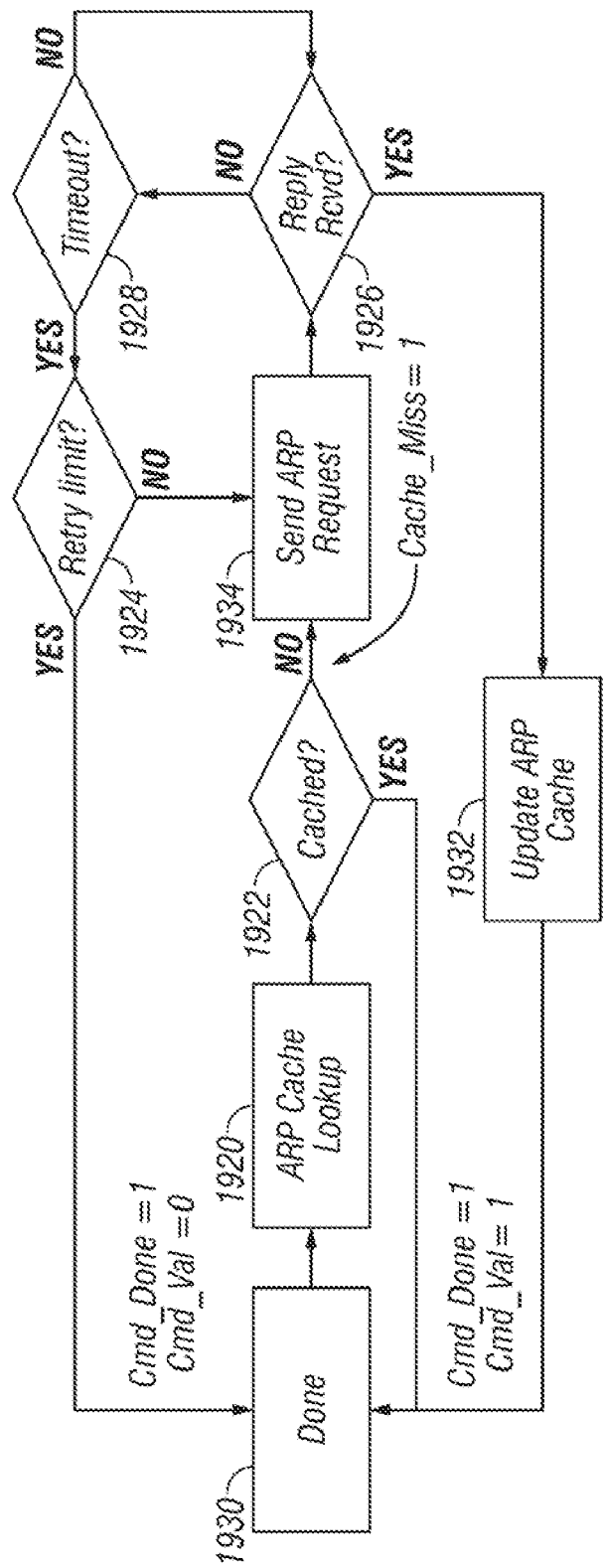
FIG. 19 is a block schematic diagram of an ARP cache lookup process according to the invention.

This section covers looking up ARP cache entries in the ARP cache. Looking up an ARP cache entry in the ARP cache follows a process similar to that for creating an ARP entry. With respect to FIG. 19, an ARP cache lookup begins by checking the ARP LUT 1920 to determine if m1 memory has been allocated for a given ARP LUT entry. If so, the m1 memory associated with that ARP LUT entry is searched until either the ARP cache entry is found (in which case there is an ARP cache hit), or an ARP cache entry with a link valid flag that is not asserted is found (in which case there is an ARP cache miss) 1922.

If an ARP cache miss occurs the ARP cache module generates an ARP request 1934. An ARP request involves creating a new ARP entry in the m1 memory allocated by the ARP cache, and a new ARP LUT entry, if necessary. The target IP address is stored in the new ARP cache entry, the resolved bit of the new ARP cache entry is set to zero, and the valid bit of the new ARP cache entry is set to one. The request counter of the new ARP entry is also set to zero. The ARP cache entry is then time stamped and an ARP request is passed to the ARP module. If an ARP reply is not received from the ARP module after an interval of one second, then the ARP cache entry's request counter is incremented and another ARP request is transmitted. After transmitting three ARP requests with no ARP reply, the attempts to resolve the target IP address are abandoned. Note: the user may specify the ARP retry interval and the maximum number of ARP request retries.

The module that is requesting an ARP cache lookup is notified of an ARP cache miss when an ARP cache miss occurs. This notification of an ARP cache miss allows the internal processor or the IP router module the opportunity to decide to wait for an ARP reply for the current target IP address, or to begin a new ARP cache lookup for another IP address and place the current IP address at the back of the transmission priority queue. This process helps to minimize the impact of an ARP cache miss when establishing multiple connections.

If a matching ARP cache entry is found in the ARP cache, then the resolved Ethernet address is returned to the module that requested the ARP cache lookup. Otherwise, if the target IP address was not found in the ARP cache, and all ARP request attempts have timed out, the module that requested the ARP cache lookup is notified that the target IP address could not be resolved.

Note: if an ARP cache lookup request from the IP router module fails to resolve an Ethernet address the IP router module must wait a minimum of 20 seconds before initiating another ARP cache lookup for that target IP address.

This section covers the expiration of an ARP cache entry. A dynamic ARP cache entry may only exist in the ARP cache for a limited amount of time. This is to prevent an IP address to Ethernet address mapping from becoming outdated (also know as stale). For example, an outdated address mapping could occur if a network uses DHCP to share a pool of IP addresses among multiple hosts or if the Ethernet interface on a device is changed during a connection.

To keep track of the elapsed time since the creation of the cache entry, the ARP cache module uses a 16-bit ARP cache module counter as the ARP cache expiration timer. The ARP cache expiration timer operates at a frequency of 2 Hz and is used to track the number of seconds that have elapsed since the ARP cache module was created. Each ARP cache entry contains a 16-bit ARP cache module timestamp taken from the 16-bit ARP cache module counter used by the ARP cache expiration timer. This 16-bit ARP cache module timestamp denotes the time at which an IP address was successfully resolved.

An ARP cache entry may expire while the ARP cache module is idle. The ARP cache module is idle when there are no ARP requests or ARP cache lookups currently being processed by the ARP cache module. While the ARP cache module is idle, an 8-bit ARP cache module counter is used to cycle through and search the ARP LUT. Each entry in the ARP LUT is checked to see if it contains a valid m1 memory pointer. If the m1 memory pointer is valid, the corresponding m1 memory location is retrieved using the m1 module memory pointer. Then, the ARP cache entry at that m1 memory location is checked to see if the difference between the timestamp of the ARP cache entry and the current time, taken from the ARP cache expiration timer, is greater than or equal to the maximum lifetime of an ARP cache entry. In the event that the first ARP cache entries associated with an ARP LUT entry are static ARP cache entries, and other m1 memory locations are chained off the first m1 memory locations, the ARP cache entries contained in those m1 memory blocks are also checked. Once a dynamic ARP cache entry has been found, or all the ARP cache entries associated with a given ARP LUT entry have been checked, then the next ARP LUT entry is checked.

If an ARP cache entry is found to have expired, the valid bit in the ARP cache entry is set to zero. If there are no other valid ARP cache entries within the same m1 memory block, then the m1 memory block is de-allocated and returned to the memory controller module. If the m1 memory block being de-allocated is the only ARP module memory block associated with a given ARP LUT entry, the PV bit in that ARP LUT entry is also set to zero, invalidating the pointer.

This section covers the ARP cache performing ARP proxying. The ARP cache supports ARP proxy cache entries. ARP proxying is used when the Internet Tuner 10G acts as a router, or there are devices on the network that are unable to respond to ARP queries.

When ARP proxying is enabled, the ARP module passes ARP requests for IP addresses that do not belong to the hardware interface of the Internet Tuner 10G to the ARP cache module. The ARP cache module then performs an ARP proxy cache entry lookup to search for the target IP address. If the ARP cache module finds a ARP cache entry with a matching IP address, the ARP cache module checks the type field of the ARP cache entry to determine if the ARP cache entry is an ARP proxy cache entry. If the ARP cache entry is an ARP cache proxy entry, the ARP cache module passes the corresponding Ethernet address from the ARP proxy cache entry back to the ARP module. The ARP module then generates an ARP reply using the Ethernet address found in the ARP proxy cache entry as the source Ethernet address. An ARP proxy lookup occurs only for ARP requests received by the ARP module.

This section covers the ARP cache module access priorities. Different ARP tasks have different priorities in terms of access to the ARP cache module memory. Incoming ARP packets may be received at a very high rate and must be processed as quickly as possible to avoid retransmissions. An ARP cache proxy entry lookup has the highest priority. The addition of a dynamic ARP cache entry to the ARP cache using data from the ARP module is second in priority. An ARP cache lookup from the IP router module is third in priority. An ARP cache lookup from the internal processor is fourth in priority. The manual creation of an ARP cache entry is fifth in priority. The expiration of an ARP cache entry is lowest in priority.

The following sections cover the IP module 1758. The IP module interfaces with the Ethernet module 1766, the TCP module 1752, the memory allocator module, the exception handler 1768, and the internal processor.

The following sections describe the modules that comprise the IP module.

Figure 20:
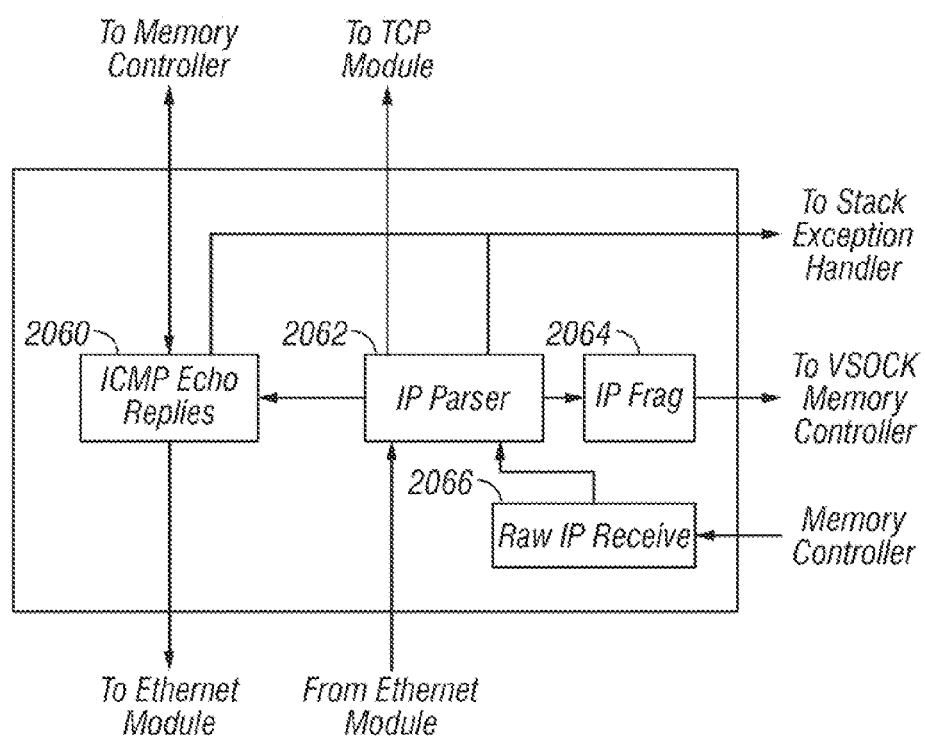
FIG. 20 is a block schematic diagram of an IP module of the invention according to the invention.

With respect to FIG. 20, this section covers the IP header field parsing module 2062. The following fields in the IP header are parsed by the IP header field parsing module.

Protocol version field—The IP header field parsing module detects either IPv4 or IPv6 IP packets. The protocol version field is used to decide the protocol version. Only IP packets with a protocol version field of 0×4 or 0×6 are decoded. If the unsupported IP version feature is enabled, then any other protocol version received will be sent to the host system. If the unsupported IP version feature is not enabled, then the IP packet will be silently discarded.

The type-of-service (ToS) field is not parsed or kept for received IP packets.

IP packet total length field—The IP header field parsing module uses the IP packet total length field to determine the total number of bytes in the received IP packet. IP header field parsing module may then indicate to the following protocol processor module the location of the end of the data section in the IP packet. All data in the IP packet beyond the indicated number of bytes and that are received before the IP packet signal de-asserts are assumed to be padding bytes. The padding bytes in the IP packet are silently discarded.

Identification field, flags field, and fragmentation offset field—The Internet Tuner 10G uses these fields for defragmenting IP packets. The section on IP fragmentation describes how these fields are used.

TTL (time to live) field—The time to live field is not parsed or kept for received IP packets.

Protocol field—The IP header field parsing module uses the protocol field to determine the protocol that is encapsulated in the IP packet. Table 1 shows the protocol field values that are supported by the Internet Tuner 10G.

TABLE 1

Supported protocol field decodes.

| Hex value | Protocol |
|---|---|
| 0 × 01 | ICMP |
| 0 × 06 | TCP |
| 0 × 11 | UDP |

If an IP packet is received with a protocol field value that is not supported, and if the unsupported protocol feature is enabled, then the IP module passes the IP packet to the host system. If the unsupported protocol feature is not enabled, the IP module silently discards the IP packet.

Header checksum field—The IP header field parsing module silently discards and does not parse or keep the IP header checksum field. The IP module uses the IP header checksum field to make sure the IP header checksum is correct. If the IP checksum is incorrect, then the IP module asserts the bad checksum signal, which goes to all the following protocol processing modules. The IP module continues to assert the bad checksum signal until the bad checksum signal is acknowledged.

Source IP address field—The IP header field parsing module parses the source IP address and sends it to the following TCP and UDP protocol processing modules. For received ICMP echo request packets, the source IP address field is swapped with the destination IP address field prior to the transmission of the ICMP echo reply packet.

Destination IP address field—The IP header field parsing module parses the destination IP address field and compares it to a list of valid IP addresses that the Internet Tuner 10G network stack should respond to. This IP address comparison may take more then one clock cycle, but parsing of the received IP packet continues. If, later, as a result of the IP address comparison, the received IP packet turns out to be misdirected, then the IP module will assert the bad IP address signal. The IP module continues to assert the bad IP address signal until it is acknowledged.

IP options field—If the save options feature is enabled, the IP module passes the IP options field to the host system. The IP module also passes the received IP packet header to the host system if the save options feature is enabled. If the save options feature is not enabled, then the options field of the received IP packet is silently discarded.

This section covers the raw IP receive module 2066. The raw IP receive module enables the internal processor 1688 to send arbitrary IP packets to the Internet Tuner 10G network stack 1610. The raw IP receive module may be used for diagnostic purposes or to allow the internal processor to perform functions such as IP packet defragmentation or IPsec decryption, for example. In order to use the raw IP receive module features, the internal processor first writes IP packet data into a memory buffer. The internal processor then writes the starting address of this memory buffer to the raw receive address register. The internal processor then asserts the receive bit in the raw receive command register, which initiates the transfer of the IP packet data. When the transfer of IP packet data is complete, the raw receive bit in the IP status register is set. If the raw receive interrupt enable bit is set, which is part of the IP interrupt enable register, then the raw IP receive module passes an interrupt to the internal processor. The raw IP receive module then clears the receive status bit by writing a one to the raw receive interrupt enable bit.

This section covers ICMP echo reply generation 2060. The ICMP echo reply module handles the generation of ICMP echo reply packets. The ICMP echo reply module handles all received ICMP packets. The ICMP echo reply module first parses the 8-bit ICMP type field and 8-bit ICMP code field of the ICMP packet to determine the message type of the received ICMP packet. If the ICMP message type of the received ICMP packet is an echo request, the user, through the host system, may program the ICMP echo reply module to automatically respond to these echo requests with an echo reply. If this automatic ICMP echo reply feature is enabled, then the data section of the received ICMP packet is stored in a memory buffer. The ICMP echo reply module verifies the entire received ICMP packet. If the received ICMP packet is free of errors, then the ICMP echo reply module adds the Ethernet header, the IP header, and the ICMP header to the data section of the received ICMP packet that is stored in the memory buffer. The ICMP echo reply module changes the type field of the ICMP packet stored in the memory buffer to 0×00. The ICMP echo reply module then modifies the ICMP checksum field by adding 0×08 using one's complement arithmetic. The ICMP echo reply module then swaps source and destination IP address fields in the IP header of the ICMP packet stored in the memory buffer. The ICMP echo reply module also swaps source and destination Ethernet address fields in the Ethernet header of the ICMP packet stored in the memory buffer. Once the new IP header and Ethernet header are created, the ICMP echo reply module asserts a transmit request to the sending arbitrator to transmit the ICMP echo reply packet.

The message type of the received ICMP packet may not be an echo request. If the message type of the received ICMP packet is not an echo request, the packet is an exception ICMP packet. The user, through the host system, may program the ICMP echo reply module to process exception ICMP packets in one of two ways. The ICMP echo reply module may either pass the exception ICMP packets to the internal processor, or the ICMP echo reply module may silently discard the exception ICMP packets. If the ICMP exception packets are to be passed to the internal processor, then the ICMP echo reply module passes the entire received ICMP packet, including the IP header, to the internal processor. The ICMP exception packets are sent to the internal processor via the IP exception handler module.

Figure 21:
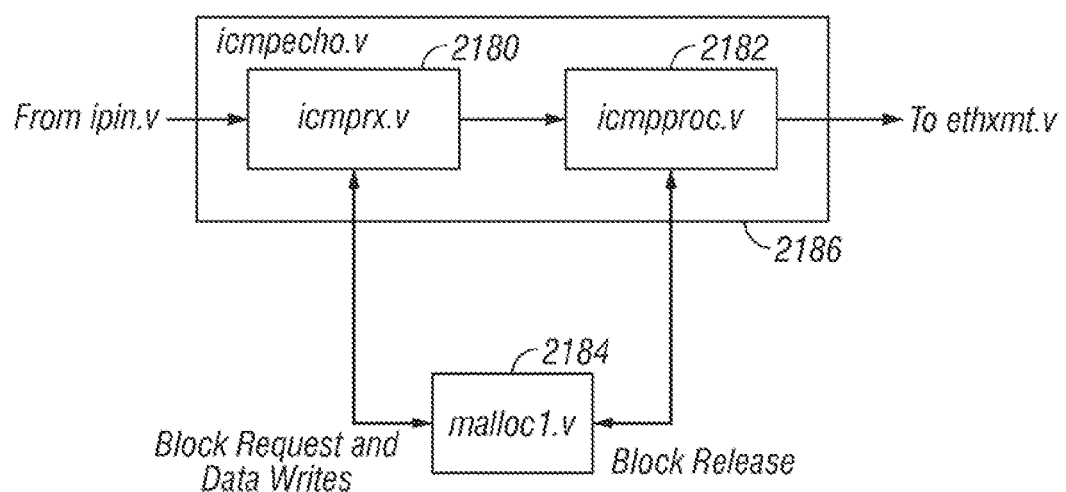
FIG. 21 is a block schematic diagram of an ICMP echo reply module according to the invention.
Figure 22:
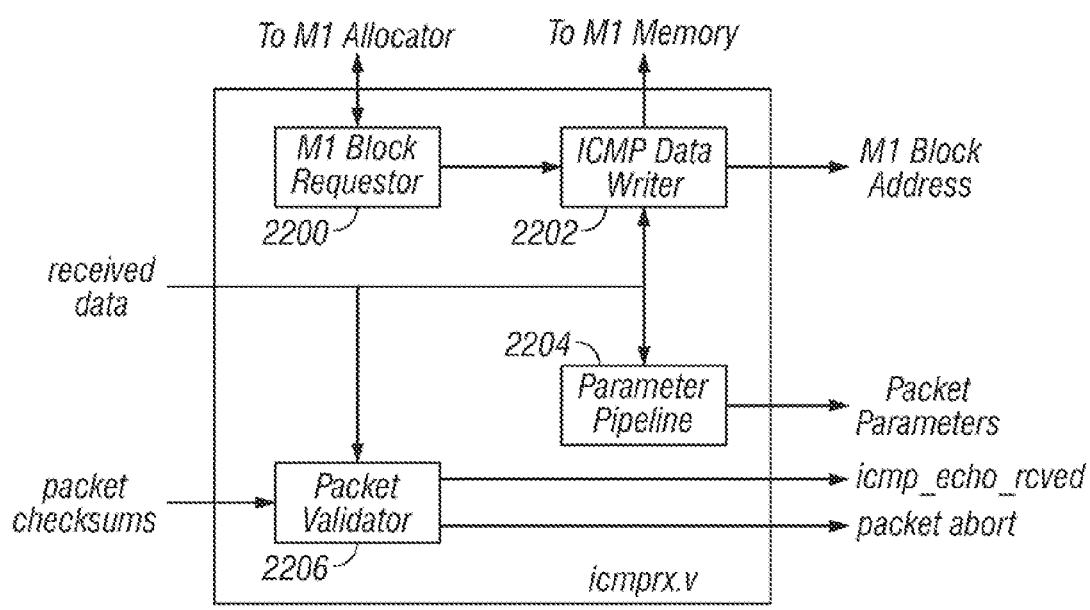
FIG. 22 is a block schematic diagram of an ICMP echo reply receive module according to the invention.

With respect to FIGS. 21 and 22, the ICMP echo reply module 2060 is made up of the ICMP echo reply receive module 2180 and the ICMP echo reply processor module 2182. The ICMP echo reply receive module receives ICMP packets and stores the contents of the ICMP packet in m1 memory. The ICMP echo reply receive module verifies the received ICMP packet be free of errors 2206. If the received ICMP packet is free of errors, the ICMP echo reply receive module passes IP header information from the received ICMP packet along with the address of the m1 memory block 2200 that contains the received ICMP packet 2202 to the ICMP echo reply processor module 2182.

Figure 23:
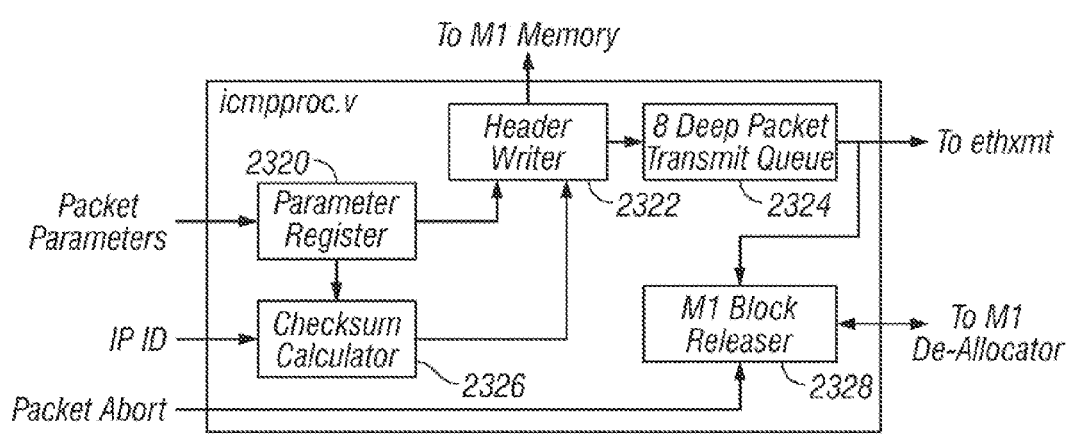
FIG. 23 is a block schematic diagram of an ICMP echo reply processor according to the invention.

Referring to FIG. 23, the ICMP echo reply processor module generates the Ethernet header and the IP header for the echo reply packet 2322. The ICMP echo reply processor module then assembles the ICMP echo reply packet in the m1 buffer block whose address was received from ICMP echo reply receive module. The ICMP echo reply processor module generates the ICMP checksum by adding 0×08 to the ICMP checksum of the received ICMP echo request 2326. This addition creates the correct ICMP checksum for the echo reply because the only difference between the echo request and the echo reply that affects the ICMP checksum is the difference in the ICMP code field (which changes from 0×08 to 0×00).

The ICMP echo reply processor module assembles the ICMP echo reply packet in m1 memory 2322. When assembly of the ICMP echo reply packet is complete, the ICMP echo reply processor module places the starting address of the ICMP echo reply packet in an ICMP echo reply packet transmission queue 2324. The ICMP echo reply packet transmission queue has room for eight entries. Once the ICMP echo reply packet transmission queue is full then any subsequently received ICMP packet is discarded. When the ICMP echo reply packet is ready for transmission, the ICMP echo reply processor module signals the Ethernet transmitter module 1766. The Ethernet transmitter module then signals back to the ICMP echo reply processor module when the ICMP echo reply packet has been successfully transmitted. The ICMP echo reply processor module then releases the m1 memory block that contains the ICMP echo reply packet 2328. The ICMP echo reply processor supports large ICMP echo reply packets that span multiple m1 blocks.

The ICMP echo reply receive module may detect an error during reception of an ICMP echo request packet (an error may involve a bad checksum, an invalid IP address, and so on). If the ICMP echo reply receive module detects an error, it releases the m1 memory block currently being written (and any previous m1 memory blocks that were used for the same ICMP echo request packet). The ICMP echo reply processor module handles this error condition via a packet abort signal that is passed between the ICMP echo reply receive module and the ICMP echo reply processor module.

This section covers IP fragmentation. The Internet Tuner 10G may handle IP fragmentation either directly in hardware or using the internal processor to defragment IP packets and then inject the defragmented IP datagram back into the Internet Tuner 10G network stack. The Internet Tuner 10G assembles the fragments of an IP datagram by combining fragments that have the same value for identification, source, destination, and protocol fields. The Internet Tuner 10G places each data section of each fragment in the relative position indicated by the fragment offset in that fragment's IP header. The first fragment will have the fragment offset set to zero, and the last fragment will have the more-fragments flag set to zero.

Figure 24:
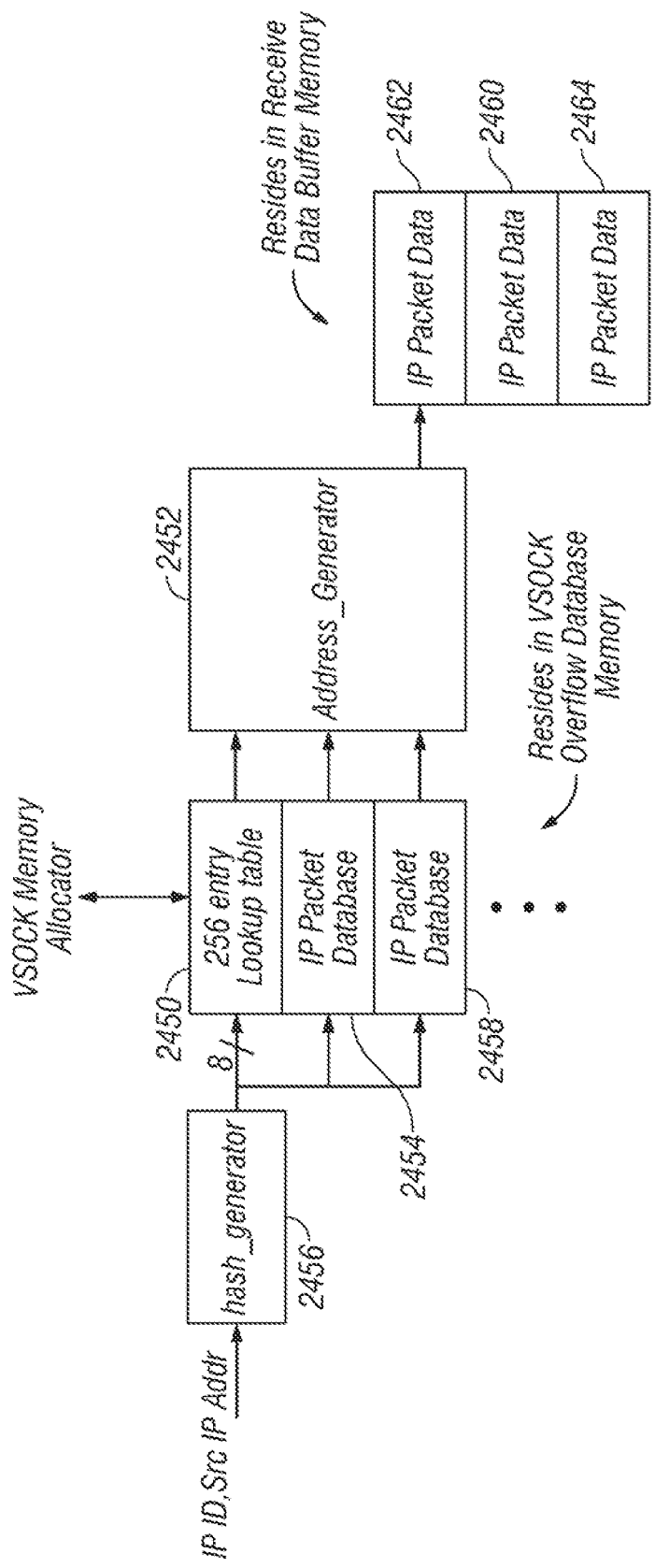
FIG. 24 is a block schematic diagram of a flow of information during IP defragmentation when defragmentation is performed in hardware according to the invention.

This section covers the IP fragmentation module 2064 that handles fragmented IP packets directly in hardware. With respect to FIG. 24, when an IP packet belongs to a fragmented IP datagram, the IP packet will have the fragment flag set in the IP packet header. The IP fragmentation module then performs the following steps:

The IP fragmentation module generates an 8-bit hash value using the 16-bit identification field of the IP packet header and the 32-bit source IP address of the IP packet header 2456.

The 8-bit hash value is used to look up a 32-bit memory address as well as an entry in-use flag 2450. If the entry in-use flag is not set, then this indicates that this is the first received IP fragment for this received IP packet.

The entry in-use flag is then set, and the IP packet database is initialized. The IP packet database 2454, 2458 resides in the VSOCK module overflow socket database memory area. Within the IP packet database is a pointer to memory (in the socket receive data memory space) that will hold the IP packet data. A timestamp is also included in the IP packet CB so that we know how long to keep this IP packet segment. If the timer expires, then all received IP packet segments are discarded.

If the fragment offset is set in the IP packet header, then the fragment offset is used to determine how far down into the memory buffer to start writing the received IP packet data 2452.

A counter keeps track of the total number of bytes received and is kept together with the IP packet 2462, 2460, 2464. This total bytes received counter is compared to the amount of data in the last IP packet fragment (indicated by the fact that the more fragments flag in the control flags field in the IP header is set to zero) plus the fragment offset of the last IP packet fragment. If it is calculated that all data for the fragmented IP datagram has arrived, then the socket information is passed on to the TCP/UDP protocol-processing layer.

Figure 25:
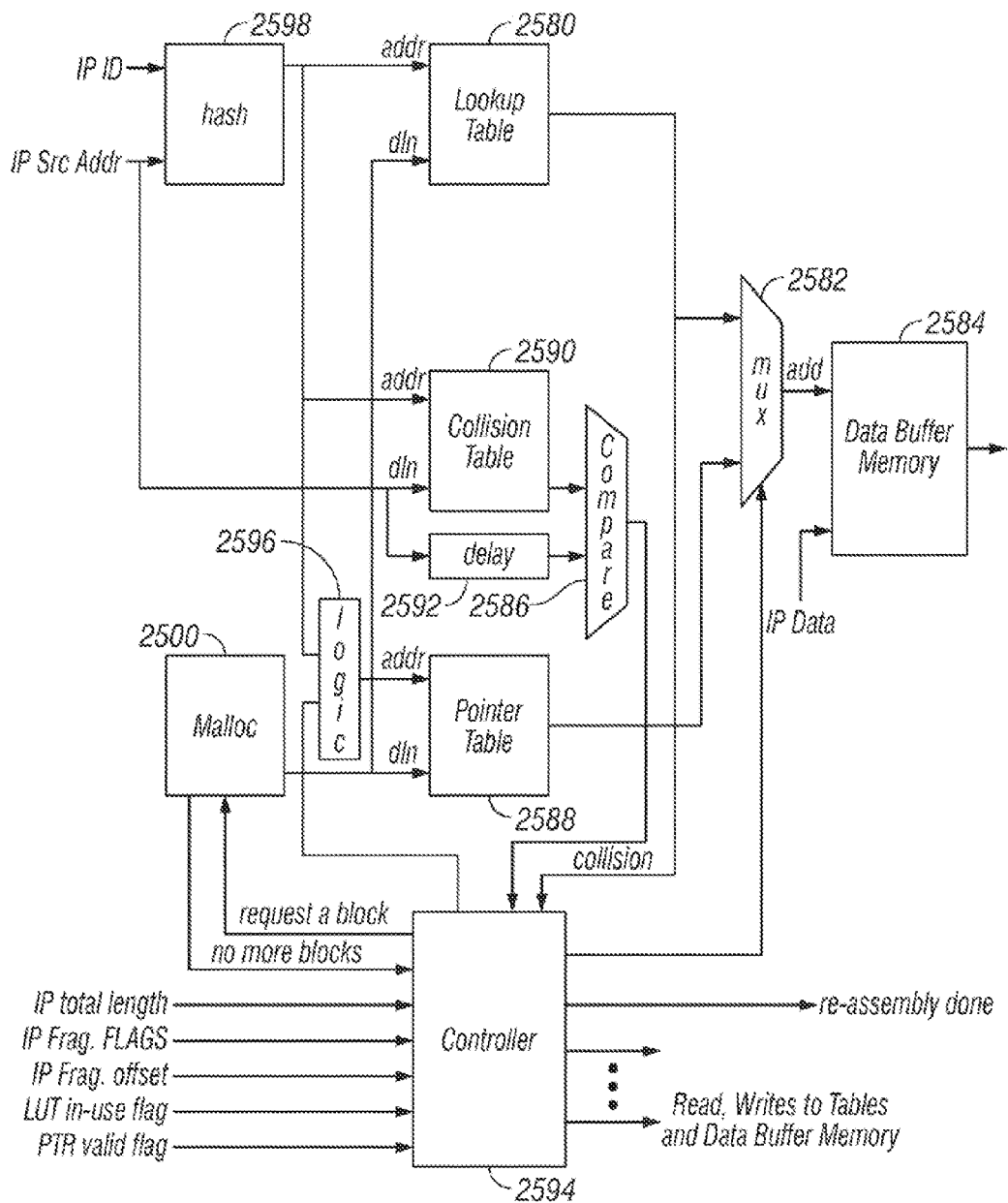
FIG. 25 is a block schematic diagram of an IP fragmentation module according to the invention.
Figure 26:
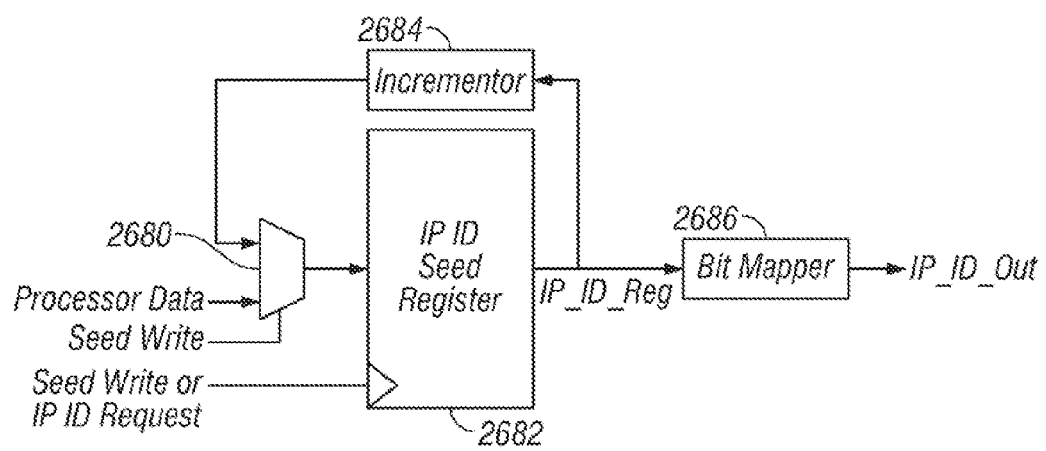
FIG. 26 is a block schematic diagram of an IP identification field generator module according to the invention.

Referring to FIG. 25, the additional information stored in the IP packet database consists of an IP packet collision table 2590 and an IP packet pointer table 2592. Each lookup table entry 2580 in use is associated with an IP source address and an IP packet identification pair. The pair is stored in the collision table. If the hashing 2598 hits an entry in the lookup table that is already in use, there are two possibilities:

The received IP packet fragment belongs to an IP datagram that we are already taking care of. The IP source address and the IP packet identification field of the received IP packet fragments match the value stored in the collision table entry.

The received IP packet fragment belongs to an unknown IP datagram. The IP source address and the IP packet identification field of the received IP packet fragment do not match the value stored in the collision table entry. That means that we have a collision so we will drop the received IP packet fragment.

Besides the in-use flag each entry in the LUT 2580 stores the starting address where a packet is going to reside in the receive data buffer memory. When the hashing 2598 hits an entry of the LUT that is not yet in use a request for memory is sent to the VSOCK module memory allocator module 2500, which calculates the starting address. The size of the memory blocks issued by the memory allocator module to the fragmentation block is fixed (2 kbytes). In case the IP packet to be defragmented fits in one block of memory, the IP packet fragments will be stored contiguously and the exact location in the memory block can be computed from the starting address and the IP fragmentation offset. The memory allocator module does not assign the memory blocks contiguously. If the IP datagram to be defragmented requires more than one memory block, the mapping of the packet fragments into the receive data buffer memory becomes more difficult. Based on the starting address, the IP fragmentation offset, and the IP length field we can compute when a memory block boundary is going to be crossed by a defragmented IP datagram. Every first time a memory block boundary is crossed a memory request must be sent to the VSOCK memory allocator module that will then issue the starting address of the next available block. The starting addresses of the additional blocks together with a valid flag are stored in the pointer table. Since we want to be able to handle packets carried in Ethernet jumbo frames (which are at most 9 kbytes) we may need up to eight memory blocks. This means that for each entry in the LUT, we need to be able to store seven pointers in the pointer table (256× 7=1792 pointers).

The IP fragmentation module requires an IP fragmentation module controller 2594. The tasks of the IP fragmentation module controller are:

Generation of addressing, write signals and read signals for the pointer tables and the receive data memory buffer Requesting memory blocks from the VSOCK memory allocator module 2500 (in case the memory allocator module does not have any more memory blocks to give away, we will have to wait for the packet assembly timer to expire, so the IP packet will be dropped)

Signal to the TCP layer that the defragmentation of an IP datagram is complete

Once the defragmentation of an IP datagram is complete all in-use flags in the LUT and the valid flags in the pointer table are cleared Management of the timeouts Monitor the total number of bytes received for IP packets Extract the needed fields from the incoming stream of IP data This section covers an alternative method to handle IP defragmentation. The Internet Tuner 10G may also handle IP defragmention by using the internal processor and the raw IP receive module. If the received IP packet is fragmented, then the received IP packet is passed to the internal processor. The internal processor then handles the steps of assembling the packet fragments into a complete IP datagram. When the IP datagram is complete, it is injected back into the bottom of the network stack via the raw IP receive module.

This section covers the IP identification field generation algorithm. The internal processor can set the IP identification field seed value by writing any 16-bit value to the IP identification field start register 2682. The IP identification field generator module takes this 16-bit value and performs a mapping of the 16 bits to generate the IP identification field 2686. The IP identification field may then be used by the requesting module. The internal processor, the TCP module, and the ICMP echo reply generator module may all request an IP identification field. The IP identification field generator module seed register is incremented 2684 every time a new IP identification field is requested. The identification field generator module bit mapper 2686 rearranges the IP identification field register value, IP_ID_Reg, such that the identification field generator module bus, IP_ID_Out, does not simply increment in value for each request.

Figure 27:
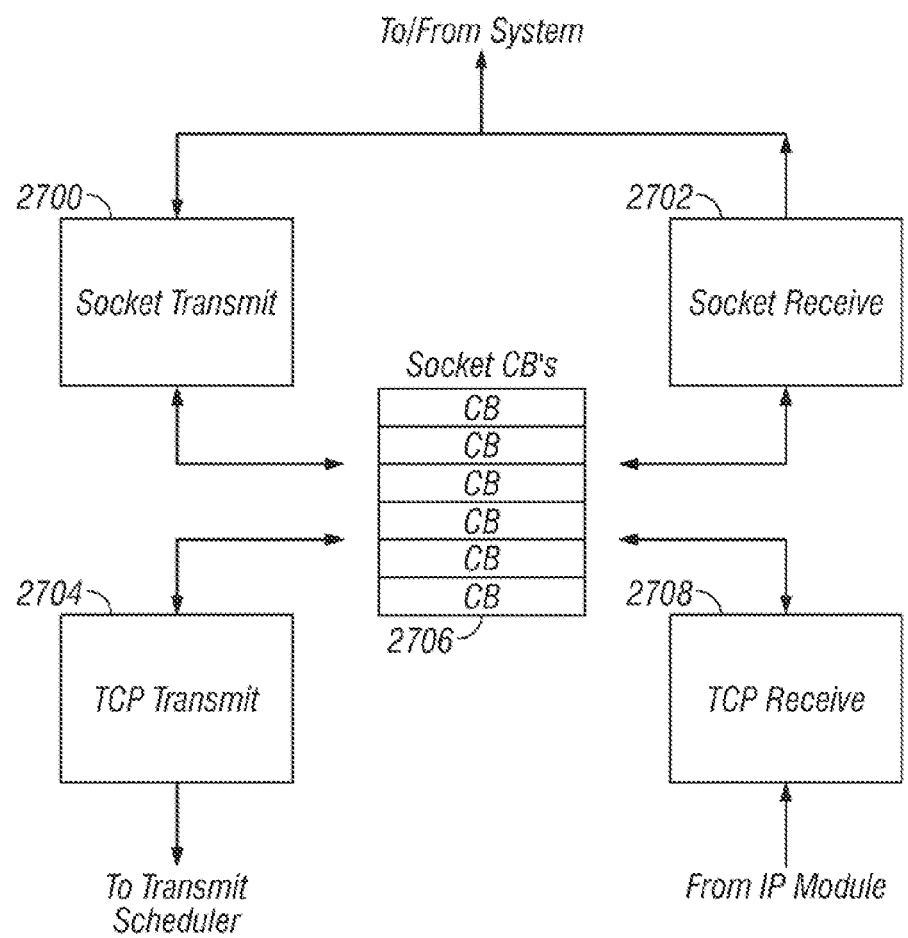
FIG. 27 is a block schematic diagram of a top-level view of the TCP module according to the invention.

The following sections cover the TCP module 1752, which handles both TCP and UDP transport protocols. With respect to FIG. 27, the TCP module is split into four smaller main modules; the socket transmit interface 2700, the TCP transmit interface 2704, the TCP receive interface 2708, and the socket receive interface 2702.

The following list describes the TCP capabilities that are supported by the Internet Tuner 10G architecture:

support for up to 64,000 sockets support for TCP out-of-order packets slow-start algorithm fast-retransmission and fast-recovery algorithms selectable Nagle algorithm scaling-window support selective ACKs (SACK) support protection against wrapped sequence numbers (PAWS) support timestamp support keep-alive timers A socket control block (CB) 2706 contains the information, state, and parameter settings that are unique to each connection, and are the key components of the virtual socket or VSOCK architecture in the Internet Tuner 10G.

Figure 28:
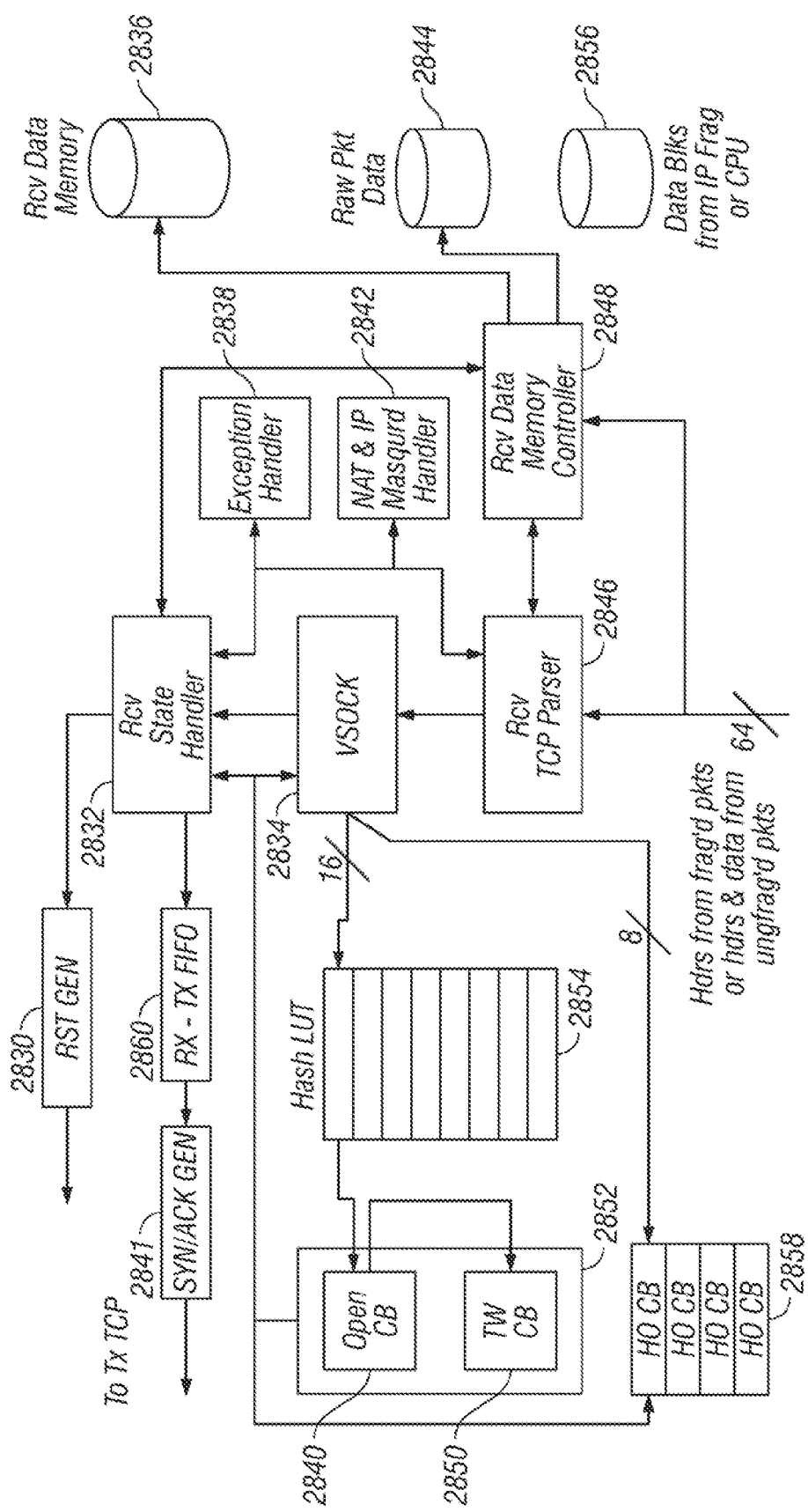
FIG. 28 is a block schematic diagram of a TCP receive data flow according to the invention.

This section covers the TCP receive module 2708. FIG. 28 shows the TCP receive data flow.

For normal IP traffic, an IP packet is received via the 64-bit TCP receive data path. The IP packet header is passed to the TCP parser module 2846, and the packet data is passed to the receive data memory controller 2848. For a fragmented IP packet, the packet data is passed via memory blocks while the packet header information is passed via the normal receive path. This allows the memory blocks from IP fragmentation to have the same format as the data blocks written by the receive data memory controller. The internal processor also uses memory blocks to inject received packet data via the receive data memory controller.

The receive TCP parser is responsible for parsing the TCP header information and passing parameters to the VSOCK module 2834 and receive-state handler module 2832. If the receive TCP parser does not know what to do with the packet data, it passes the packet data to the exception handler module 2838. In addition, the receive TCP parser module may also be programmed to send all packet data to the exception handler module.

The VSOCK module (described in detail elsewhere) takes the local and remote IP and port addresses and returns a pointer to a CB.

The NAT and IP masquerading module 2842 (described in detail elsewhere) determines if the received packet is a NAT packet or IP masquerading packet. If the received packet is a NAT packet or IP masquerading packet, the NAT packet or IP masquerading packet is passed to the internal processor as a raw packet.

The receive-state handler module (described in detail elsewhere) keeps track of the state of each connection and updates the CB corresponding to that connection.

This section covers the receive TCP parser module 2846. The receive TCP parser module passes TCP packet header information to the other TCP receive modules. The TCP parser module contains the internal processor registers needed to inject data into the receive datapath in the Internet Tuner 10G network stack from the internal processor. The internal processor must setup a memory block, then program the receive TCP parser registers with the necessary information. The receive TCP parser module performs a partial checksum of the TCP header, adds this partial checksum to the partial checksum from the receive data memory controller, and compares the result of this checksum addition to the checksum in the TCP header. For a fragmented IP packet, the receive TCP parser module checks the checksum in the TCP header against the checksum in the last IP packet fragment sent.

The IP module must set the IP fragmentation bits and insert the first memory block pointer, last memory block pointer, index, and partial checksum into the datapath of the appropriate packet fragment. Also, the TCP receive module requires the IP protocol field in order to calculate the TCP pseudoheader.

This section covers the receive data memory controller module 2848. The receive data memory controller module transfers data from the 64-bit bus between the IP and TCP modules to data memory blocks in the receive data memory. There are two modes of data transfer. The normal mode of data transfer is used to store TCP data into memory blocks. The raw mode of data transfer is used to store entire packets into memory blocks. The raw mode of data transfer is used for NAT and IP masquerading.

This section covers the VSOCK module 2834. The VSOCK module implements the equivalent of virtual memory management in optimized hardwired logic. Comparable functions are normally performed by complex software running on a programmable processor. The result of using the VSOCK module is that the Internet Tuner 10G has access to a virtual number of sockets. The number of sockets is limited only by the amount of memory either connected on-chip or connected externally, or connected both on-chip and externally. Sockets are established connections. Connections pass through three stages: half-open (HO) 2858, open 2840, and time-wait (TW) 2850. Information about each connection is stored in a control blocks (CB).

Figure 29:
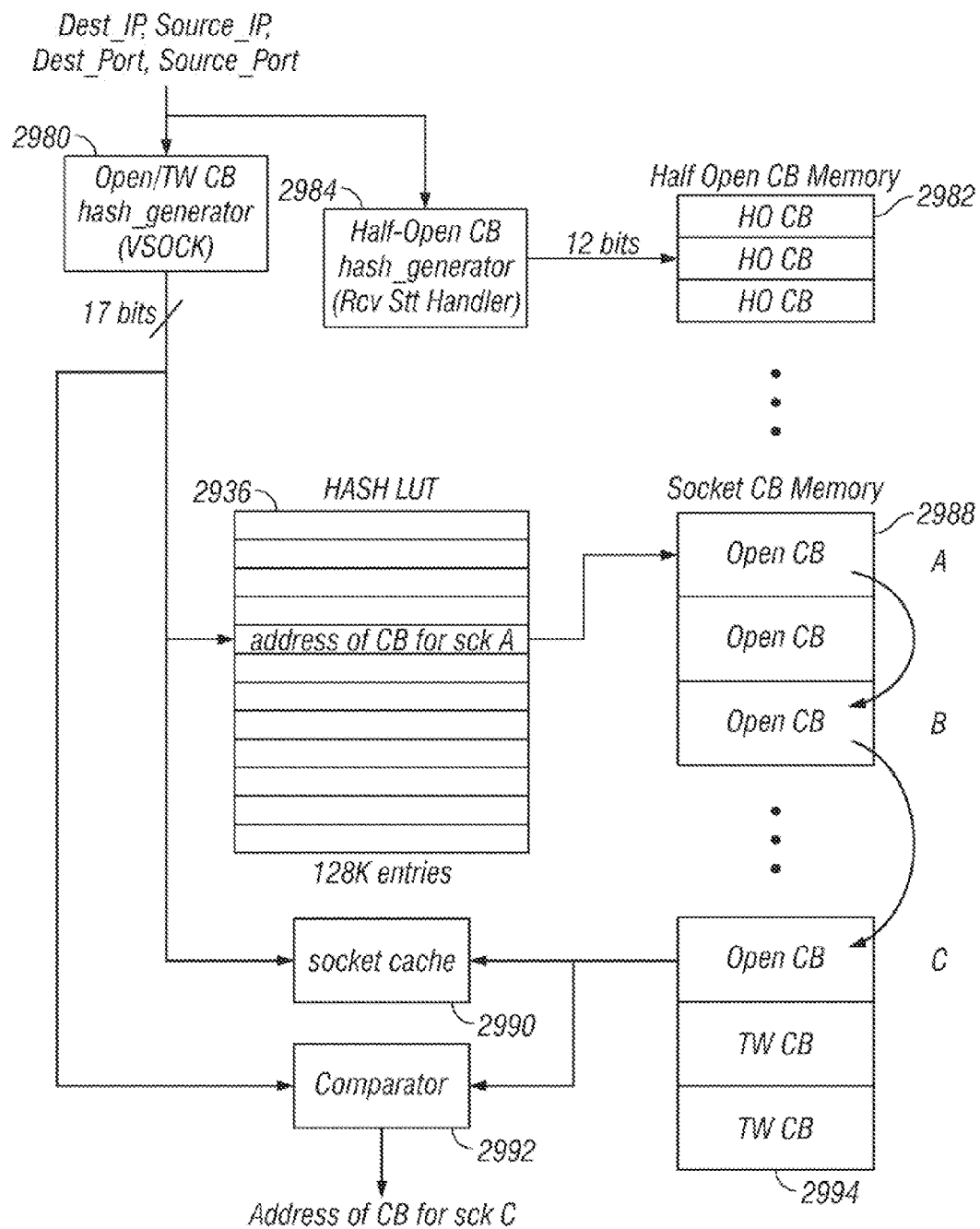
FIG. 29 is a block schematic diagram of the VSOCK and receive-state handler control block search resolution flow according to the invention.

FIG. 29 shows the VSOCK and receive-state handler control block search resolution flow.

The VSOCK module 2834 is passed the source and destination IP and port addresses from a received packet. The VSOCK module returns the socket open CB pointer or the TW CB pointer to the receive-state handler module. A locking mechanism ensures that while one module is operating on a socket CB, no other module can be operating on that socket CB. VSOCK performs a hash on the source and destination IP addresses and source and destinations port addresses. The hash function 2980 generates a 17-bit value that serves as an index into the open/TW CB lookup table (LUT) 2986. The open/TW CB LUT entry at that indexed location holds a pointer to an open CB 2988 or TW CB 2994.

See the section that describes the receive-state handler module for an explanation of the handling of HO CBs.

The pointer from the open/TW CB LUT points to the first CB of a linked list of zero or more socket CBs, each with different IP and port addresses, but which result in the same hash number (resulting from hash collisions). VSOCK goes down this chain, comparing the IP and port addresses of the received packet to the entries in the chained socket CBs, until a match is found or the end of the chain is reached. If a match is found, a pointer to the socket CB is passed to the receive-state handler module. It is an error if the VSOCK module reaches the end of this chain. The VSOCK module then informs the TCP parser module of the error.

The chain of socket CBs connected to the open/TW socket CB LUT entry contains open CBs and TW CBs. The open CBs are first in the chain. There is a maximum number of open CBs, determined by the receive TCP maximum open CBs per chain setting. TW CBs are chained after the open CBs. There is also a maximum number of TW CBs per chain. An open CB is created when the three-way TCP handshake completes, and a HO CB is moved to the open CBs by the receive-state handler module. A TW CB is created from an open CB by the receive-state handler module when the last ACK is sent in the FIN sequence. If there is no more room in either case, an error is returned to the receive-state handler module.

A CB cache for open CBs is implemented for open CBs that are further than a set number of links from the LUT entry. A bit in the open CB is set when it is in the CB cache. The CB cache is searched in parallel to the 17-bit hash and LUT operations.

This section covers the receive-state handler module 2832. If a SYN packet is received, a 12-bit hash is run in addition to invoking VSOCK (which performs a 17-bit hash and searches for an open CB or TW CB), and the destination port is checked against an authorized port list. If the port is on the authorized port list and VSOCK 2834 does not find a matching open CB or TW CB, the 12-bit hash result is used as an index into the HO CB table 2858. If VSOCK finds a matching open CB or TW CB, a duplicate CB error is sent to the internal processor and the SYN packet is dropped. If there is already an entry in the HO CB table with different IP and port addresses, the received packet information overwrites the old information. This overwriting operation allows resources to be conserved in a SYN packet flood or denial-of-service (DOS) attack. The overwriting operation also eliminates the need to age the HO CB table. One side result is that connections could be silently dropped that have already been SYN/ACK'ed. The pointer to the HO CB is passed to the receive-state handler module. Only connections that have been opened by the remote side (the local side receives a SYN packet, not a SYN/ACK packet) are entered in the HO CB table. Connections opened by the local side are tracked by open CBs.

If an ACK packet is received, the 12-bit hash is run and VSOCK is invoked. If there is a hit in the HO CB via the 12-bit hash, but VSOCK does not find an Open or TW CB and if the sequence and ACK packet numbers are valid, then the three-way handshake for the connection is complete, and the CB is transferred to the open CB table by the receive-state handler module. If VSOCK does find an open CB or TW CB, but there is no hit with the 12-bit hash, then the ACK packet is checked for valid sequence and ACK numbers by the receive-state handler module, as well as for duplicate ACK packets.

Once the VSOCK module finds the correct socket CB, then other pertinent information is read and updated by the receive-state handler module. TCP data are stored into either large (2 kbytes) or small (128 bytes) memory buffers. A single segment may span memory buffers. If one size of memory buffer runs out, the other size of memory buffer is used. When data is received for a given socket, its Data_Avail bit in the socket hash LUT is also set.

The receive-state handler module uses a state machine such as that described by Stevens (see Stevens FIG. 18.12 in Section 18.6).

If the receive-state handler module determines that a RST packet is needed, then it forwards the appropriate parameters to the RST packet generator module 2830. If a SYN/ACK packet or ACK packet is needed, it sends the CB handle to the RX-TX FIFO 2860.

Figure 30:
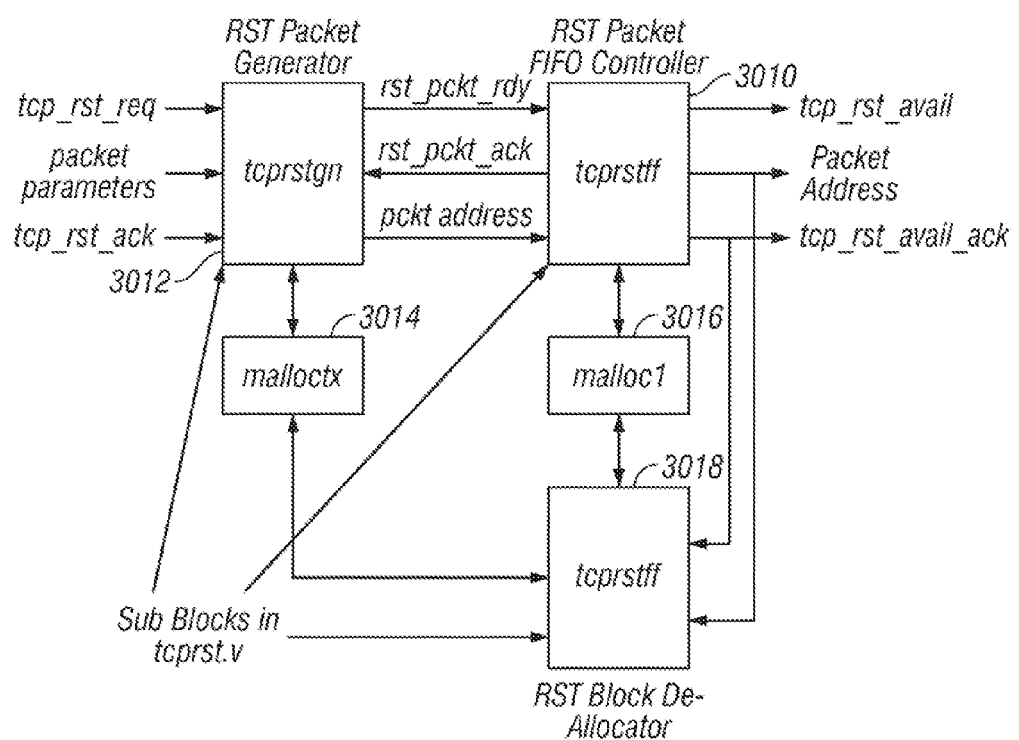
FIG. 30 is a block schematic diagram of the RST packet generation data flow according to the invention.

This section covers the RST packet generator module 2830. with respect to FIG. 30, the RST packet generator module takes the MAC address, the four socket parameters, and sequence number received in the packet that needs a RST packet response, and builds a RST packet. It first requests a block from MTX memory 3014 in which to build the packet. Since RST packets are always 40 bytes long, the RST packet will fit in any size MTX block. The RST packet generator module will always request the smallest block available (normally a 128-byte block). The RST packets will have their IP identification field fixed at 0×0000 and their don't fragment bit is set to one in the IP header.

After RST packet generator module builds the RST packet, the RST packet generator module stores the starting address of the MTX block containing the RST packet in a RST packet transmit queue. The RST packet transmit queue is built 3010 in m1 memory. A block of m1 memory is requested 3016 and used until it is full. The last entry in each m1 block will point to the address of the next m1 block to be used. Therefore, the RST packet queue can grow dynamically. The RST packet generator module accesses m1 memory 32 bits at a time (since MTX block addresses are only 26 bits). The RST packet transmit queue length may grow as long as m1 memory is available. If no more m1 memory is available for the RST packet transmit queue, then the RST packet generator module will silently discard RST packet requests 3018 from the receive-state handler module. Discarding the RST packet has an effect on the network that is similar to dropping the RST packet in transmission. Since the connection is non-existent anyway, dropping the RST packet in this situation does not have a serious affect on performance.

The output of the RST packet transmission queue is passed to the TCP transmit packet scheduler module. When the TCP transmit packet scheduler module indicates to the RST packet generator module that the RST packet has been sent, then the MTX block that was being used for that RST packet is released. When all the entries in an m1 memory block are sent, and the link address to the next m1 block has been read, then the m1 memory block is released.

This section covers the RX to TX FIFO 2860. This FIFO is used to queue SYN/ACK packets and ACK packets that the receive-state handler module 2832 determines need to be sent in response to packets that have been received. The receive-state handler module passes the following information into the RX to TX FIFO:

The CB address containing the socket information (16 bits)
The CB type (2 bits; 00=HO, 01=Open, 10=TW)
The packet to be sent (1 bit, 0=SYN/ACK, 1=ACK)

Each RX to TX FIFO entry is four bytes long and is stored in the miscellaneous memory. Currently, the RX to TX FIFO is allocated 4 kbytes, which provides a FIFO depth of 1,000 entries. The output of the RX to TX FIFO is fed to the SYN/ACK packet generator module.

This section covers the SYN/ACK packet generator module 2841. The SYN/ACK packet generator module takes information output from the RX to TX FIFO 2860, and looks up the other pertinent information from the specified CB (either HO CB 2858, open CB 2840, or TW CB 2850) and then builds the desired packet (either a SYN/ACK packet or ACK packet). Like the RST packet generator module 2830, the SYN/ACK packet generator module first requests a block from MTX memory in which to build the packet. Since SYN/ACK packets and ACK packets are always 40 bytes long, the packet will fit in any size MTX block. The SYN/ACK packet generator module will always request the smallest block available (which is normally a 128-byte block).

After it builds the SYN/ACK packet or ACK packet, the SYN/ACK packet generator module puts the starting MTX block address into a 16-deep queue that then feeds the TCP transmit packet scheduler module. If the RX to TX FIFO passes a programmable high watermark, then the transmit packet scheduler module is notified of the situation and increases the sending priority of these packets.

This section covers NAT and IP masquerading. The NAT and IP masquerading module 2842 works in parallel with the VSOCK module. The NAT and IP masquerading module decodes the incoming packet to see if the packet is in the pre-specified NAT or IP masquerading port range. If the packet is in the NAT or IP masquerading port range, then a signaling mechanism is used to indicate to the VSOCK block that it is a NAT packet. When this occurs, then entire packet is stored in the receive memory buffer.

The packet will then be transferred to the host system at some point. The driver in the host system is then responsible for performing routing functions, replacing the header parameters and sending the packet to the proper network interface.

This section covers the exception handler module 2838. The exception handler module sends packets to the Internet Tuner 10G internal processor that cannot be handled by the Internet Tuner 10G network stack.

This section covers the memory block control circuit and explains the following functions:

Reserve memory blocks—The memory block control circuit keeps a small memory block and a large memory block available for use at all times as reserves. The reserves assure that there is little delay when data must be written into a memory block. The memory block control circuit also processes the block requests and the data writes in parallel as far as possible. The reserve memory blocks are initialized out of reset.

Initialization and memory block size selection—Parameters for the TCP or UDP segment are initialized. The size of the memory block to be used is determined by the TCP length information and the TCP header length information from the IP parser module. If the size of the data section (TCP length minus TCP header length) fits into a small memory block, the reserve memory block is used, and another small memory block is requested to refill the reserve memory block. Otherwise the reserve large memory block is used, and another large memory block is requested to refill the reserve memory block. If a small block is not available, a large block is used. However, if a large block is needed but not available, small blocks are not used. See tcp_in_rd Generation above.

Writing aligned TCP data to memory block—Data in the TCP packet is aligned if there is an odd number of option half-words (each 32 bits wide) in the header, resulting in data that starts on a 64-bit boundary. If the data is aligned, it can be put directly into the memory blocks as it comes up from IP. The address of the first block for the segment is send to a state machine. A count is kept of the space remaining in the block, as well as the data left in the TCP segment. A record must also be kept if a memory block has already been filled. When the end of the TCP segment is reached, if a previous block was filled, then it must be linked to the current block. Also, the link in the current block header is cleared, and the data length and running checksum of the data is written to the block header. The length is a function of the number of bytes in the last 64-bit word, as determined by the bits in ip_in_bytes_val. If the block runs out of room before the end of the segment, then the data length and running checksum are written to the block header, and a flag is set indicating that a block has been finished. The remaining data in the segment is used to determine whether the large or small reserve memory block is used. The same rules as in the preceding paragraph are used if a block size runs out. The address of the last memory block must be sent to the state machine.

Writing unaligned TCP data to memory block—If the data in the segment is unaligned (ip_in_data[63:0] contains data that will go into two different memory block writes) then there must be an extra cycle at the beginning to store the first lo 32-bit half-word from IP, so that it can be written as the hi 32-bit half-word in the memory block. The high 32-bit half-word in the next bus cycle from IP is written as the low 32-bit half-word in the same cycle as the stored half-word. The counts and checksum calculations must also be adjusted to handle this. Otherwise, unaligned data is handled in the same way as aligned data, with the same termination cases.

Writing UDP data to memory block—UDP data is always aligned, so UDP data is handled in the same way as TCP aligned data. The same termination cases apply.

Checksum calculation—The checksum is calculated as described in RFC 1071. In this block, the checksum is only calculated on the data. The parser module calculates the header checksum, and the state machine combines the two and decides what to do with a packet with a checksum error.

This section covers the socket receive module 2702. The socket receive module handles the interface for received data between the Internet Tuner 10G and the host system.

Figure 31:
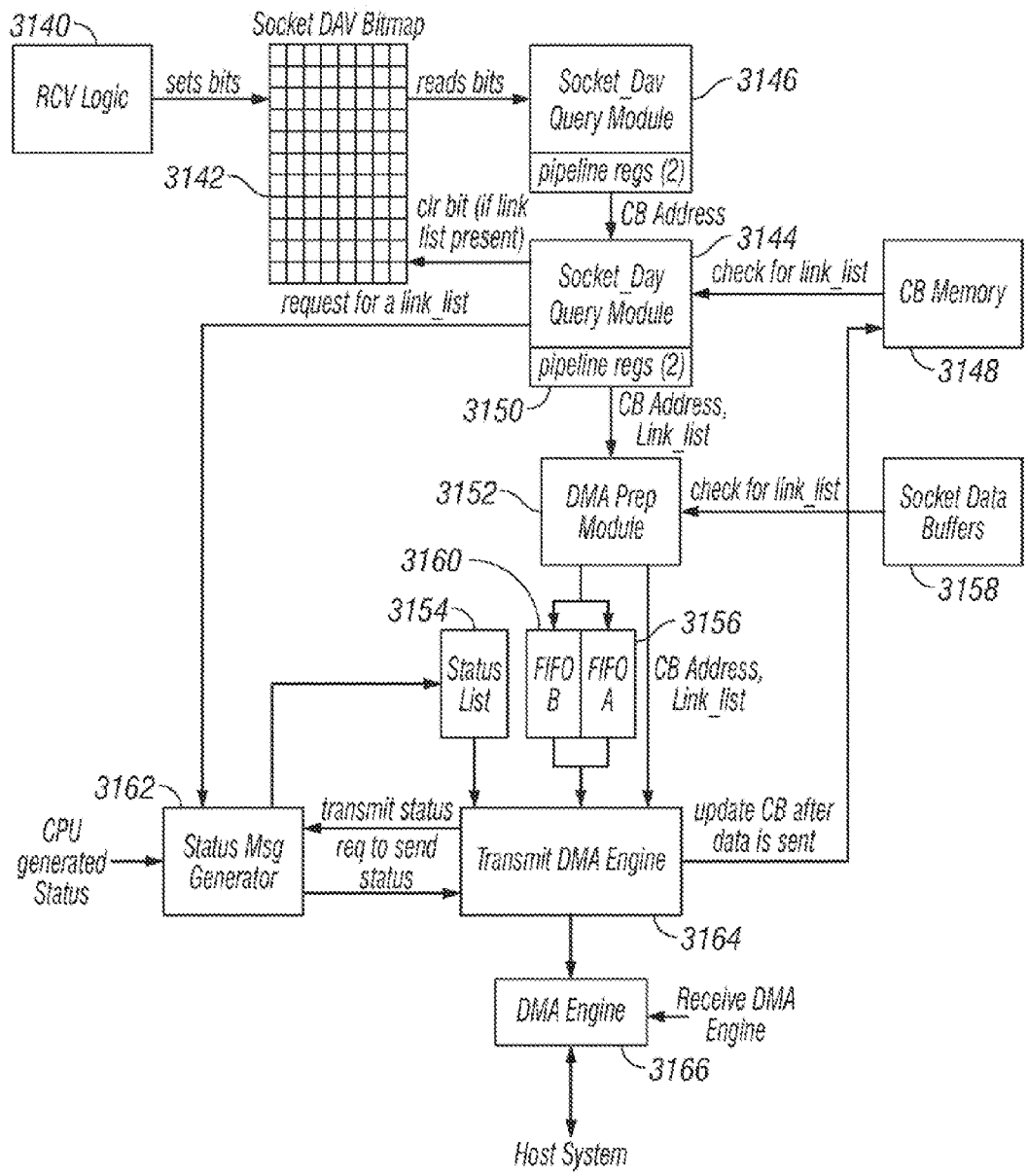
FIG. 31 is a block schematic diagram of the socket receive data flow according to the invention.

Referring to FIG. 31, the process starts with the receive logic 3140 setting a bit in the socket receive DAV bitmap table 3142. This is a table that has a bit associated with each of the 64K sockets (therefore the table is 8 kbytes). By knowing the location of the CB, the appropriate bit is set.

The Socket_DAV query module 3146 is a block that in the background is continuously scanning this bitmap table. When it comes across a set bit, it generates the corresponding CB address, and checks the CB structure 3148 to see if it contains a valid link_list block 3144. This block consists of a 64-bit memory address, and a 16-bit length. If the CB does have a valid link_list block, then the CB address, and the link_list information is passed to the DMA Prep module 3152 (via a two stage pipeline register pair). The Socket_DAV module 3144 also clears the CB's corresponding bit at that time. If the CB does not contain a valid link_list block, then a status message is generated 3162 for the socket informing the host that data is available for the socket, but no valid transfer block information exists for that socket. In this case, the corresponding bit in the bitmap table is not cleared yet. The CB can also be updated in this case to that we know we have already sent out a status message to the host asking for a link_list block (this is needed so that we don't land up sending multiple status messages for the same CB).

If a valid link_list block did exist, then the next step is that the CB and transfer information is sent to the DMA prep module 3152. This module is responsible for reading the data from the socket data buffer and putting it into one of 2 ping-pong transfer FIFOs 3160, 3156 for the DMA engine. When this is complete, it sends a request to the Transmit DMA engine 3164 that there is data to be transferred. The link_list info is also passed to the Transmit DMA engine 3166.

When the Transmit DMA engine gets this request, it signals to the main DMA engine that we want to do a DMA transfer to the host. When we are granted the bus, the DMA engine will read data out of the ping pong buffers and send them to the host. When the transfer is complete, the CB for the socket is updated, and a status message generated indicating that the data has been sent to he host.

The Status message generator 3162 is the module that is responsible for actually generating the messages, and writing them into a status message block of memory 3154 (1K bytes). Status message generation requests can come from the Transmit DMA engine, the Socket DAV Query module, or the CPU.

This section covers the Socket Transmit module 2700. The following module handles the interface for transmitting data between the Internet Tuner 10G and the host system.

Figure 32:
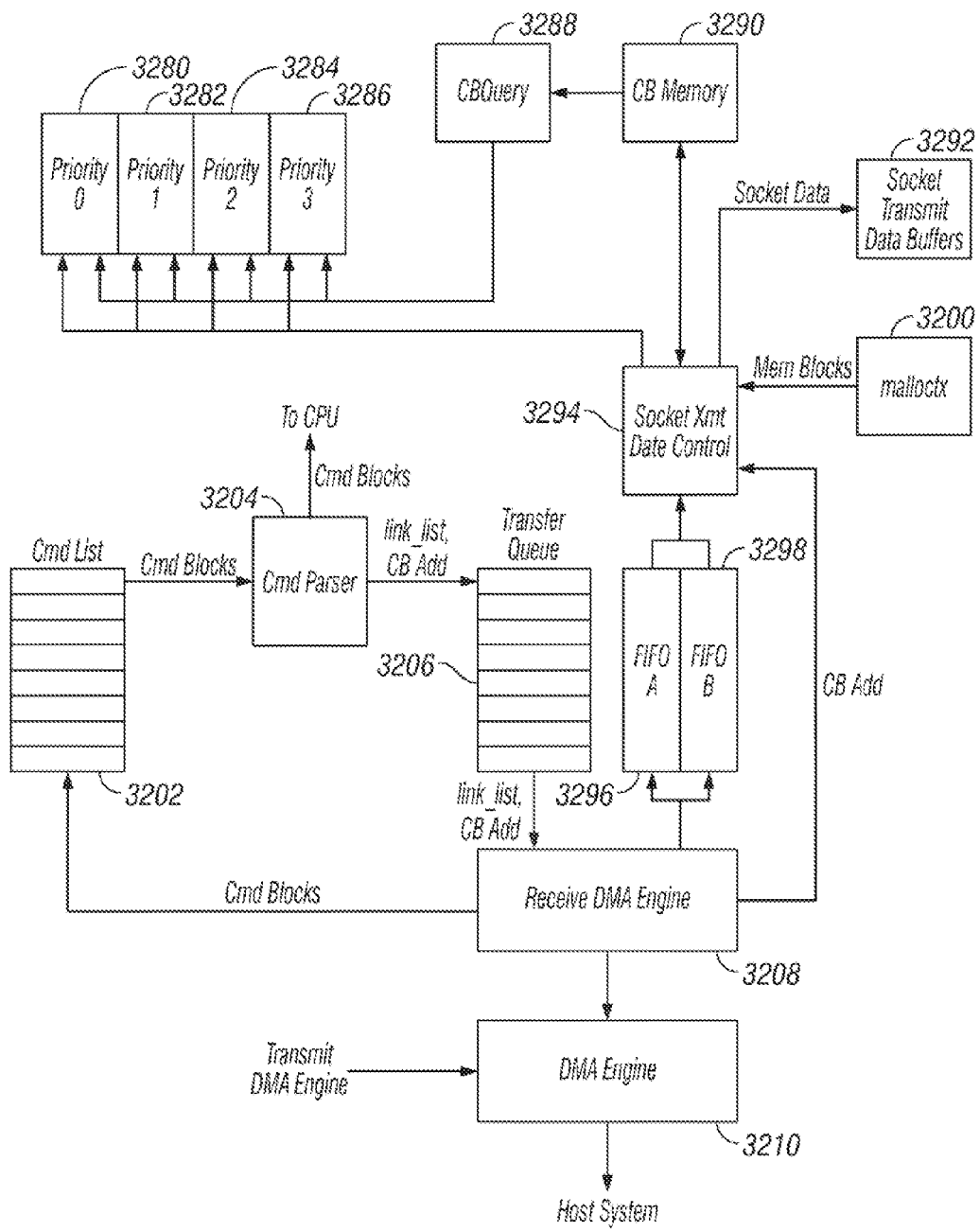
FIG. 32 is a block schematic diagram of the socket transmit data flow according to the invention.

With respect to FIG. 32, the flow starts with the reception of a command block list from the host. This is received via a DMA transfer, and placed into the Command List 3202. From here blocks are extracted and parsed by the Command Parser module 3204. Commands that are understood by the parser are executed and those that are not understood are sent to the local processor.

If the command is to transfer data, then the link_list information is extracted from the command block, along with the CB address, and placed on a Transfer Queue 3206.

The receive DMA engine module 3208 takes entries off this queue and executes the data transfer from host memory. Data is placed into a pair of ping-pong FIFO buffers 3296, 3298. The CB address associated with the data just received, is passed to the socket transmit data control module 3294.

The socket transmit data control module takes data from the FIFOs and places them into the transmit socket data memory 3292. It gets block addresses from the malloctx memory allocator 3200. The control module will also query the socket CB for the priority level of the socket. When all the data has been transferred to the data buffer, the module will put the CB address into one of the four priority queues 3280, 3282, 3284, 3286. The socket transmit control module will also update the socket CB 3290 with the new data transmit count information.

When data is transferred from the DMA receive FIFOs into socket data memory, a running checksum is performed at that time. The check sums are calculated on a per block basis. This helps cuts down on transmission latencies later as data need not be read through again.

The following sections cover the TCP transmit module 2704. The TCP transmit module is responsible for determining which socket should be serviced next for data transmission, and for updating the socket CB blocks accordingly.

Figure 33:
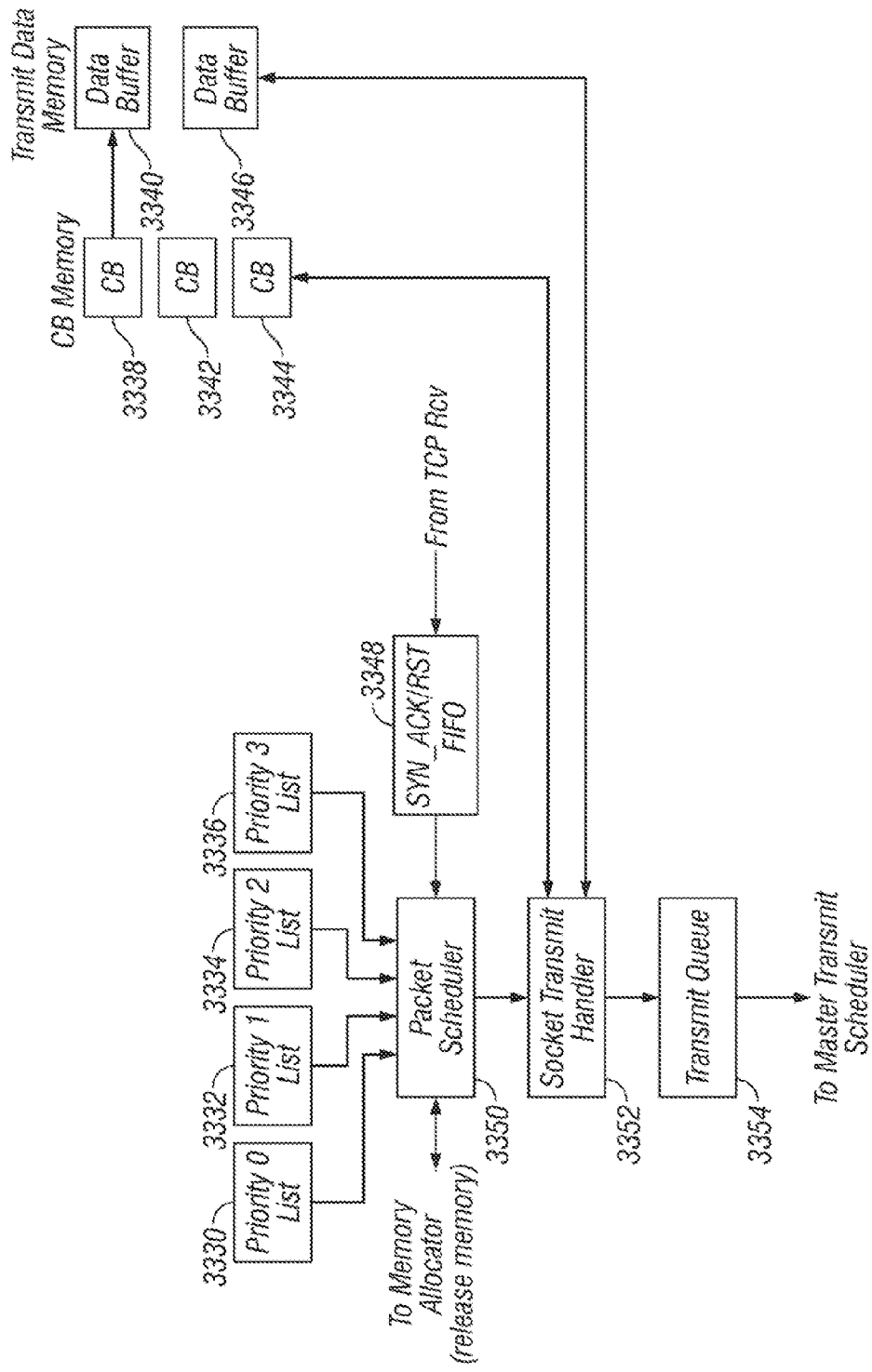
FIG. 33 is a block schematic diagram of the TCP transmit module data flow according to the invention.

Referring to FIG. 33, the TCP transmit data flow starts with the socket query module, which goes through the XMT_DAV Bit table looking for entries that have their transmit data available bits set. When it finds one, then it puts that entry into one of the four queues 3330, 3332, 3334, 3336, according to the socket's User_Priority level. Sockets with priority level 7 or 6 will get put into queue list 3 3336, levels 5 and 4 will get put into queue list 2 3334, levels 3 and 2 will get put into queue list 1 3332, and levels 1 and 0 will get put into queue List 0 3330.

These lists all feed a packet scheduler 3350. This scheduler is responsible for pulling packets off of the priority cues in a non-starvation manner. The actual arbitration pattern is programmable and is covered in the next section. The scheduler also arbitrates between sending data packets out as well as SYN_ACK and RST packets that were generated from the HO support module.

When the packet scheduler determines which packet to send out next, it forwards this information to the socket transmit handler module 3352. The socket transmit handler module reads the socket CB information 3338, 3342, 3344, generates the packet headers, updates the CBs, and passes the packet transmit information to the transmit queue 3354. All packet headers are generated in separate memory buffers 3340, 3346, which are then pre-pended to the data buffers. This also applies if the data to be sent starts in the middle of a data buffer. In this case, the point from the packet header data buffer will point to the first byte of data to be sent. A locking mechanism is used so that this module does not modify the same socket CB that another module may be operating on simultaneously.

The transmit queue module is responsible for queuing data packet to be sent to the master transmission arbitrator.

Figure 34:
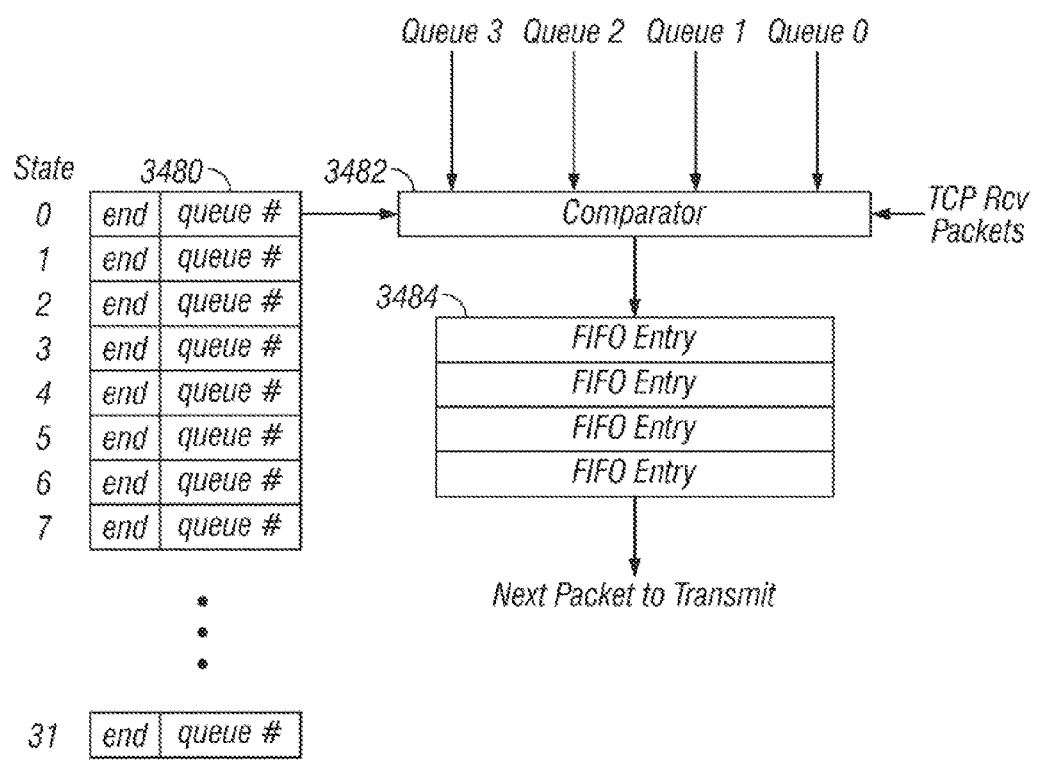
FIG. 34 is a block schematic diagram of the packet scheduler module according to the invention.

This section covers the packet scheduler module 3350. The packet scheduler module is responsible for determining which packet gets transmitted next. FIG. 34 shows a block diagram of the packet scheduler module.

The process starts with the comparator 3382 taking the queue number that is in the current state and seeing if there is anything in that queue to be sent. The queue number can represent one of the queue lists 3480 or a TCP receive packet. If there is a packet of that type waiting, then its entry is pulled and scheduled as the next transmitted packet 3484. If there is no packet in that queue, then the state counter is incremented and the next queue state checked. This continues until a queue # matches a queue list (or TCP receive packet) that has a packet ready for transmission, or the end bit in the state entry is set. If the end bit is set, then the state counter is reset back to zero.

The queue arbitration sequence is programmable. An application can set this by first setting the Queue_State register to 0×00 and then writing the queue number and end bit to the Queue_Entry register. There are two built-in arbitration sequences which can be set by asserting either the flat or steep bits in the Queue_State register. These built-in sequences are described below.

Flat sequence. This is the default sequence state that the scheduler uses after any reset. It can also be set by writing the seq_prog field in the TSequence register to 01.

Steep sequence. An alternative to the preprogrammed flat sequence is the steep sequence. This sequence weights the higher priority queues more, and is useful where many high priority applications are running simultaneously. It is set by writing the seq_prog field in the TSequence register to 10

This section covers the hash algorithm. The hash algorithm used in the Internet Tuner 10G combines the socket's source and destination ports, and source and destination IP addresses to form a single 17-bit hash value. The algorithm is designed to be simplistic thereby yielding single clock cycle results as well as being spread spectrum enough to minimize hash LUT collisions.

This section covers the ISN algorithm. The ISN algorithm used in the Internet Tuner 10G is similar to that described in RFC1948 and incorporates a four-microsecond based timer, a random boot value that may be set by the system, and the four socket parameters (the source and destination ports and IP addresses).

This section covers the TCP transmit data buffer header definition. Within each MTX block that TCP data is stored in, we keep a 128-bit header. The format for this header is defined as follows:

First 64 Bit Word

[63:62] tcp_block_size (01=2K, 00=128)

[61:59] tcp_block_type (000=data, 001=RST)

[58] next link field valid

[57:32] next block link

[31:28] 4 bits open for use

[27:16] Block data length (does not include the header words)

[15:0] tcp_block_checksum

Second 64 Bit Word

[63:32] 32 bits open for use

[31:0] Sequence number for the block

This section covers the socket specific iAPI register map. These registers are specific to a given socket. These registers are accessed in one of two ways. The first method is used when a new socket is to be initialized. In this case, the New_Sck bit in the Socket_Control register (0×46) is asserted. When this bit is asserted, the sck_reg_val bit in the TCP_Stat register will de-assert. The system can then write the new socket information to these registers. For established sockets, the system first writes the Socket_Handle register. This will clear the sck_reg_val and New_Sck bits. When the socket's control block (CB) information has been retrieved, then the sck_reg_val bit in the TCP_Status register will re-assert.

This section covers the established socket CB structure. Table 2 lists all fields in the CB structure in memory for established sockets.

TABLE 2

Established socket control block structure

| | 31 | 28 | 24 | 20 | 16 | 12 | 8 | 4 | 0 |
|---|---|---|---|---|---|---|---|---|---|
| 0 | colspan="9" | Remote IP address [31 0] |||||||||
| 1 | colspan="4" | Remote Port [15 0] |||| colspan="5" | Local Port [15 0] |||||
| 2 | IP index [3.0] | ConnState [3 0] | N/U | SA | TS | WS | MS | AR | CF | CV | C BVer[3 0] | CB interface [3 0] | | ST | SR | KA | DF | VL | RE | UR |
| 3 | colspan="9" | ACK Number [31 0] |||||||||
| 4 | colspan="9" | SEQ Number [31 0] |||||||||
| 5 | | | LWinScale [3.0] | RWinScale [3 0] | colspan="5" | Remote MSS [15 0] |||||
| 6 | RX | Priority | colspan="3" | VID[11 0] ||| colspan="4" | Remote MAC Address [47 32] ||||
| 7 | colspan="9" | Remote MAC Address [31 0] |||||||||
| 8 | colspan="4" | TX Window Size [15 0] |||| colspan="5" | RX Window Size [15.0] |||||
| 9 | colspan="9" | RX ACK Number [31 0] |||||||||
| A | colspan="4" | RX URG Pointer Seq Number[15 0] |||| colspan="5" | Congestion Window (ownd) [15 0] |||||
| B | | TW | Sock Type | MI | colspan="5" | RX Ending Mem Block Pointer [25 0] |||||
| C | colspan="4" | | | | | colspan="5" | RX Start Mem Block Pointer [25 0] |||||
| D | colspan="4" | | | | | colspan="5" | Next TX Mem Block Pointer [25 0] |||||
| E | colspan="9" | RX Bytes Written [31 0] |||||||||
| F | colspan="4" | RX Buffer Length [15 0] |||| colspan="5" | RX Offset Pointer [15 0] |||||
| 10 | colspan="9" | TX Bytes Transmitted [31 0] |||||||||
| 11 | colspan="9" | RX Data Mem Write Pointer [63 32] |||||||||
| 12 | colspan="9" | RX Data Mem Write Pointer [31 0] |||||||||
| 13 | TU | DupAck[2 0] | colspan="2" | Retries/Probes [3 0] || colspan="5" | TX Data Avail [23 0] |||||
| 14 | colspan="4" | Receive Get Offset |||| colspan="5" | Next CB Link [15 0] |||||
| 15 | colspan="4" | TX URG Ptr [15 0] |||| colspan="3" | IP TTL[7 0] ||| colspan="2" | IP TOS[7 0] ||
| 16 | colspan="9" | RX Timestamp/Timed Seq Number[31 0] |||||||||
| 17 | TP | colspan="3" | Send Offset [10 0] ||| colspan="2" | Smooth RTT [9 0] || colspan="3" | Smooth Mean Dev [9 0] |||
| 18 | colspan="4" | Slow Start Threshold (ssthresh) [15:0] |||| colspan="5" | Fin Wat 2 Timer [15 0] |||||
| 19 | colspan="9" | TX Data Mem Read Pointer [63 32] |||||||||
| 1A | colspan="9" | TX Data Mem Read Pointer [31 0] |||||||||
| 1B | colspan="9" | Local Timestamp of Last Transmission [31 0] |||||||||
| 1C | colspan="9" | TX Left SACK [31 0] |||||||||
| 1D | colspan="9" | TX Right SACK [31 0] |||||||||
| 1E | colspan="9" | RX Left SACK [31 0] |||||||||
| 1F | colspan="9" | RX Right SACK [31 0] |||||||||

Table 3 defines the main CB structure in memory for HO sockets. There is also an annex CB that is described in the next section.

TABLE 3

Half-open socket main CB structure

| | 15 | 12 | 8 | 4 | 0 |
|---|---|---|---|---|---|
| 0 | colspan="5" | remote IP address [31 16] |||||
| 1 | colspan="5" | remote IP address [15 0] |||||
| 2 | colspan="5" | remote port [15 0] |||||
| 3 | colspan="5" | local port [15 0] |||||
| 4 | local IP index [3 0] | Connection State [3 0] | Nag | SACK | RxTS | WinSc | RxMSS | ACKRq | CBinFF | CBVal |
| 5 | CB Version [3.0] | TX Interface [3 0] | | KA | DF | VLANV | Retran | RxURG |
| 6 | colspan="5" | ACK [31 16] |||||
| 7 | colspan="5" | ACK [15 0] |||||
| 8 | colspan="5" | AEQ [31 16] |||||
| 9 | colspan="5" | SEQ [15 0] |||||
| A | | | Local WinScale[3 0] | Remote WinScale [3 0] | |
| B | colspan="5" | remote MSS [15 0] |||||
| C | | VLAN Priority [2 0] | colspan="3" | VLAN VID [11 0] |||
| D | colspan="5" | remote MAC Address [47 32] |||||
| E | colspan="5" | remote MAC Address [31 16] |||||
| F | colspan="5" | remote MAC Address [15 0] |||||

Table 4 defines the annex CB structure in memory for HO sockets. The main CB structure is defined in the previous section. The annex HO CB stores overflow information that does not fit into the main section. Each HO CB has a main and an annex section.

TABLE 4

Half-open socket annex CB structure

| | 15 | 12 | 8 | 4 | 0 |
|---|---|---|---|---|---|
| 0 | | | Received Timestamp [31 16] | | |
| 1 | | | Received Timestamp [15 0] | | |
| 2 | | | Local Timestamp [31 16] | | |
| 3 | | | Local Timestamp [15 0] | | |
| 4 | | TTL | | TOS | |
| 5 | | | | Number of SYN/ACK retines [3 0] | |
| 6 | | | | | |
| 7 | | | | | |

Table 5 defines the CB structure in memory for sockets in the TW state.

TABLE 5

Time-wait control block structure

| | 31 | 28 | 24 | 20 | 16 | 12 | 8 | 4 | 0 |
|---|---|---|---|---|---|---|---|---|---|
| 0 | | | | | remote IP address [31 0] | | | | |
| 1 | | Remote Port [15 0] | | | | | Local Port [15 0] | | |
| 2 | IP index [3 0] | ConnState [3 0] | N | SA | TS | WS | MS | AR | CF | CV | CBVer [3 0] | CB Interface [3 0] | | KA | DP | VL | RE | UR |
| 3 | | | | | ACK Number [31 0] | | | | |
| 4 | | | | | SEQ Number [31 0] | | | | |
| 5 | | | | LWinScale [3 0] | RWinScale [3 0] | | Remote MSS [15 0] | | |
| 6 | Priority | | VID [11 0] | | | | Remote MAC Address [47 32] | | |
| 7 | | | | | Remote MAC Address [31 0] | | | | |
| 8 | | | | | | IP TTL [7 0] | | IP TOS [7 0] | |
| 9 | | | | | Remote Timestamp [31 0] | | | | |
| A | | | | | Local Timestamp [31 0] | | | | |
| B | | | | | Forward Link [23 0] | | | | |
| C | | | | | Reverse Link [23 0] | | | | |
| D | | | | | Forward Age Link [23 0] | | | | |
| E | | | | | Reverse Age Link [23 0] | | | | |
| F | | | | | | | | | |

This section covers the TCP congestion control support. The Internet Tuner 10G will implement the slow start, congestion avoidance, fast retransmit, and fast recovery algorithms. In addition, the tuner supports the round-trip time TCP option that enables more then one segment to be timed at once. This feature is needed for high-bandwidth environments.

This section covers the round-trip time measurement. The Internet Tuner 10G is capable of measuring round-trip time (RTT) in two ways. In the traditional method, a time measurement is taken from a TCP PSH packet to when the ACK for the PSH packet is received. The sequence number of the timed packet is stored in the sequence number of timed packet field in the CB, and the timestamp for the packet is stored in the timestamp of last transmission field in the CB. When the ACK for the timed packet is received, the difference between the current timestamp and the stored timestamp is the RTT. When the ACK is received, the RTO[1] bit in the socket CB is cleared to indicate that the next packet may be timed.

When the RTT option is negotiated for in the opening TCP handshake, then the RTT measurement may be taken from each ACK received.

Regardless of the method used to obtain a RTT measurement, the logic flow that takes that value and determines the Retransmission Timeout (RTO) value is the same.

The scaled smoothed RTT, mean deviation, and RTO are all stored in the socket CB.

This section covers the slow start algorithm. The network stack will support the slow start algorithm for every TCP connection. This algorithm uses a congestion window parameter (cwnd), which is initialized to one MSS when the socket is first established.

The slow start algorithm dictates that when the socket is initially established, that only one packet can be sent out, and no further data can be transmitted until the ACK for the packet is received. When the ACK is received, the cwnd is then increased by one MSS, which allows up to two packets to be transmitted. Each time an ACK is received, the cwnd is increased by one MSS.

This continues until cwnd surpasses the advertised window size from the peer. The network stack will always send the minimum of the cwnd and the advertised window.

If the network stack receives an ICMP source quench message, then it will reset the cwnd back to one MSS. The slow start threshold variable (ssthresh) is kept at its same value however (see next section for more information on ssthresh).

This section covers the congestion avoidance algorithm. The network stack will keep sending out the minimum of the cwnd and the advertised window from the peer. The congestion avoidance algorithm also uses the slow start threshold variable (ssthresh), which is initialized to 0xFFFF.

When congestion is detected via a timeout, then ssthresh is set to one-half the current transmit window (minimum of the cwnd and the peer's advertised window). If this value is less then twice the MSS, then this value is used instead. Also cwnd is set to one MSS.

When new data is acknowledged, the cwnd is increased by one MSS until it is greater then ssthresh (hence the name). After that, cwnd is increased by 1/cwnd. This is the congestion avoidance phase.

This section covers the fast retransmission and fast recovery algorithms. When the network stack receives duplicate ACKs it is a strong indication that a packet has been dropped. When n duplicate packets are received, then the dropped segment is immediately retransmitted even though its retransmission timer may not have expired yet. This is the fast retransmission algorithm. The number of duplicate ACKs that must be received before the retransmission occurs may be set via the TCP_Dup_ACK register (0x36), and defaults to three.

When the specified number of duplicate ACK packets are received, ssthresh is again set to one-half the current window size as was the case with the congestion avoidance algorithm, but this time cwnd is set to ssthresh+(3*MSS). This ensures that we revert back to the congestion avoidance algorithm and not slow start after receipt of duplicate ACK packets. Each time another duplicate ACK packet is received, cwnd is increased by one MSS. This is the fast recovery algorithm.

When an ACK packet for new data is received, then cwnd is set to ssthresh.

This section outlines how the MSS option is derived. Prior to enabling TCP transactions, the host system should set up the following parameters and settings.

The default non-local MSS to be used in registers 0x1A4A-0x1A4B

The default local MSS to be used in registers 0x1A4C-0x1A4D

This section covers the MSS selection algorithm. When selecting which of the two MSS values to use for any connection, the TCP engine module will query the IP router module. If the destination route is through a gateway, then the non-local MSS is used.

This section outlines the TCP options supported and their formats. The four options that are supported are:

MSS
window scaling
timestamp
SACK

This section covers the MSS option. This option is always sent. The MSS value used is determined per the algorithm explained in the previous section. The format of the option is as follows:

| Kind 0x2 | Length 0x4 | MSS |
|---|---|---|
| 1 Byte | 1 Byte | 2 Bytes |

This section covers the window scaling option. The window scaling option is always sent in SYN packets as long as the SI_Win_En bit is set in the TCP_Control register. It is sent in SYN/ACK packets only if the option was included in the SYN packet that generated the SYN/ACK packet response. The format of the option follows. Note that it is always preceded by a NOP byte so that the option aligns on a four-byte boundary.

| Kind 0x1 | Kind 0x3 | Length 0x3 | Shift Count |
|---|---|---|---|
| 1 Byte | 1 Byte | 1 Byte | 1 Byte |
| (NOP) | (Window Scaling Option) | | |

This section covers the timestamp option. This option is always sent in SYN packets, and is sent in SYN/ACK packets only if the option was included in the SYN packet that generated the SYN/ACK response. Note that it is always preceded by two NOP bytes so that the option aligns on a four-byte boundary. The format of the timestamp option is as follows:

| Kind 0x1 | Kind 0x1 | Kind 0x8 | Length 0xA | Timestamp value | timestamp echo reply |
|---|---|---|---|---|---|
| 1 Byte | 1 Byte | 1 Byte | 1 Byte | 4 Bytes | 4 Bytes |
| (NOP) | (NOP) | (Timestamp Option) | | | |

This section covers the selective ACK (SACK) option. This option is always sent in SYN and SYN/ACK packets as long as the SACK_En bit is set in the TCP_Control register. SACK uses two different TCP option kinds. One is used in the SYN packets, and the other is used in data packets. The formats of the option are shown below.

| Kind 0x1 | Kind 0x1 | Kind 0x4 | Length 0x2 |
|---|---|---|---|
| 1 Byte | 1 Byte | 1 Byte | 1 Byte |
| (NOP) | (NOP) | (SACK Permitted) | |

SACK Permitted

| Kind 0x1 | Kind 0x1 | Kind 0x5 | Length 0xA | Left edge of 1st block | Right edge of 1st block |
|---|---|---|---|---|---|
| 1 Byte | 1 Byte | 1 Byte | 1 Byte | 4 Bytes | 4 Bytes |
| (NOP) | (NOP) | (SACK Option) | | | |

SACK Option

The SACK option is limited to one-hole reporting.

Figure 35:
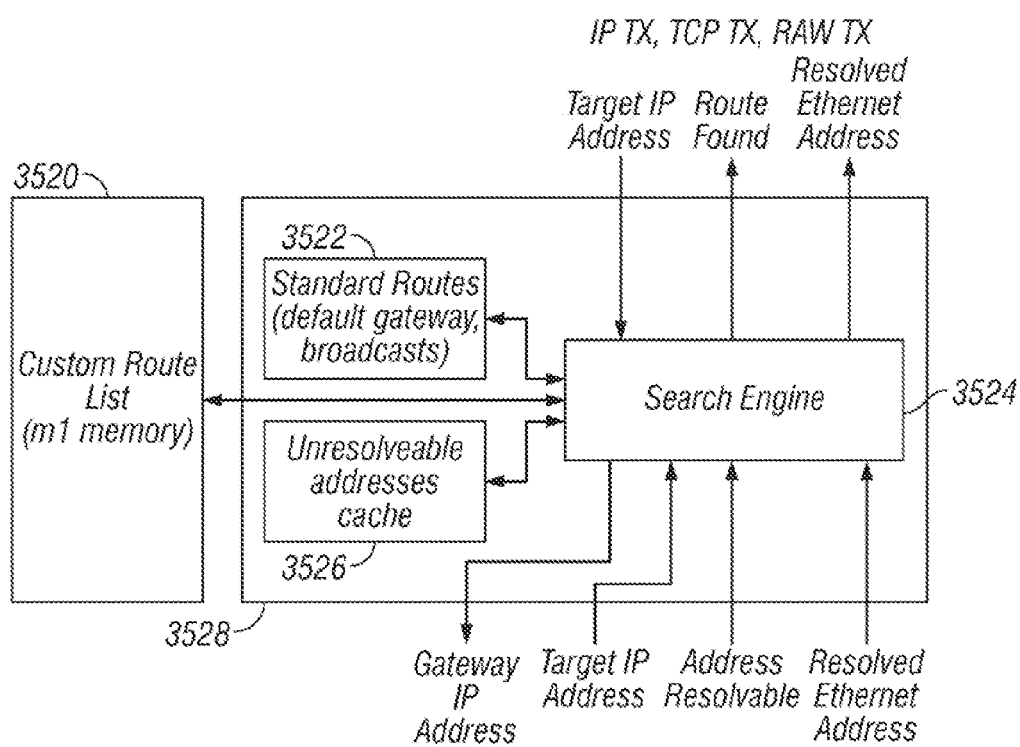
FIG. 35 is a block schematic diagram of the IP router according to the invention.

The following sections cover the IP router module. The IP router module features are as follows:
Provides default routing capabilities
Provides routing for multiple host IP addresses
Provides host-specific and network-specific routes
Dynamically updates routes after ICMP redirects
Handles IP broadcast addresses (limited, subnet-directed and network-directed broadcasts)
Handles IP loop back addresses
Handles IP multicast addresses This section explains how the IP router module requests a route. With respect to FIG. 35, when the local host system wishes to transmit an IP packet, it must determine where to send that packet—either to another host on the local area network, to an external network, or back to the local host system itself. It is the task of the IP router module to direct outgoing IP packets to the appropriate host.

When a transmitting module requests a route, the transmitting module passes the destination IP address of a packet to the IP router. The IP router then compares the targeted IP address with a list of destinations stored in the IP route list

3520. If a match is found, the IP router will then attempt to resolve an appropriate Ethernet address. The router will perform this resolution by requesting an ARP lookup for a destination IP address in the ARP cache. If the destination Ethernet address is resolved, it is passed back to the transmitting module, which will use this Ethernet address as the destination of the outgoing Ethernet frame.

Route information is provided by three separate components: the default route registers 3522, the custom route list 3520, and the unrouteable addresses cache 3526. These components are all queried simultaneously when a route request is served.

This section explains how the IP router module determines the default route. Packet destinations are described as being either local or external. Local destinations are attached to the same local area network as the sending host. External destinations belong to networks separate from the sending host's local area network.

When an outgoing packet's destination IP address is found to belong to a host attached to the local area network, the IP router will use ARP to attempt to establish resolve the destination IP address to its corresponding Ethernet address. If a destination IP address is determined to belong to an external network, the IP router must determine which gateway host to use to relay outgoing packets to the external network. Once a gateway host has been selected, outgoing IP packets use the Ethernet address of the gateway host as their destination Ethernet address.

In the event that the IP router module cannot find a route for a packet's destination IP address, that packet must use the gateway host specified by the default route. The default route is used only when no other routes can be found for a given destination IP address.

To minimize the number of accesses to the ARP cache, the IP router module caches the default gateway's Ethernet address when the default route is set. The default gateway's Ethernet address is cached for a maximum amount of time equal to the time that dynamic entries in the ARP cache are allowed to be cached.

This section explains how the IP router module handles broadcast and multicast destinations. When the destination IP address is a broadcast or multicast IP address, an ARP lookup is not needed. Instead, the IP router module generates destination Ethernet addresses dynamically depending on the type of IP address. Packets with the destination IP address set to the IP broadcast address (255.255.255.255) are sent to the Ethernet broadcast address (FF:FF:FF:FF:FF:FF). Packets with the destination IP address set to a multicast IP address (224.x.x.x) have their destination Ethernet addresses computed from the multicast IP address.

This section explains how the IP router module handles static routes. In addition to the default route, the IP router module allows the creation of static routes to map destination IP addresses to specific Ethernet interfaces or gateway hosts. An IP route entry includes a destination IP address, a netmask and a gateway IP address. The netmask is used to match a range of destination IP addresses with the destination IP addresses stored within the IP route entries. The netmask also allows differentiation between routes for specific hosts and routes for networks. The gateway IP address is used when resolving a destination Ethernet address via ARP.

Since it is possible to have a large number of routes in the IP route list, IP route entries are stored in dynamically allocated m1 memory. Each IP route entry uses 128 bits. The last 32 bits of each entry do not store any data, but are used as padding to align IP route entries along 64-bit boundaries.

The format of each IP route entry is as follows.

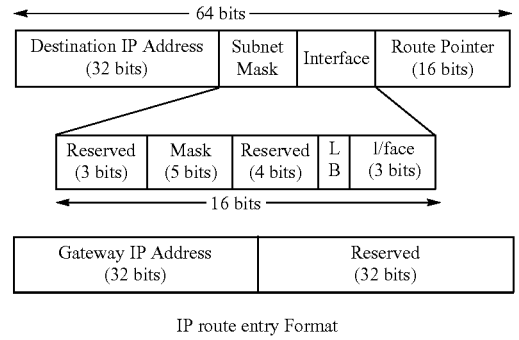

IP route entry Format

The IP route list is implemented as a sorted linked-list. As IP routes are added to the IP route list they are ordered according to their netmasks, with the most-specific IP routes appearing at the front of the list and IP routes with the least-specific netmasks going to the end of the list. The route pointer field in an IP route entry contains the m1 memory address where the next IP route entry can be found in m1 memory. The first (most significant) bit of the route pointer field is used as flag to determine if the m1 memory address is valid and there is a route following the current one. If the pointer valid bit of the route pointer field is not asserted, then there are no further IP routes in the IP route list and, the end of the IP route list has been reached.

If a destination IP address is not determined to be a broadcast or multicast IP address, the IP route list is searched for a matching IP route entry. If a match is not found in the IP route list, the default route is used to provide the gateway information.

The IP router module also allows for the use of multiple physical and loop-back interfaces. Using the interface identification field in the IP route entry, the IP router can direct outgoing packets to a particular Ethernet interface of the Internet Tuner 10G. The interface identification field is also used for directing ARP requests to the appropriate Ethernet interface.

This section explains how the IP router module handles loop-back addresses. If the destination IP address is the same as one of the local host system's IP addresses or a loop-back address (127.x.x.x), the outgoing packet is supposed to be fed back to the host system. Routes for loop-back destinations are stored in the static routes list. IP addresses not assigned to the host system may also be configured as loop-back addresses. To enable this local redirection, the interface identification should be set to 0×0000 (loop back). Otherwise, the interface identification should be set to one of the Ethernet interfaces (0×0001, 0×0002, etc).

This section explains how the IP router module creates routes. New IP routes may come from the internal processor. IP routes created by the internal processor are static routes, meaning that they will remain in the table until the internal processor removes them. The internal processor adds and removes routes via the IP router module's register interface.

ICMP redirect messages are transmitted when IP packets are being sent to the incorrect gateway host. An ICMP redirect message normally contains information for the correct gateway host to use for the incorrectly routed IP packets. When an ICMP redirect message is received, the message is processed by the system interface. It is up to the system interface to update the route list via the IP router's register interface, updating an existing IP route or creating a new IP route.

This section explains how the IP router module handles routing to hosts on the local network. In order to route packets directly to other hosts on the local Ethernet network, an IP route with the Internet Tuner 10G's subnet mask must be created. Instead of specifying another host as the gateway for this route, the gateway IP address should be set to 0.0.0.0 to indicate that this route will result in a direct connection across the local network.

Figure 36:
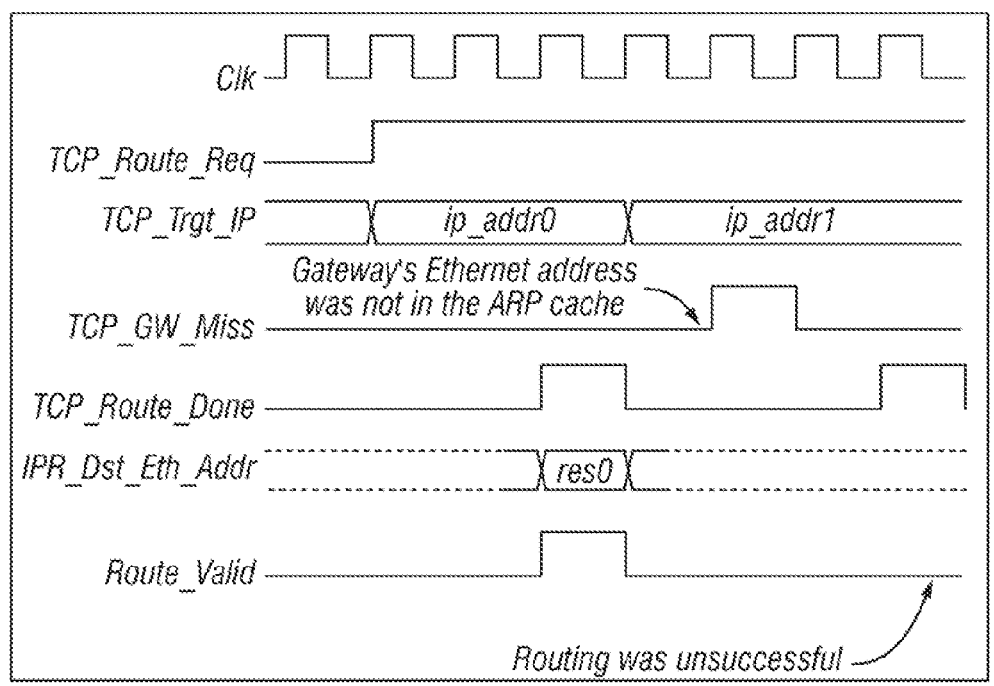
FIG. 36 is a schematic diagram of an IP route request signaling diagram according to the invention.

This section explains how the IP router module handles route request signaling. Each transmitting module has its own interface into the IP router for requesting routes. FIG. 36 illustrates the signaling used to request and receive a route.

When a module is requesting a route it asserts a route request signal (TCP_Route_Req for example), and provides a destination IP address (TCP_Trgt_IP) to the router. Once the router has found a route it asserts a route done signal and outputs the destination Ethernet address. The route_valid signal is used to indicate to the transmitting module if a route was found successfully. If it is asserted when the route done signal is asserted, then a valid route was found. If the route_valid bit is not asserted, that means that routing was unsuccessful. This could be due to several causes such as not having a default route, or the gateway is down and not responding to ARP requests. In the event of a route failure, it is up to the transmitting module to wait and attempt to resolve the route again later, or to abort the current connection attempt.

When a route requires an ARP lookup to resolve the Ethernet address of a host or gateway, it is possible for delay to occur if that Ethernet address is not found in the ARP cache. When there is a cache miss, the cache will notify the IP router. The router will then signal to the appropriate transmitter (IP TX, TCP TX, or Raw TX) that a cache miss has occurred. At this point, the transmitting module may choose to delay the current connection, serve the next connection in the queue, and request another route. Even if the transmitting component cancels its route request the ARP lookup will continue, and if the gateway is active its Ethernet address will be added to the ARP cache for possible later use. Note: the IP router may have multiple outstanding ARP requests.

This section explains how the IP router module handles the display of individual routes. After creating static routes, the user may then read back entries stored in the route table in two ways. If the user knows the target IP address of a given route, the Show_Route command code can be used to display the netmask and gateway of that route.

To display all the entries within the route table, the Show_Index command may be used. Using the Route_Index register, the system interface may access the routes in order of specificity. More specific (host) routes will be displayed first, followed by less specific (network) routes. For example, the IP route entry with route_index 0×0001 would be the most specific route in the IP route list. Note: The default is stored at index zero (0×0000). The Route_Found register is asserted if a route has been found successfully, and the route data is stored in the Route_Trgt, Route_Mask, and Route_Gw registers.

This section explains how the IP router module handles caching of unresolveable destinations. When the IP router module is unable to resolve the Ethernet address for a destination host or destination gateway, the IP router module will then cache that destination IP address for 20 seconds. If, during that time, the IP router module receives a request for one of these cached unresolveable destinations, the IP router module will immediately respond to the module requesting the route with a route failure. This caching of unresolvable destinations is intended to reduce the number of accesses into the shared m1 memory, where the ARP cache entries are stored. Caching unresolvable destinations also helps to avoid redundant ARP requests. The amount of time an unresolved address may be cached is user configurable via the Unres_Cache_Time register.

Figure 37:
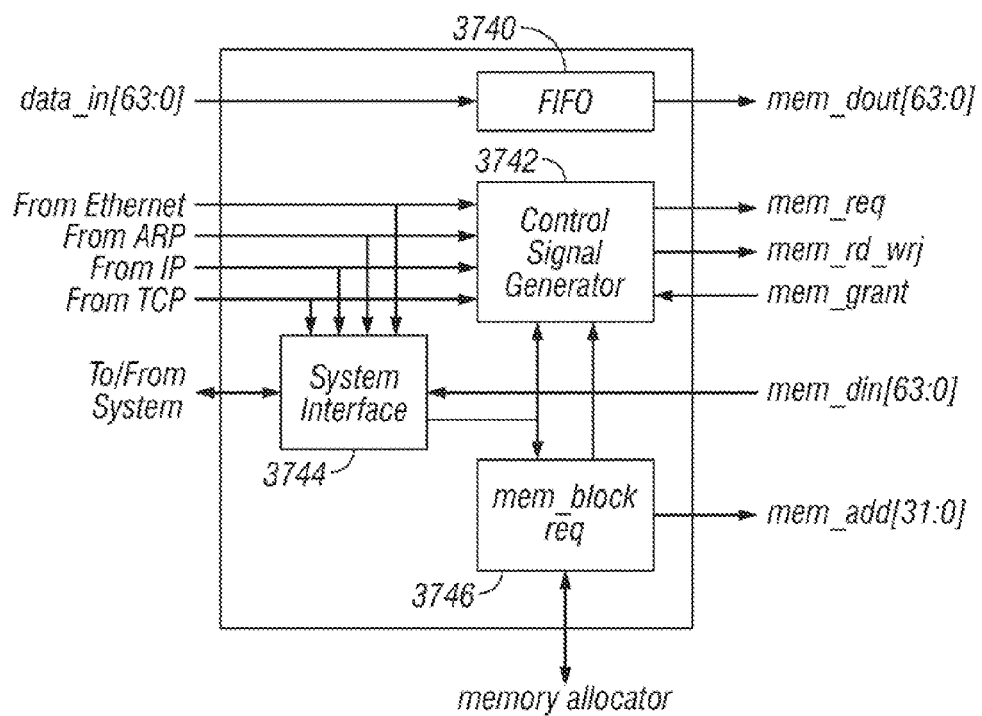
FIG. 37 is a block schematic diagram of the system exception handler according to the invention.

The following sections cover the system exception handler module 1768. Referring to FIG. 37, the system exception handler module is called whenever there is data that the dedicated processing hardware in the Internet Tuner 10G cannot handle directly. This may be unknown Ethernet type packets, IGMP packets, TCP or IP options, and so on. For each of these cases, the primary parser, when it detects an exception case, will enable this module. The system exception handler module is then responsible for storing the data 3742, 3746, informing the system that there is exception data to be handled 3744, and passing the data to the host system 3740.

This section covers the system interface module. The system interface module interfaces with the system controller. When there is any exception data that is available for the system, it will signal the system via interrupts. The system interface indicates that type(s) of exception data available, as well as the amount of data available. The system controller can then either read the data through this module, or get the memory pointer for the data from this module. In the latter case, the system controller can then read the data directly. In this case, the system should inform the exception handler when it has read all the data so that the memory buffers can be freed up.

This section covers the Mem_Block requester. This module is responsible for requesting memory blocks from the memory allocator. It also handles the address generation during memory accesses. As blocks are freed up, this module is also responsible for passing those blocks back to the memory allocator. This module will always have at least one spare memory block available at any given time.

This section covers the control signal generator module. The control signal generator module is responsible for interfacing with the memory controller module and for generating the memory control signals. This interface uses a request/grant handshake protocol.

All input and output signals are synchronous to the rising edge of the clock. This is a FIFO for controlling memory writes. This FIFO will be 16 words deep (i.e. 16×64 bits).

The following sections detail the memory allocator module used to service the IP module, ARP cache, route table, and the internal processor. The memory allocator module is responsible for first dividing the m1 memory into discrete blocks, allocating them upon requests, and putting the freed blocks back on a stack. The memory allocator module needs to have two parameters entered prior to starting its operations. These are the total size of the m1 memory block, and the size of each memory block. Only one memory size is supported in this implementation of the memory allocator module.

After these two required parameters are entered, the system asserts the m1_Enable bit in the m1 _Control register. When this occurs, the memory allocator module will start filling in block addresses starting from the top of the m1 memory block. For example, if the m1 memory block is a total of four kbytes deep, and the block size is 512 bytes, then the m1 memory map will appear as shown in FIG. 38.

Four addresses are kept per m1 address location for m1 block addresses. In addition to keeping the starting block addresses in memory, memory allocator module also contains a 16-entry cache. Upon initialization, the first 16 addresses are kept in the cache. As blocks are requested they are taken off of the cache. When the number of cache reaches zero, then four addresses (one memory read) are read from memory. Likewise, whenever the cache fills with addresses, four addresses are written back to memory (this takes affect only after the memory allocator module reads address from the m1 memory for the first time).

This section covers the TX, RX, and CB memory allocator modules. These memory allocator modules are the memory allocators used for the socket transmit memory (malloctx), socket receive memory (mallocrx), and CB (malloccb) memory. These memory allocator modules are responsible for allocating memory blocks upon requests, putting freed blocks back on a stack, and arbitrating the use of the memories.

The memory allocator modules need to have several parameters entered prior to starting operation. These parameters are the starting and ending address pointer locations within the MP memory space, and the bitmaps that represent each available block within each memory space. Two sizes of blocks are available for the socket data memories: 128 bytes and 2 k bytes. The CB memory has fixed 128 byte blocks. All the allocators also utilize an eight-entry cache for block addresses (for each memory size).

After these parameters are entered, the system asserts the Enable bits in the Control registers. The allocators then can start to allocate and de-allocate memory blocks.

This section covers the TX SDRAM Interface and data flow. An arbitrator in the core logic will decide between read and write cycles to the TX SDRAM. Once a cycle begins, it will be allowed to complete. Data being written to the TX SDRAM comes from a pair of 128×128-bit FIFOs that sit between the PCI bus and the data memory. Data read from the TX data memory is put into a 64×128-bit FIFO that interfaces to the MAC module.

This section details the 512-kbyte miscellaneous memory bank. The miscellaneous memory bank is used for the purposes listed below. The features are described in detail elsewhere.

Figure 39:
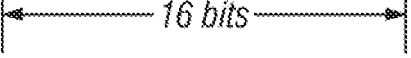
FIG. 39 is a block schematic diagram of a default memory miscellaneous memory map according to the invention.

Half-open CBs (main)
Half-open CBs (annex)
TCP port authorization table
UDP port authorization table
Source port usage table
Time-wait CB allocation table
Established CB allocation table
TX memory block allocation tables (for both 128 byte and 2-kbyte blocks)
RX memory block allocation tables (for both 128 byte and 2-kbyte blocks)
FIFO for TCP RX to TX packets
Socket data available bitmap
Server port information This section covers the miscellaneous memory organization and performance. Referring to FIG. 39, the miscellaneous memory is organized physically as 256 k by 16-bits, but most of the modules that use this miscellaneous memory reference the miscellaneous memory as if it were a 512 k by 8-bit memory. This is because all the authorization and allocation tables only need to access memory one byte at a time. The HO CB data path and the FIFO for TCP RX to TX, and the server port Information are the resources that utilize the full 16-bit datapath. The need for the 16-bit datapath comes from the HO CBs that must access data in a very few clock cycles. The miscellaneous memory should be implemented using single-cycle memory. Performance requirements are not high, but with the arbitration overhead, the access times should be kept as short as possible (due again to the HO CBs).

The HO CBs (main) 3902. These are the CBs for HO TCP connections. Each CB is 32 bytes in size, and there are a total of 4 k CBs. Therefore, the total number of bytes needed for the HO CBs is 4 kbytes by 32=128 kbytes. This resource uses a full 16-bit data bus.

The HO CBs (annex) 3984. These are the CBs for HO TCP connections, and contain additional information that did not fit in the main part of the CB. Each annex CB is 16 bytes in size and there are a total of 4,000 annex CBs. Therefore, the total number of bytes needed for the HO CBs is 4,000×16 bytes=64 kbytes. This resource uses a full 16-bit data bus.

The TCP port authorization table 3900. This table keeps track of which TCP ports are authorized to accept connections. We keep one bit of each of the 64,000 possible ports. Therefore this table uses 64,000 bits/8=8 kbytes.

The UDP port authorization table 3998. This table keeps track of which UDP ports are authorized to accept connections. We keep one bit of each of the 64K possible ports. Therefore this table uses 64,000 bits/8=8 kbytes.

The source port usage table 3996. This table keeps track of which port numbers are available for source ports used for locally initiated connections. We keep one bit of each of the 64,000 possible ports. Therefore this table uses 64,000 bits/8=8 kbytes.

The TW CB allocation table 3988. This is an allocation table for TW CBs. We keep one bit for each of the 32,000 TW CBs. Therefore this allocation table uses 32,000 bits/8=4 kbytes. The table uses the full 16-bit data bus.

The established CB allocation table 3984. This is an allocation table for established CBs. We keep one bit for each of the 64,000 CBs. Therefore, this allocation table uses 64,000 bits/8=8 kbytes The TX socket data buffer block allocation table 3982. This table is made up of a 2 kbyte block allocation table and a 128 kbyte block allocation table, that are used for the dynamically allocated transmit data buffer memory. The number of blocks of each type is configurable, but the size of both of the allocation tables combined is fixed at 72 kbytes. This allows for a maximum of 475,000 128-byte blocks. At this level, the number of 2 kbyte blocks is 98,000.

The RX socket data buffer block allocation table 3980. This table is made up of a 2 kbyte block allocation table and a 128 kbyte block allocation table, that are used for the dynamically allocated receive data buffer memory. The number of blocks of each type is configurable, but the size of both of the allocation tables combined is fixed at 72 kbytes. This allows for a maximum of 475,000 128-byte blocks. At this level, the number of 2 kbyte blocks is 98,000.

The TCP RX FIFO 3990. This FIFO is used to keep track of packet transmission requests from the TCP receive logic to the TCP transmit logic. Each FIFO entry is made up of some control flags, and a CB address, for a total of four bytes (four flags, a 26-bit address, and two unused bits). This FIFO is 1024 words deep, and therefore requires 1024×4 bytes=4 kbytes.

The socket data available bitmap 3992. This bitmap represents which of the 64,000 sockets has data ready to be sent to the host system. We keep one bit for each of the sockets. Therefore, this bitmap requires 64,000 bits/8=8 kbytes.

The server port information 3986. This database is used to store parameter information for TCP ports that are opened in the listen state. Because these server ports do not have CBs associated with them till they are opened, the port specific parameters are kept in this area. Each port entry is made up of two bytes, and there are 64,000 possible ports. Therefore, this database requires 64,000×2 bytes=128 kbytes.

This section covers the miscellaneous memory map. The memory map used for the miscellaneous memory is configurable.

This section covers the miscellaneous memory, or miscmem, arbitration scheme. The miscellaneous memory allocator takes memory requests from different sources and arbitrates between them for access to the memory block. Of all the requests, the memory cycles to accessing the HO CBs are given top priority. All other sources are arbitrated in an equal priority in a round-robin manner.

There is little that the internal processor needs to initialize prior to activating the miscellaneous memory arbitrator. If the default memory map is to be used, then the internal processor can simply enable the arbitrator by asserting the MM_Enable bit in the MiscMem_Control register.

If a non-default memory map is to be used, then all the base address registers should be initialized prior to enabling the arbitrator. It is the responsibility of the software to ensure that the base addresses programmed do not cause any overlapping memory areas. No hardware checking for this is provided.

The internal processor can access any location in the miscellaneous memory. It does this by first programming in an address into the MM_CPU_Add registers (0×1870–0×1872), and then reading or writing a byte to the MM_CPU_Data register (0×1874). The address registers will auto increment every time the data register is accessed.

This section covers the serial-port, SPI, and test interfaces. The AUX serial ports all use the standard 8-bit serial data format. The serial ports support a 16-byte receive FIFO and hardware flow control. The internal processor controls the baud rate used on all ports, with all ports being able to support independent baud rates. The serial-port test mode is enabled by setting the ser_tst bit in the internal processor's test-mode register (0×0000f0). The master SPI port is provided so that the on-chip protocol processor can control slave SPI devices.

This section provides an overview of the interrupt controller (INTC) 1688 used in the system. The INTC aggregates all system interrupts and feeds them to the internal processor. Each interrupt source may be independently steered to either the nFIQ or nIRQ interrupt on the internal processor.

This section provides an overview of the general-purpose timers and watchdog timer used in the Internet Tuner 10G. Eight general-purpose 32-bit timers that may either be cascaded from a previous timer, or that may be used independently are provided. All timers are capable of being operated in single-shot mode or loop modes. In addition, a clock prescaler is provided that can divide down the main core clock prior to it being used by each of the timers. This allows minimum changes for different core clock frequencies.

This section details the command-block structure. The host system uses command blocks to pass commands to the Internet Tuner 10G. Commands may include requesting status, controlling sockets, sending data, and reporting host conditions. Commands blocks are usually transferred from the host system using DMA. When the Internet Tuner 10G receives commands, they are put into a command list. The commands are then parsed one at a time by the command parser module. Any command block that the command parser module understands, it will then execute. Any command block that the command parser module does not know how to decode, it will send to the internal processor.

Command blocks are variable in length. Regardless of the type of command, each command block must be made up of an even number of bytes. A padding byte should be used for all odd numbered byte command blocks.

Special care must be taken when implementing the command block communication between the host and the Internet Tuner 10G. Command blocks are created in a circular queue in host memory. Then periodically or by host initiation, these command blocks are transferred to the Internet Tuner 10G using DMA. Several procedures need to be followed to insure reliable communications between the host system and the Internet Tuner 10G.

This section explains receiving command blocks and outlines the steps that the internal processor should go through in order to receive command blocks from the host system.

The internal processor should allocate a region of its memory where it wants the hardware to store received command blocks.

The starting address for this memory should be programmed into the Cmd_Add registers.

The length of this buffer should be programmed into the Cmd_FIFO_Len registers.

If the internal processor wants to be notified via interrupts when command blocks are available it should set the Cmd_Int_En bit in the Cmd_Stat_Control register.

When this has all been entered, the internal processor asserts the Cmd_En bit in the Cmd_Stat_Control register. Setting this bit enables the hardware command parser to start passing commands to the internal processor. Prior to this bit being asserted, if the hardware parser receives a command block, it will silently discard it.

When the hardware receives command blocks, it will begin storing them in the buffer specified by Cmd_Add registers. After the hardware completes writing the command blocks to the internal processor memory, it will assert the Cmd_Rec bit in the Cmd_Stat_Stat register.

If more command blocks are received after the Cmd_Rec bit has been asserted, the hardware will continue to write them to the FIFO specified by the internal processor.

If it reaches the end of the FIFO, then the address will wrap back to the beginning (as specified by the Cmd_Add registers).

The internal processor should clear the Cmd_Rec bit only when it has read and processed all the commands that it was presented (as specified by the Cmd_Rec_Len registers). Until the Cmd_Rec bit is cleared, the hardware will not overwrite those FIFO locations. Therefore clearing the Cmd_Rec bit serves as an ACK to the hardware parser that it can reuse those memory locations for new commands.

This section details the status block structure. The Internet Tuner 10G uses status blocks to pass information back to the system. Status can range from reporting received data, exception cases, error conditions, or connection statistics. Status blocks are usually transferred to the host system using DMA. The Internet Tuner 10G will first generate a list of status command blocks. Different sources may generate status messages, and these are all fed into one master status message generator. These messages are put into a message list that is then made available to the transmit DMA engine module.

Status message blocks are variable in length and have the following field structure. Regardless of the type of status, each block must be made up of an even number of bytes. A padding byte should be used for all odd numbered byte status message blocks.

The host side implementation of status block handling complements the command block mechanism. Proper implementation must be adhered to for correct operation. Improper implementation could lead to deadlock situations.

A status block circular queue is created in host memory and the Internet Tuner 10G is configured with its starting (statqstart) and ending (statqend) addresses. Status blocks are then periodically, or upon request, transferred from the Internet Tuner 10G hardware into this queue using DMA.

This section explains the send status messages operation and details the steps that the internal processor should go through to send status messages back to the host system.

- The internal processor should create the message blocks and put them in a contiguous section of its memory space.
- The starting address of this memory space is programmed into the Stat_Add registers.
- The total length of the status messages is programmed into the Stat_Length registers.
- If the internal processor wants to be informed via an interrupt as to when the status messages have been transferred to the host system, then it should set the Stat_Int_En bit in the Cmd_Stat_Int_En register.
- When this has been all initialized, the internal processor then asserts the Send_Stat bit in the Cmd_Stat_Control register. Setting this bit will inform the hardware that there are status messages generated by the internal processor to be passed to the host system.
- When the hardware has completed transmitting the internal processor state messages, it will clear the Send_Stat bit in the Cmd_Stat_Control register, and set the Stat_Sent bit in the Cmd_Stat_Stat register.
- If the Stat_Int_En bit was also set, then step number six will also trigger an internal processor interrupt.

From here, the internal processor enters new status messages if desired.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for decoding and encoding network protocols and processing data, comprising:
   a network stack for receiving and transmitting packets and for encoding and decoding packets; and
   a plurality of dedicated hardwired logic protocol modules;
   wherein each protocol module is optimized for a specific network protocol;
   wherein said protocol modules execute in parallel;
   wherein said protocol modules include a Transmission Control Protocol (TCP) protocol module;
   wherein said TCP protocol module supports TCP protection against wrapped sequence numbers (PAWS) using dedicated and optimized hardwired logic.

2. An apparatus for decoding and encoding network protocols and processing data, comprising:
   a network stack for receiving and transmitting packets and for encoding and decoding packets;
   a plurality of dedicated hardwired logic protocol modules; and
   an Internet Protocol (IP) identification generator module that uses dedicated optimized hardwired logic to generate an identification field for IP packets that has a true random distribution and prevents attempts to predict future values of the identification field;
   wherein each protocol module is optimized for a specific network protocol;
   wherein said protocol modules execute in parallel.

3. A process for decoding and encoding network protocols and processing data, comprising:
   providing a network stack for receiving and transmitting packets and for encoding and decoding packets; and
   providing a plurality of dedicated protocol state machines;
   wherein each protocol state machine is optimized for a specific network protocol;
   wherein said protocol state machines execute in parallel;
   wherein said protocol state machines include a Transmission Control Protocol (TCP) protocol state machine;
   wherein said TCP protocol state machine supports TCP protection against wrapped sequence numbers (PAWS) using dedicated and optimized hardwired logic.

4. A process for decoding and encoding network protocols and processing data, comprising:
   providing a network stack for receiving and transmitting packets and for encoding and decoding packets;
   providing a plurality of dedicated protocol state machines; and
   providing an Internet Protocol (IP) identification generator module that uses dedicated optimized hardwired logic to generate an identification field for IP packets that has a true random distribution and prevents attempts to predict future values of the identification field;
   wherein each protocol state machine is optimized for a specific network protocol;
   wherein said protocol state machines execute in parallel.

* * * * *